United States Patent
Uchida et al.

(10) Patent No.: US 10,607,327 B2
(45) Date of Patent: Mar. 31, 2020

(54) IMAGE PROCESSING APPARATUS, IMAGE PROCESSING METHOD, AND RECORDING MEDIUM

(71) Applicant: Konica Minolta, Inc., Tokyo (JP)

(72) Inventors: Hisashi Uchida, Kyoto (JP); Hiroaki Kubo, Kyoto (JP)

(73) Assignee: Konica Minolta, Inc., Tokyo (JP)

( * ) Notice: Subject to any disclaimer, the term of this patent is extended or adjusted under 35 U.S.C. 154(b) by 242 days.

(21) Appl. No.: 15/891,013

(22) Filed: Feb. 7, 2018

(65) Prior Publication Data

US 2018/0225814 A1 Aug. 9, 2018

(30) Foreign Application Priority Data

Feb. 9, 2017 (JP) ................................. 2017-022634

(51) Int. Cl.
| | |
|---|---|
| G06T 5/50 | (2006.01) |
| G06T 7/174 | (2017.01) |
| G06K 9/32 | (2006.01) |
| G06K 9/50 | (2006.01) |
| G06K 9/00 | (2006.01) |
| G06T 7/73 | (2017.01) |
| G06K 9/28 | (2006.01) |

(52) U.S. Cl.
CPC ............ *G06T 5/50* (2013.01); *G06K 9/00986* (2013.01); *G06K 9/28* (2013.01); *G06K 9/3275* (2013.01); *G06K 9/50* (2013.01); *G06T 7/174* (2017.01); *G06T 7/74* (2017.01); *G06T 2200/28* (2013.01); *G06T 2207/10008* (2013.01); *G06T 2207/10024* (2013.01); *G06T 2207/20221* (2013.01); *G06T 2207/30176* (2013.01)

(58) Field of Classification Search
None
See application file for complete search history.

(56) References Cited

U.S. PATENT DOCUMENTS

| | | | |
|---|---|---|---|
| 2011/0122298 A1* | 5/2011 | Takahashi | H04N 5/3572 348/241 |
| 2013/0083110 A1* | 4/2013 | Sumiyoshi | B41J 11/008 347/14 |

(Continued)

FOREIGN PATENT DOCUMENTS

JP 2010-258803 11/2010

*Primary Examiner* — Fayyaz Alam
(74) *Attorney, Agent, or Firm* — BakerHostetler

(57) ABSTRACT

An image processing apparatus includes a first memory used for first rearrangement processing on a group of pixels in an input image, and a second memory used for second rearrangement processing on a group of pixels in an image obtained by the first rearrangement processing, and performs correction processing that includes the first rearrangement processing and the second rearrangement processing on the input image. One of the first and second memories is capable of higher-speed random access than the other memory and has a smaller memory capacity than the other memory. One of the first rearrangement processing and the second rearrangement processing is processing for rearranging a group of pixels in each of a plurality of block images generated from the input image, and the other rearrangement processing is processing for rearranging pixel rows among the block images. The one rearrangement processing involves random access to the one memory.

25 Claims, 75 Drawing Sheets

(56) References Cited

U.S. PATENT DOCUMENTS

2013/0236118 A1* 9/2013 Takahashi ............... G06T 5/001
                                                      382/275
2014/0168472 A1* 6/2014 Sengoku ................ H04N 5/772
                                                      348/231.99

* cited by examiner

Fig.16
<DATA IN SRAM WHEN 7 LINES ARE INPUT>
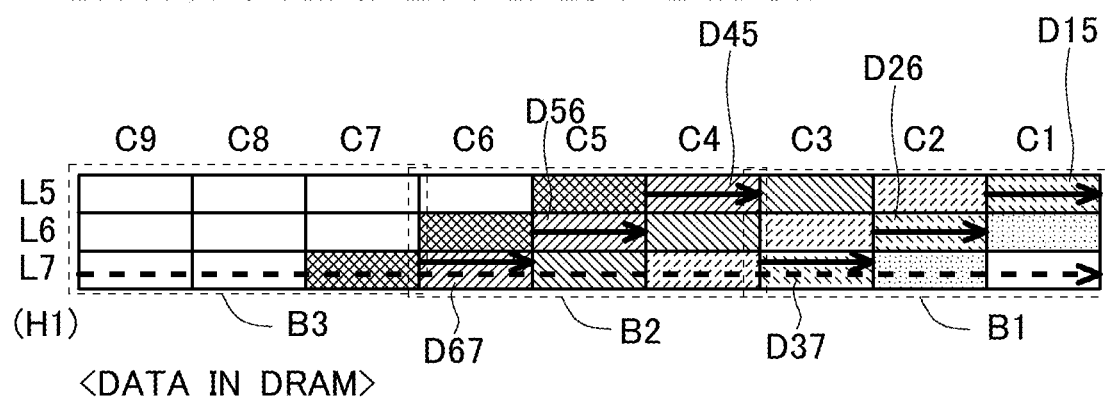
<DATA IN DRAM>
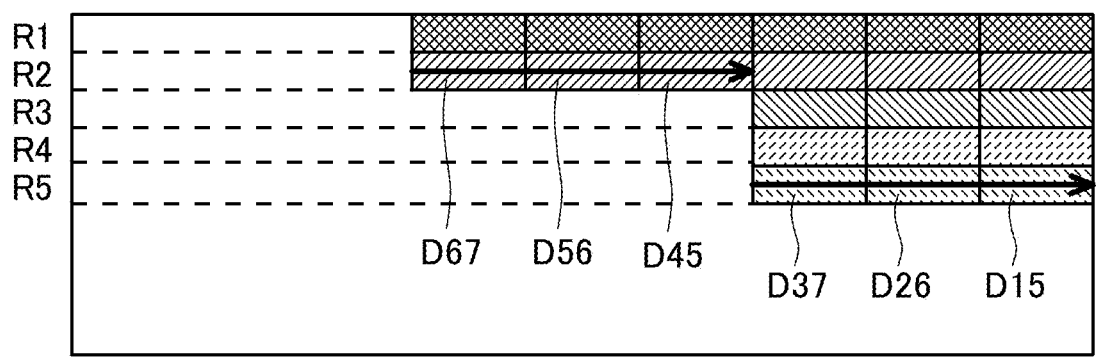

Fig.17
<DATA IN SRAM WHEN 8 LINES ARE INPUT>
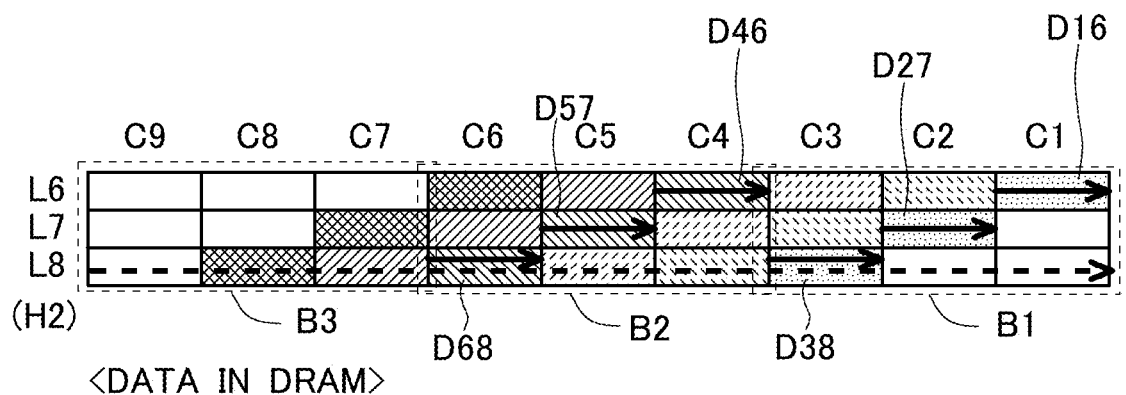
<DATA IN DRAM>
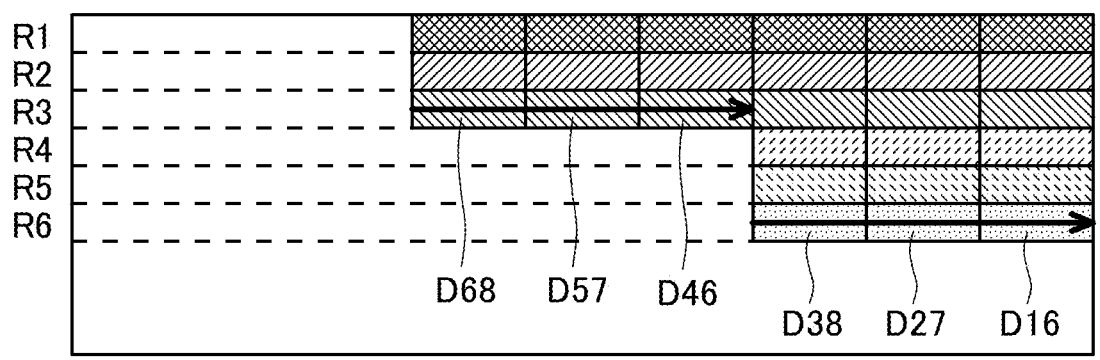

Fig.18
<DATA IN SRAM WHEN 9 LINES ARE INPUT>
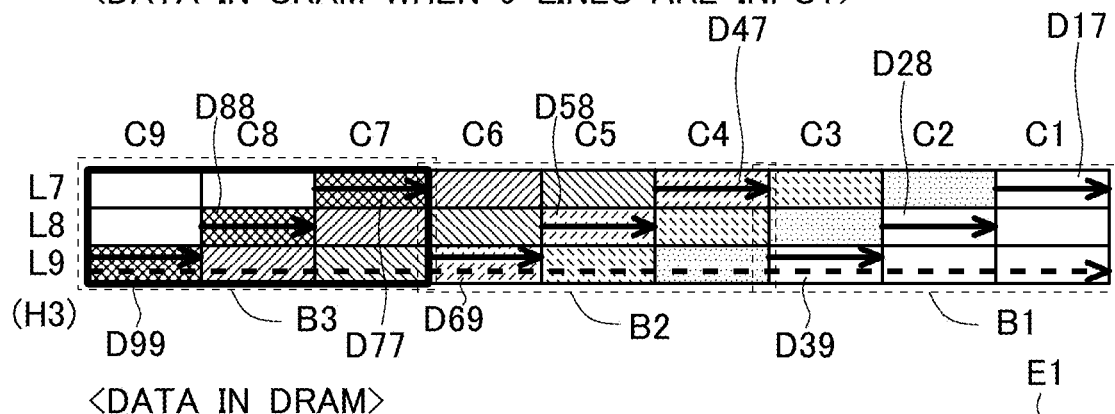
<DATA IN DRAM>
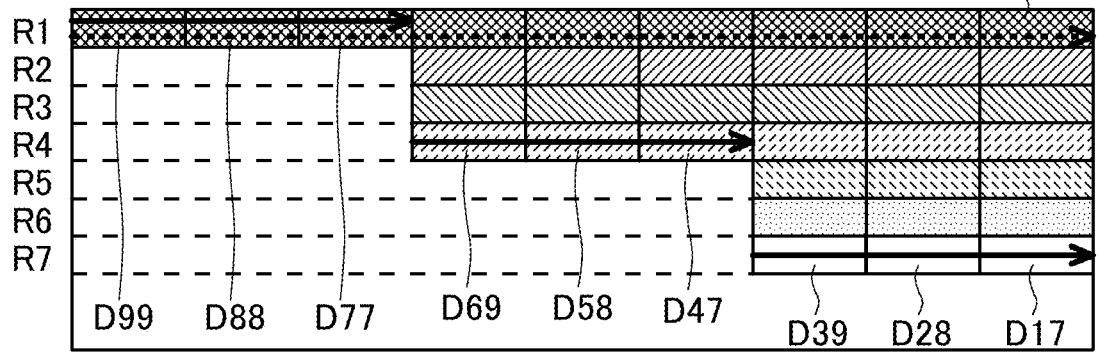
<DATA OUTPUT TO DOWNSTREAM PROCESSING UNIT 250>
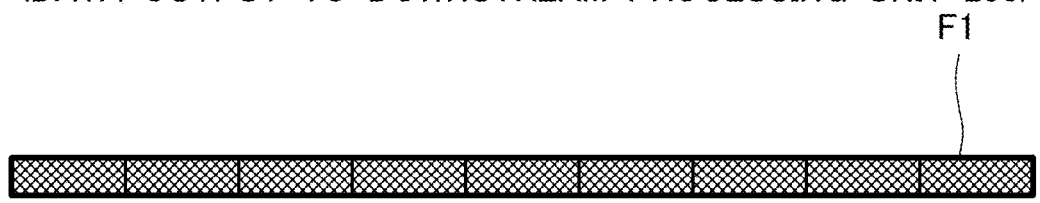

Fig.22 (SECOND EMBODIMENT: SRAM WRITE-TIME CORRECTION & DRAM READ-TIME CORRECTION)

(THIRD EMBODIMENT: SRAM READ-TIME CORRECTION & DRAM READ-TIME CORRECTION)

<DATA IN DRAM WHEN 1 LINE IS INPUT>

<DATA IN SRAM>

<DATA IN DRAM WHEN 3 LINES ARE INPUT>

<DATA IN SRAM>

<DATA IN DRAM WHEN 4 LINES ARE INPUT>

<DATA IN SRAM>

<DATA IN DRAM WHEN 5 LINES ARE INPUT>

<DATA IN SRAM>

<DATA IN DRAM WHEN 6 LINES ARE INPUT>

<DATA IN SRAM>

Fig.45
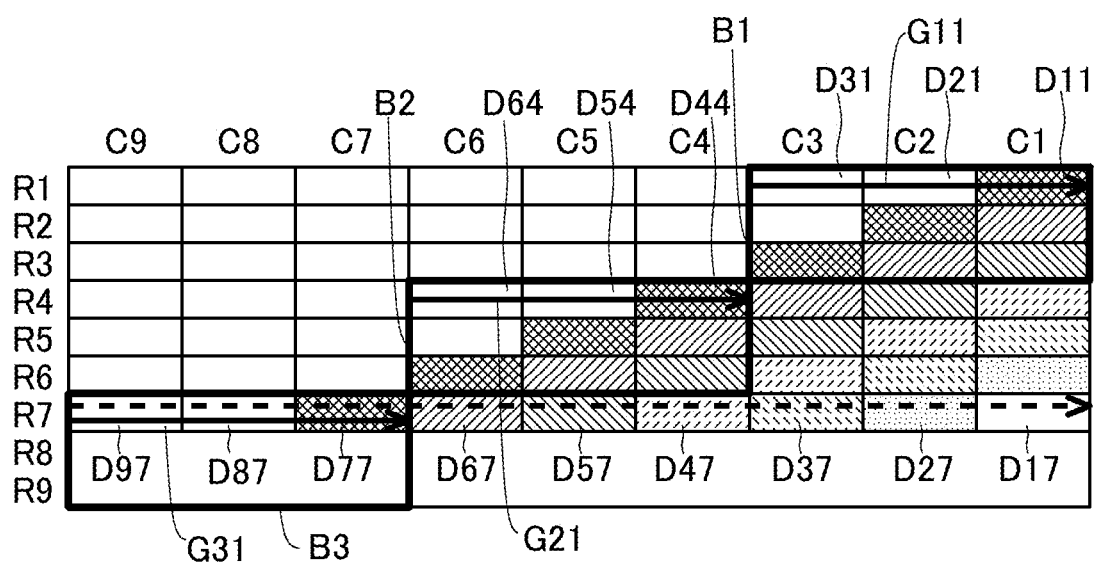
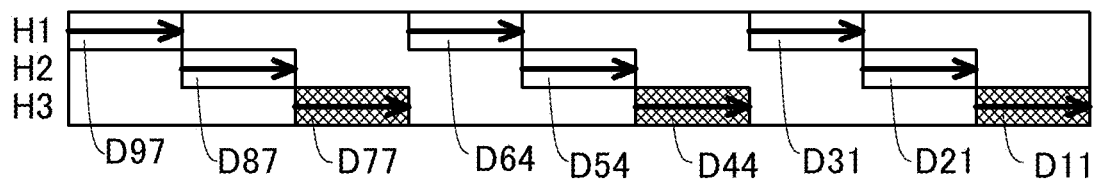

Fig.46
<DATA IN DRAM WHEN 8 LINES ARE INPUT>
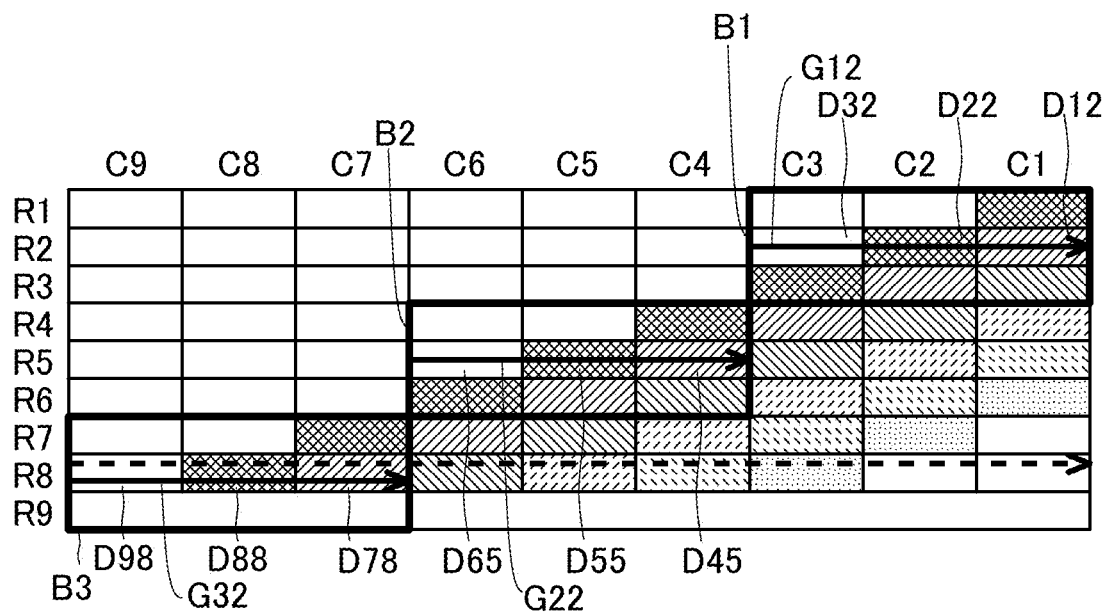
<DATA IN SRAM>
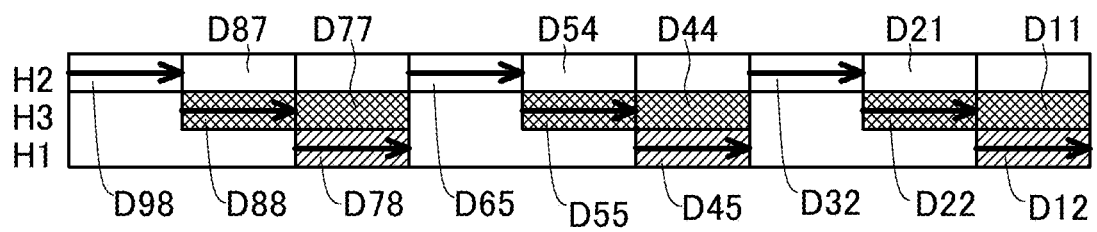

Fig.49
(SIXTH EMBODIMENT:DRAM WRITE-TIME CORRECTION & SRAM READ-TIME CORRECTION)
<SCANNED IMAGE>
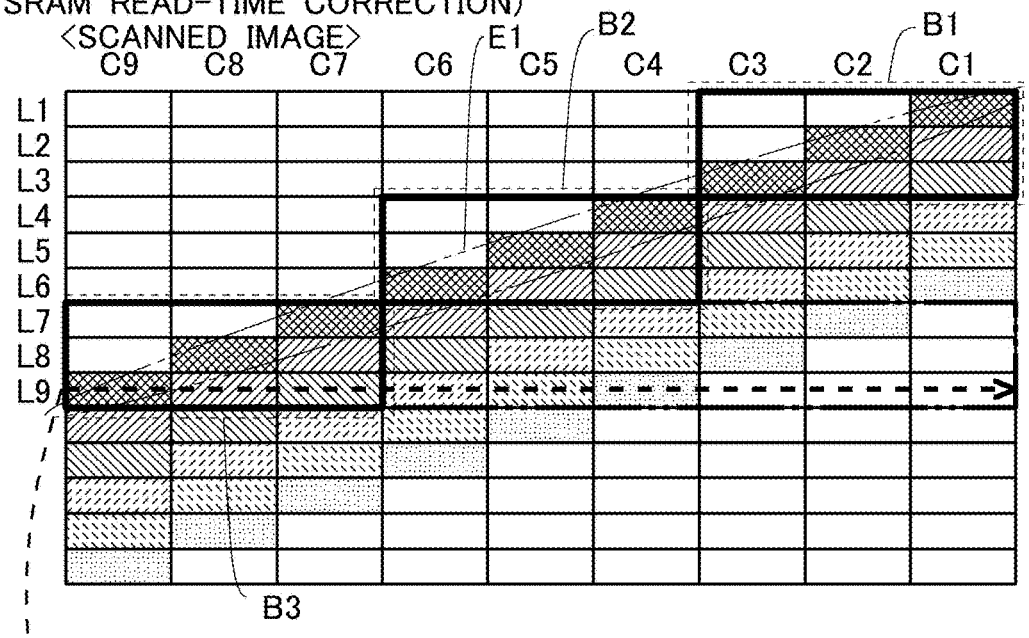
<DATA IN DRAM WHEN 9 LINES ARE INPUT>
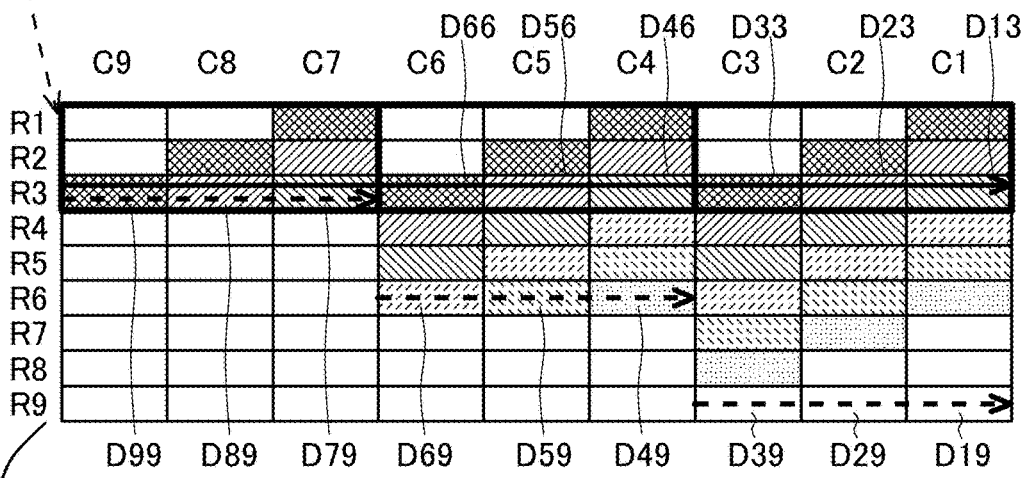
<DATA IN SRAM>
<DATA OUTPUT TO DOWNSTREAM PROCESSING UNIT 250>
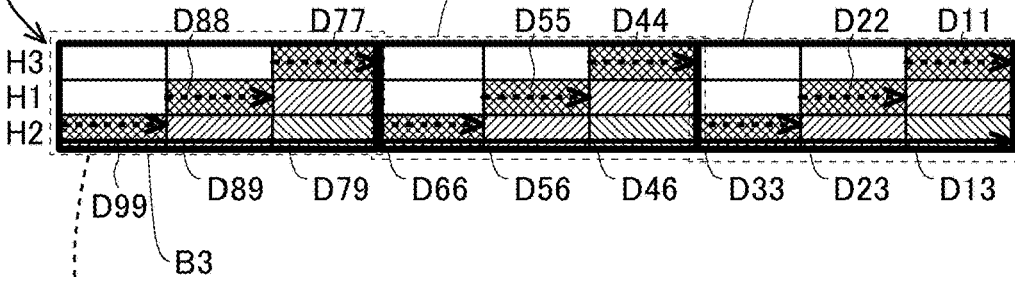

Fig.50
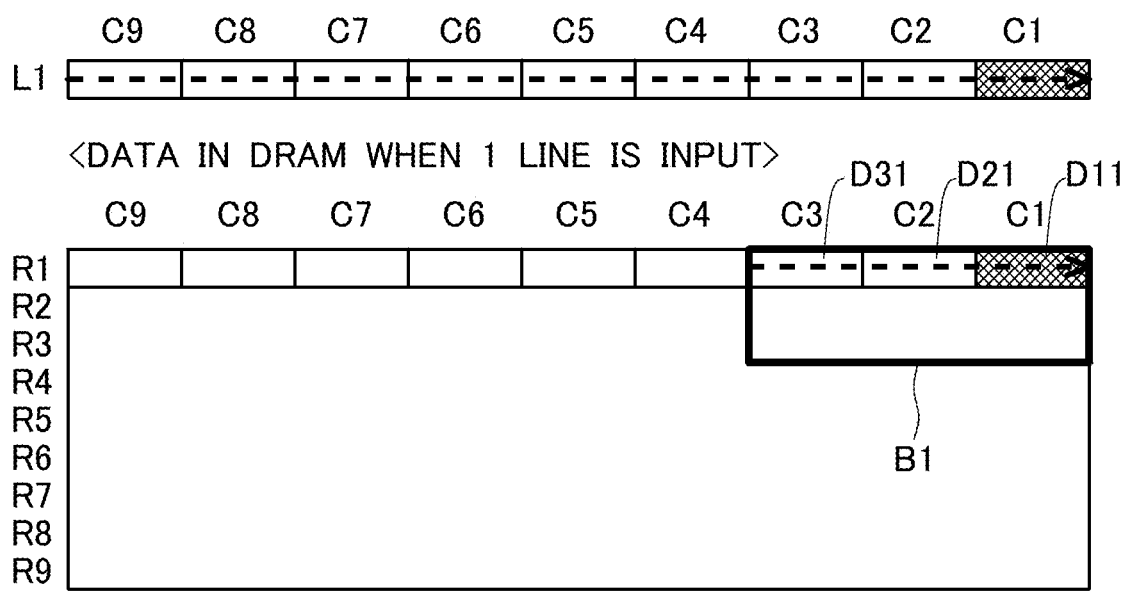
<DATA IN SRAM>

Fig.51
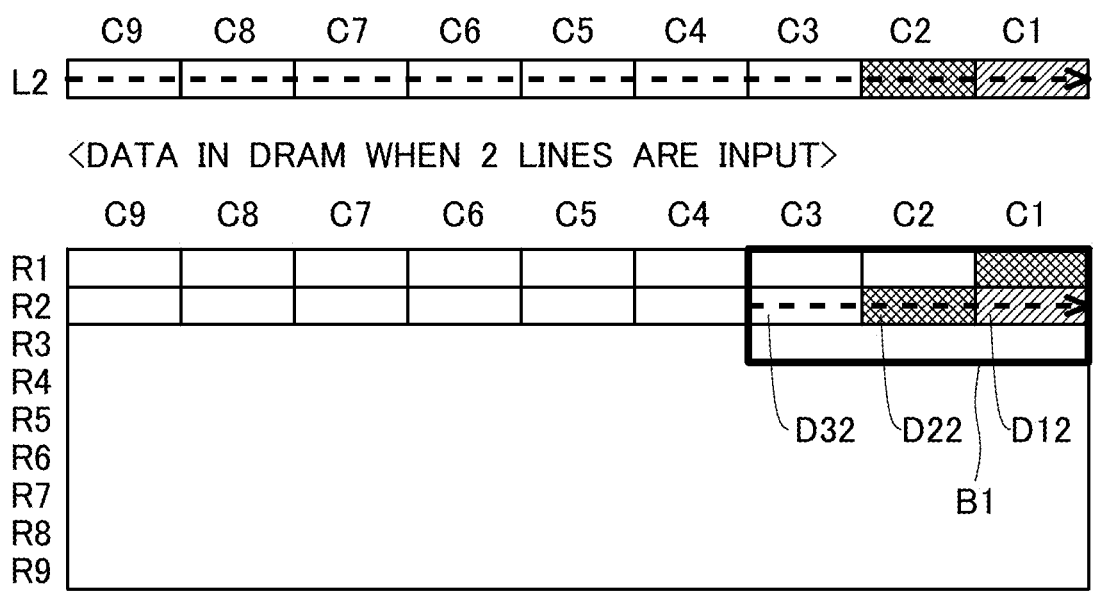

Fig.53
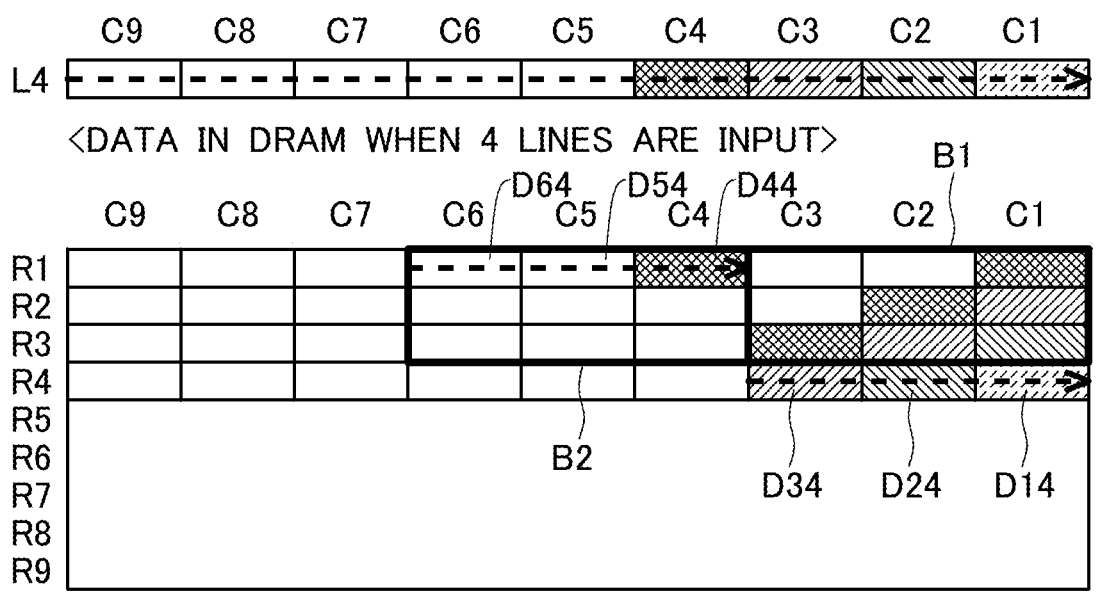

Fig.55
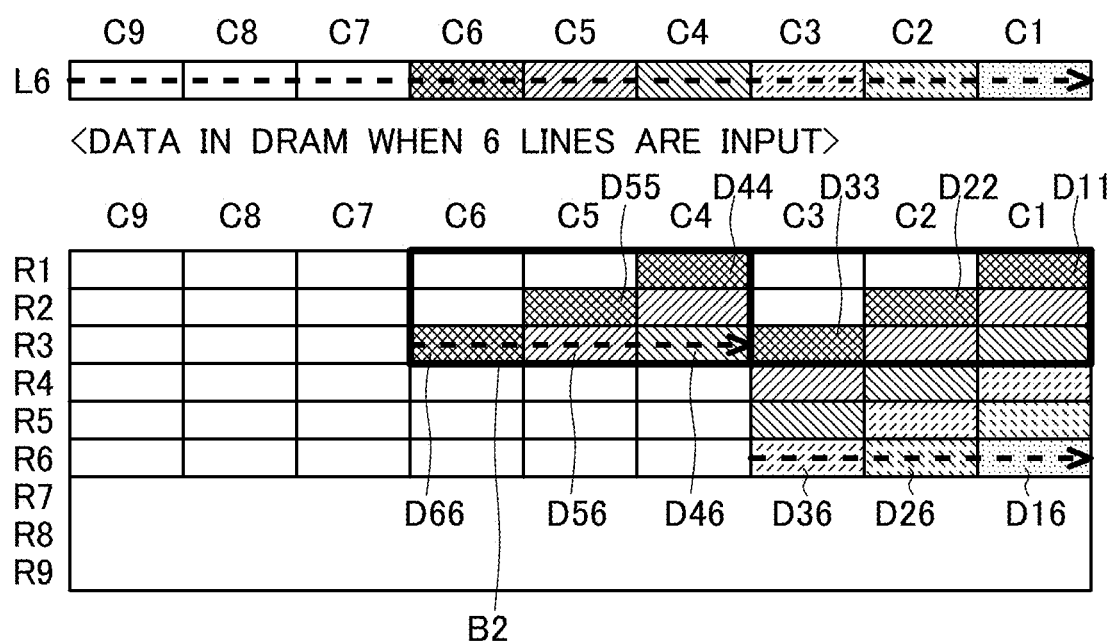
<DATA IN SRAM>
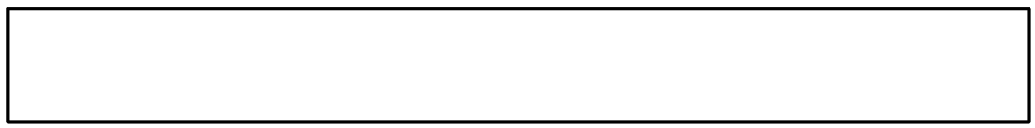

(EIGHTH EMBODIMENT: DRAM WRITE-TIME CORRECTION & SRAM WRITE-TIME CORRECTION)

(EIGHTH EMBODIMENT: DRAM WRITE-TIME CORRECTION & SRAM WRITE-TIME CORRECTION)

Fig.64

(NINTH EMBODIMENT)

Fig.66
(TENTH EMBODIMENT)

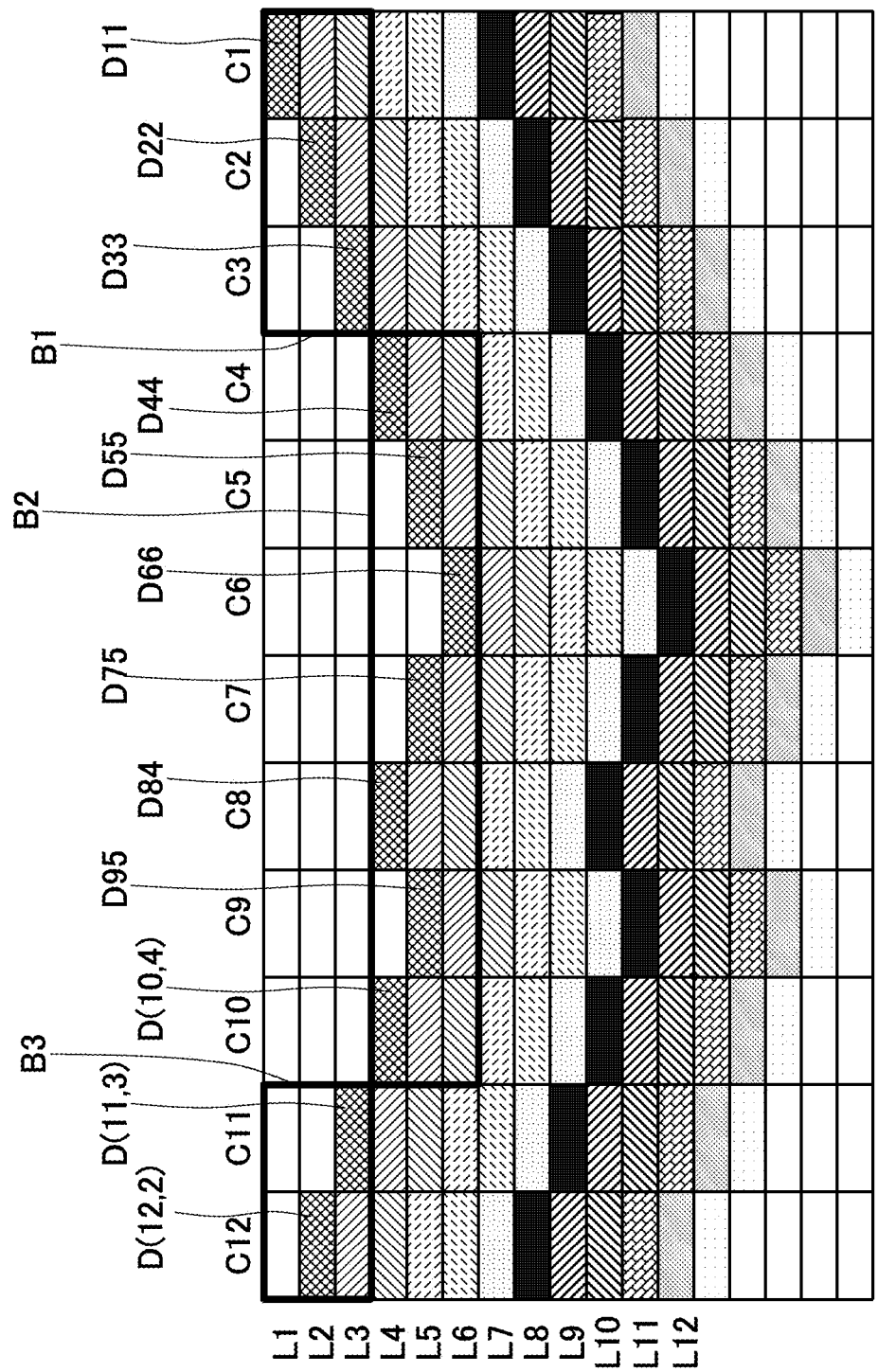

IMAGE PROCESSING APPARATUS, IMAGE PROCESSING METHOD, AND RECORDING MEDIUM

This application claim priority under 35 U.S.C. § 119 to Japanese Application No. 2017-022634, filed on Feb. 9, 2017, the entire disclosure of which is incorporated herein by reference.

BACKGROUND

Technological Field

The present invention relates to an image processing apparatus such as a Multi-Functional Peripheral (MFP) and a technique related thereto.

Description of the Related Art

There are techniques for, when an original document is read to generate a scanned image (read image of the original document), detecting the amount of obliqueness (oblique angle θ) of the original document and correcting the obliqueness of the scanned image on the basis of the amount of obliqueness (see, for example, Japanese Patent Application Laid-open No. 2010-258803).

A technique using an image memory (memory with a capacity smaller than the capacity that is worth a single page of an original document) is conceivable for use in correction of the obliqueness of a scanned image, the image memory storing part of the entire image prior to correction in order to obtain a single line's worth of corrected image (e.g., the memory storing an image 303 (see FIG. 5) of a portion that includes an oblique line corresponding to the single line of the corrected image).

For example, the above part of the image prior to correction is written in the as-is arrangement to the image memory and stored once in the image memory. In this state, the oblique portion corresponding to the single line of the corrected image remains oblique in the image memory in which memory cells are arranged in a matrix. In other words, the oblique portion is divided in the lateral direction into a plurality of partial pixel rows (chopped partial continuous pixel rows) that are arranged in stepwise form at different longitudinal positions in the matrix arrangement of the image memory.

Thereafter, the sequence of reading the pixel rows is changed at the time of reading pixel rows from the image memory. More specifically, a single oblique line's worth of images (images across the entire width in the main scanning direction) are continuously read out using random access (while sequentially changing the readout position, i.e., longitudinal position), instead of reading out the pixel rows at the same longitudinal position (in the same lateral line) as they are in the matrix arrangement of the image memory, the oblique line being configured by pixel rows arranged in stepwise form at different longitudinal positions in the image memory. Thus, the pixel rows in the oblique line (pixel rows across the entire width in the main scanning direction) are output as a corrected single line of pixel rows (i.e., corrected pixel rows). In short, the oblique line is serialized and output by rearrangement processing using random access to the image memory.

This enables the pixel rows read by a line sensor (part of the oblique image) to be output, with the oblique line aligned in a row, to a downstream processing unit (various image processing units such as a color adjustment unit), using a relatively small capacity image memory (memory with a capacity smaller than the capacity that is worth a single page of an original document).

The capacity of such an image memory is calculated as follows. For example, a case is assumed in which the oblique angle is 1.5 degrees when an A4-size original document is read (where the lengthwise direction of the A4-size original document is assumed to be the main scanning direction) so as to generate a scanned image at a resolution of 600 dpi. In this case, the part of the image (image of a portion that includes an oblique line corresponding to the single line of the corrected image) has a size of about 7200 pixels (=600 dpi×about 12 inches) in the main scanning direction and approximately 180 lines (pixels) (=about 7200×sin θ) in the sub-scanning direction. The capacity of the image memory is in the range of, for example, approximately 4 (=7200× 180×3×8/8) to 5 megabytes (MB).

The above-described image memory for storing part of the image may, for example, be a dynamic random access memory (DRAM).

However, DRAMs have the property of requiring a setup and pre-charge time for every access to discontinuous addresses. Thus, if a DRAM is used as the aforementioned image memory, there is a problem that a relatively long period of time is required for random access to the DRAM.

Specifically, in cases such as where an oblique line is read out as described above, relatively random accesses are made in such a manner that a single oblique line's worth of images arranged in stepwise form at different longitudinal positions in the image memory (i.e., images across the entire width in the main scanning direction) are continuously read out (while sequentially changing the readout position, i.e., longitudinal position). Thus, the processing time relatively increases. More specifically, in order to, for example, read out images in a single oblique line (a plurality of partial pixel rows that span 180 lines), processing for reading out the partial pixel rows that span 180 lines is performed, or in other words, 180 random accesses are made. This is performed for the entire image, and in order to read out approximately 5400 oblique lines, approximately one million random accesses (=5400×180) are made. Sorting processing that involves such a large number of random accesses takes a long period of time.

In contrast, it is conceivable to use relatively high-speed memories such as static random access memories (SRAMs) for random access (relatively high-speed random access), instead of DRAMs.

However, since SRAMs are relatively expensive, the problem of increased cost arises if SRAMs are used for all image memories for storing part of the image. For example, in the case of using SRAMs with capacities of 4 to 5 MB, cost increases considerably as compared to the case of using DRAMs with approximately identical capacities.

In this way, the problems relating to processing speed and cost arise if only a single type of memory is used in the correction processing including the processing for rearranging pixel rows in an image.

SUMMARY

It is an object of the present invention to provide a technique capable of implementing correction processing that includes processing for rearranging pixel rows in an image at a relatively high speed and while suppressing an increase in cost.

The correction processing as described above (correction processing including the processing for rearranging pixel rows in an image) is applicable to not only obliqueness correction, but also correction of an image distortion caused by, for example, a relief in an original document.

The correction processing as described above is also applicable to not only scan processing (e.g., image reading processing performed on an obliquely placed original document), but also print output processing (e.g., print output processing performed on oblique paper).

According to a first aspect of the present invention, an image processing apparatus includes a first memory that is used for performs first rearrangement processing on a group of pixels in an input image, a second memory that is used for second rearrangement processing on a group of pixels in an image obtained by the first rearrangement processing and outputs the image that has undergone the second rearrangement processing, and a hardware processor that uses the first memory and the second memory to perform correcting processing on the input image, the correcting processing including the first rearrangement processing and the second rearrangement processing. The first rearrangement processing is processing for rearranging a group of pixels in the input image by using random access at the time of writing to the first memory or random access at the time of reading-out from the first memory. The second rearrangement processing is processing for rearranging a group of pixels in an image obtained by the first rearrangement processing by using random access at the time of writing to the second memory or random access at the time of reading-out from the second memory. The first memory and the second memory are different types of memories. One memory out of the first memory and the second memory is a memory capable of higher-speed random access than the other memory. The one memory has a smaller memory capacity than the other memory. One rearrangement processing out of the first rearrangement processing and the second rearrangement processing is processing for rearranging a group of pixels in each of a plurality of block images that are generated on the basis of the input image. The other rearrangement processing out of the first rearrangement processing and the second rearrangement processing is processing for rearranging pixel rows among the plurality of block images. The one rearrangement processing is rearrangement processing that involves random access to the one memory.

According to a second aspect of the present invention, an image processing method includes a) acquiring an input image, and b) performing correction processing on an input image by using a first memory and a second memory, the correction processing including first rearrangement processing and second rearrangement processing, the first memory being a memory for performing the first rearrangement processing on a group of pixels in the input image, and the second memory being a memory for performing the second rearrangement processing on a group of pixels in an image obtained by the first rearrangement processing and outputting the image that has undergone the second rearrangement processing. The first rearrangement processing is processing for rearranging a group of pixels in the input image by using random access at the time of writing to the first memory or random access at the time of reading-out from the first memory. The second rearrangement processing is processing for rearranging a group of pixels in an image obtained by the first rearrangement processing by using random access at the time of writing to the second memory or random access at the time of reading-out from the second memory. The first memory and the second memory are different types of memories. One memory out of the first memory and the second memory is a memory capable of higher-speed random access than the other memory. The one memory has a smaller memory capacity than the other memory. One rearrangement processing out of the first rearrangement processing and the second rearrangement processing is processing for rearranging a group of pixels in each of a plurality of block images that are generated on the basis of the input image. The other rearrangement processing out of the first rearrangement processing and the second rearrangement processing is processing for rearranging pixel rows among the plurality of block images. The one rearrangement processing involves random access to the one memory.

According to a third aspect of the present invention, a non-transitory computer-readable recording medium storing a program for causing a computer to execute a) acquiring an input image, and b) performing correction processing on an input image by using a first memory and a second memory, the correction processing including first rearrangement processing and second rearrangement processing, the first memory being a memory for performing the first rearrangement processing on a group of pixels in the input image, and the second memory being a memory for performing the second rearrangement processing on a group of pixels in an image obtained by the first rearrangement processing and outputting the image that has undergone the second rearrangement processing. The first rearrangement processing is processing for rearranging a group of pixels in the input image by using random access at the time of writing to the first memory or random access at the time of reading-out from the first memory. The second rearrangement processing is processing for rearranging a group of pixels in an image obtained by the first rearrangement processing by using random access at the time of writing to the second memory or random access at the time of reading-out from the second memory. The first memory and the second memory are different types of memories. One memory out of the first memory and the second memory is a memory capable of higher-speed random access than the other memory. The one memory has a smaller memory capacity than the other memory. One rearrangement processing out of the first rearrangement processing and the second rearrangement processing is processing for rearranging a group of pixels in each of a plurality of block images that are generated on the basis of the input image. The other rearrangement processing out of the first rearrangement processing and the second rearrangement processing is processing for rearranging pixel rows among the plurality of block images. The one rearrangement processing involves random access to the one memory.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 16 illustrates processing performed on each line pixel row received from the image capturing unit.

FIG. 17 illustrates processing performed on each line pixel row received from the image capturing unit.

FIG. 18 illustrates processing performed on each line pixel row received from the image capturing unit.

FIG. 45 illustrates processing performed on each line pixel row.

FIG. 46 illustrates processing performed on each line pixel row.

FIG. 49 is a descriptive diagram illustrating a rearrangement operation according to the sixth embodiment.

FIG. 50 illustrates processing performed on each line pixel row.

FIG. 51 illustrates processing performed on each line pixel row.

FIG. 53 illustrates processing performed on each line pixel row.

FIG. 55 illustrates processing performed on each line pixel row.

FIG. 64 illustrates a scanned image with an image distortion.

FIG. 66 illustrates another scanned image with an image distortion.

FIG. 75 illustrates another scanned image according to a variation.

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

1-1. Configuration

Figure 1:
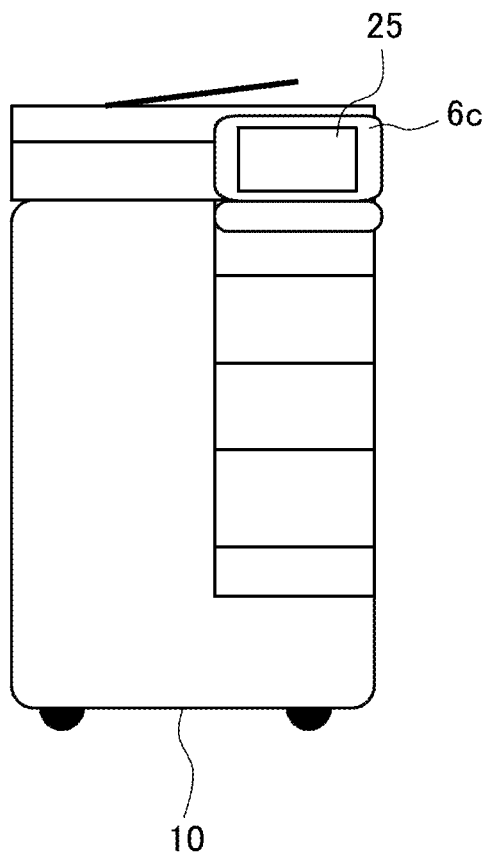
FIG. 1 illustrates an external view of an MFP (image processing apparatus).
Figure 2:
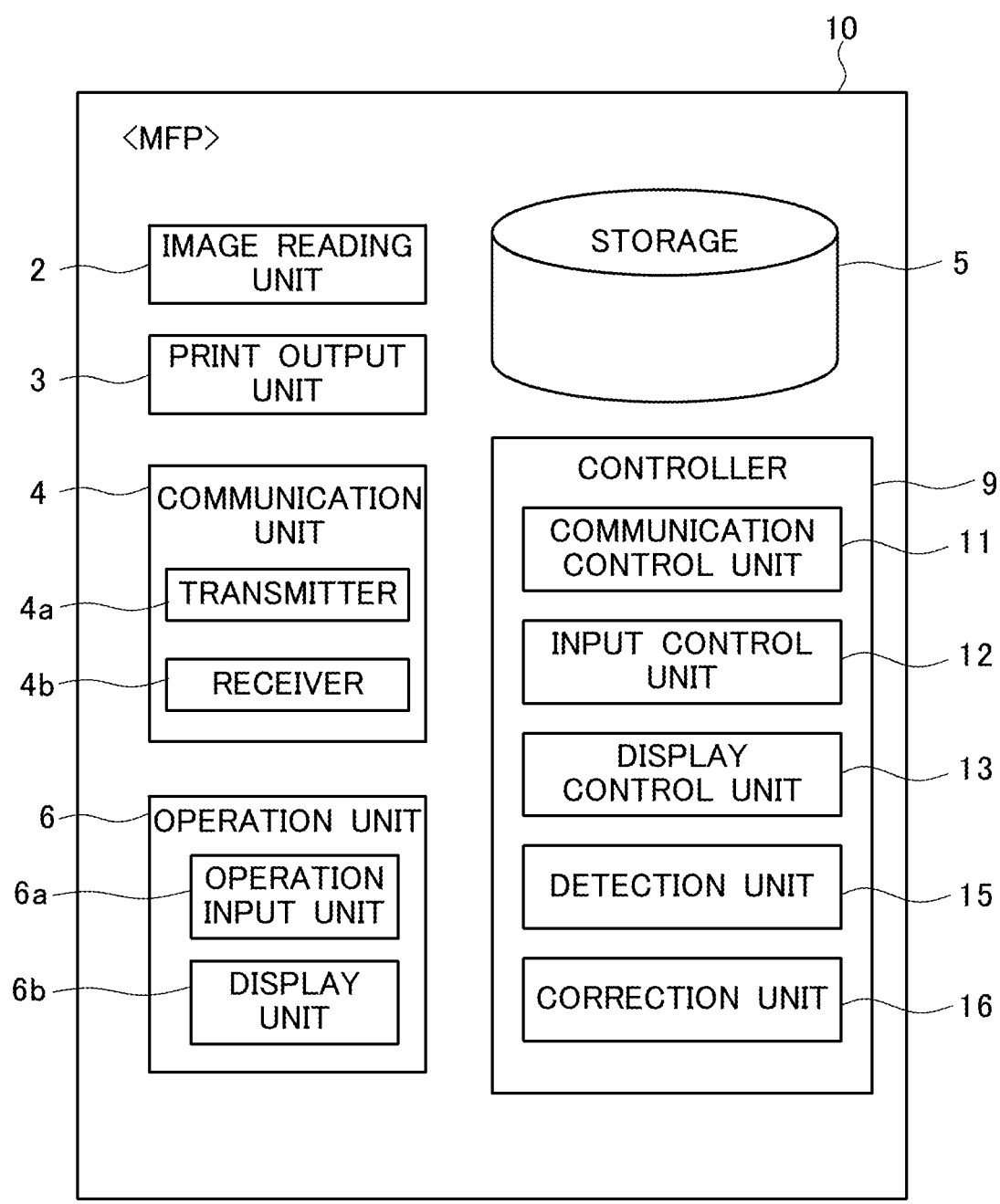
FIG. 2 is a functional block diagram of the MFP.

FIG. 1 illustrates an external view of an MFP (image processing apparatus) 10, and FIG. 2 is a functional block diagram of the MFP 10. Here, a Multi-Functional Peripheral (MFP) is shown as an example of the image processing apparatus.

The MFP 10 is an apparatus (also referred to as a "Multi-Functional Peripheral") having functions such as a scan function, a copy function, a facsimile function, and a box storage function. Specifically, the MFP 10 includes, for example, an image reading unit 2, a print output unit 3, a communication unit 4, a storage 5, an operation unit 6, and a controller 9 as illustrated in the functional block diagram in FIG. 2, and implements various types of functions by operating these units in combination. The MFP 10 may also be referred to as an image forming apparatus or an image reading apparatus.

The image reading unit 2 is a processing unit that optically reads (i.e., scans) an original document that is placed at a predetermined position on the MFP 10 and generates image data of the original document (also referred to as an "original document image" or a "scanned image"). The image reading unit 2 may also be referred to as a "scanner unit."

The print output unit 3 is an output unit that prints out an image on various types of media such as paper on the basis of data regarding an object to be printed.

The communication unit 4 is a processing unit capable of facsimile communication via a network such as a public network. The communication unit 4 is also capable of various types of network communication (wired and wireless communication).

The storage 5 is configured by storage devices such as various types of semiconductor memories (e.g., a ROM, a static random access memory (SRAM) 51 (see FIG. 4), a dynamic random access memory (DRAM) 52 (see FIG. 4), and other image memories), and a hard disk drive (HDD).

The operation unit 6 includes an operation input unit 6a that receives operation input to the MFP 10, and a display unit 6b that displays and outputs various types of information.

The MFP 10 is provided with a generally plate-like operation panel unit 6c (see FIG. 1). The operation panel unit 6c includes a touch panel 25 (see FIG. 1) on the front side. The touch panel 25 functions not only as part of the operation input unit 6a but also as part of the display unit 6b. The touch panel 25 may be configured by embedding various types of sensors in a liquid crystal display panel, and is capable of receiving various types of operation input from an operator while displaying various types of information.

The controller 9 is a control device that is built into the MFP 10 and performs overall control of the MFP 10. The controller 9 is configured as a computer system that includes, for example, a CPU and various types of semiconductor memories (RAM and ROM). The controller 9 implements various types of processing units by causing the CPU to execute predetermined software programs (hereinafter, also simply referred to as "programs") stored in a ROM (e.g., EEPROM (registered trademark)). The programs (to be more specific, a group of program modules) may be recorded in a portable recording medium (or in other words, any of various types of non-transitory computer-readable recording media) such as an USB memory and installed into the MFP 10 via the recording medium. Alternatively, the programs may be downloaded via a communication network and installed into the MFP 10.

Specifically, the controller 9 implements various types of processing units including a communication control unit 11, an input control unit 12, a display control unit 13, a detection unit 15, and a correction unit 16, as illustrated in FIG. 2, by executing the programs.

The communication control unit 11 is a processing unit that controls communication operations with other devices (e.g., a portable terminal) in cooperation with the communication unit 4 and other units. The communication control unit 11 includes a transmission control unit that controls operations of transmitting various types of data, and a reception control unit that controls operations of receiving various types of data.

The input control unit 12 is a control unit that controls operations of receiving input of operation to the operation input unit 6a (e.g., touch panel 25). For example, the input control unit 12 controls operations of receiving operation input to an operation screen displayed on the touch panel 25.

The display control unit 13 is a processing unit that controls display on the display unit 6b (e.g., touch panel 25). For example, the display control unit 13 causes the touch panel 25 to display screens such as an operation screen for operating the MFP 10.

The detection unit 15 is a processing unit that detects, for example, the oblique angle of an original document.

The correction unit 16 is a processing unit that performs correction processing including two types of rearrangement processing on an input image by using different types of memories (in the present example, two types of memories including the SRAM 51 and the DRAM 52).

1-2. Detailed Configuration of Scanner Unit

Figure 3:
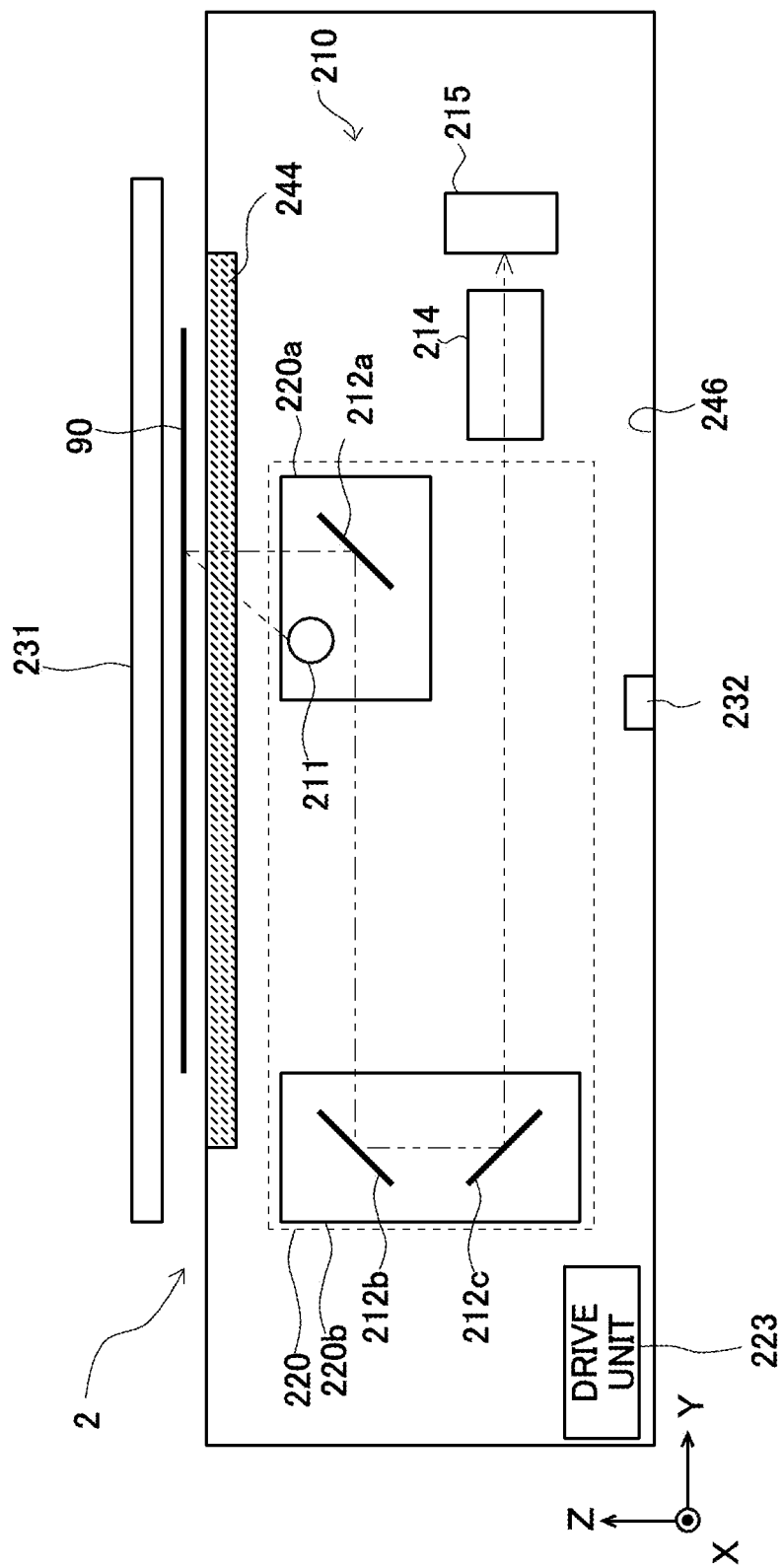
FIG. 3 illustrates a detailed configuration of an image reading unit (scanner unit).

FIG. 3 illustrates a detailed configuration of the image reading unit (scanner unit) 2. In FIG. 3 and other drawings, directions or other information are appropriately illustrated using an XYZ orthogonal coordinate system.

As illustrated in FIG. 3, the scanner unit 2 includes a reading unit 210.

The reading unit 210 in the present example is configured as a miniature optical reading unit. The reading unit 210 includes a light source 211, mirrors 212 (212a, 212b, 212c), a lens (image-forming optical system) 214, and an image capturing unit (image sensor or imaging capturing device) 215. Each constituent element of the reading unit 210 is provided below (inside) transparent platen glass 244 (surface on which an original document is placed). An image of the original document is acquired in such a manner that light applied (emitted) from the light source 211 toward the original document placed above passes through the platen glass 244 and is reflected off the original document, and the reflected light reaches the image sensor 215.

The light source 211 includes a plurality of light emitting devices (a plurality of partial light surfaces) 211E (not shown) that make up a row of light emitting devices that are aligned one-dimensionally (linearly) in the main scanning direction (X direction). In other words, the light source 211 is a linear light source that extends in the main scanning direction. The light emitting devices 211E may be several tens of light emitting diodes (LEDs). The light emitting devices 211E are capable of lighting up independently of each other.

The image sensor 215 may be a linear image sensor (in the present example, CCD line sensor) having a plurality of light receiving elements (pixels) aligned one-dimensionally (linearly) in the main scanning direction (X direction). In other words, the image sensor 215 may be a photoelectric conversion element having a plurality of pixels aligned in the main scanning direction. The photoelectric conversion element converts the reflected light, which has been emitted from the light source 211 toward the original document 90 and reflected off the original document 90, into an image signal so as to acquire a "line image" that is a linear image of the original document 90 in the main scanning direction (line image prior to rearrangement processing, which will be described later, or original line image).

In the present example, the image sensor 215 includes a large number of (e.g., 7200) rows of light receiving elements aligned in the main scanning direction, and acquires a line image of a predetermined length in the main scanning direction of the original document 90 placed on the platen glass 244.

The MFP 10 is capable of taking a one-sided copy of an original document placed on a document platen (to be more specific, platen glass 244). Specifically, an operator places an original document on the platen glass 244 while once moving a document cover 231 upward away from the platen glass 244 of the main body of the MFP 10. Then, the operator moves the document cover 231 back to the original position so that the original document is sandwiched and held between the document cover 231 and the platen glass 244. Thereafter, a scan operation is performed. In the scan operation, a two-dimensional image of the original document placed on the platen glass 244 is read out by a movable part 220a (described later) of the reading unit 210 acquiring each line image (X-direction line image) at each sub-scanning position while moving from one end in the sub-scanning direction (Y direction) of the original document to the other end.

The light source 211 of the reading unit 210 is disposed under the platen glass 244 and emits illumination light upward so as to irradiate a to-be-scanned surface (lower surface) of the original document placed on the platen glass 244 (document platen) from the underside. The light emitted from the light source 211 passes through the platen glass 244 and is reflected off the to-be-scanned surface of the original document 90. A light figure of the reflected light is further reflected by the mirrors 212a, 212b, and 212c, reduced through the lens 214, and then received by the image sensor 215. The image sensor 215 acquires a line image in the width direction (main scanning direction) of paper at once. Thus, the image sensor 215 acquires a linear image (line image) of the original document 90 at a given sub-scanning direction position (Y).

The reading unit 210 further includes two movable parts 220a and 220b (collectively referred to as a "movable part 220") that are movable in the sub-scanning direction (Y direction). The movable part 220a includes the light source 211 and the mirror 212a, and the movable part 220b includes the mirrors 212b and 212c. Each linear image (line image) at each sub-scanning direction position (Y) of the original document 90 placed on the platen glass 244 is acquired, following movement of the movable parts (also referred to as "sliding parts" or "sliders") 220a and 220b in the sub-scanning direction (Y direction). The movable parts 220a and 220b are driven by a sliding drive unit 223 (drive mechanism including, for example, a motor and a gear). When the movable parts 220a and 220b move, the movable part 220b moves a distance that corresponds to half of the amount of movement of the movable part 220a, so that the optical length from each reflection position of the light reflected off the original document to the image sensor 215 is maintained constant.

By repeating this operation of acquiring a line image (linear image) at each scanning position in the sub-scanning direction (each Y position) while changing the Y position in association with the movement of the reading unit 210, a two-dimensional image of the to-be-scanned surface of the original document is acquired. In other words, an image of the entire document (information about the original document) is acquired.

1-3. Outline of Operations

Figure 4:
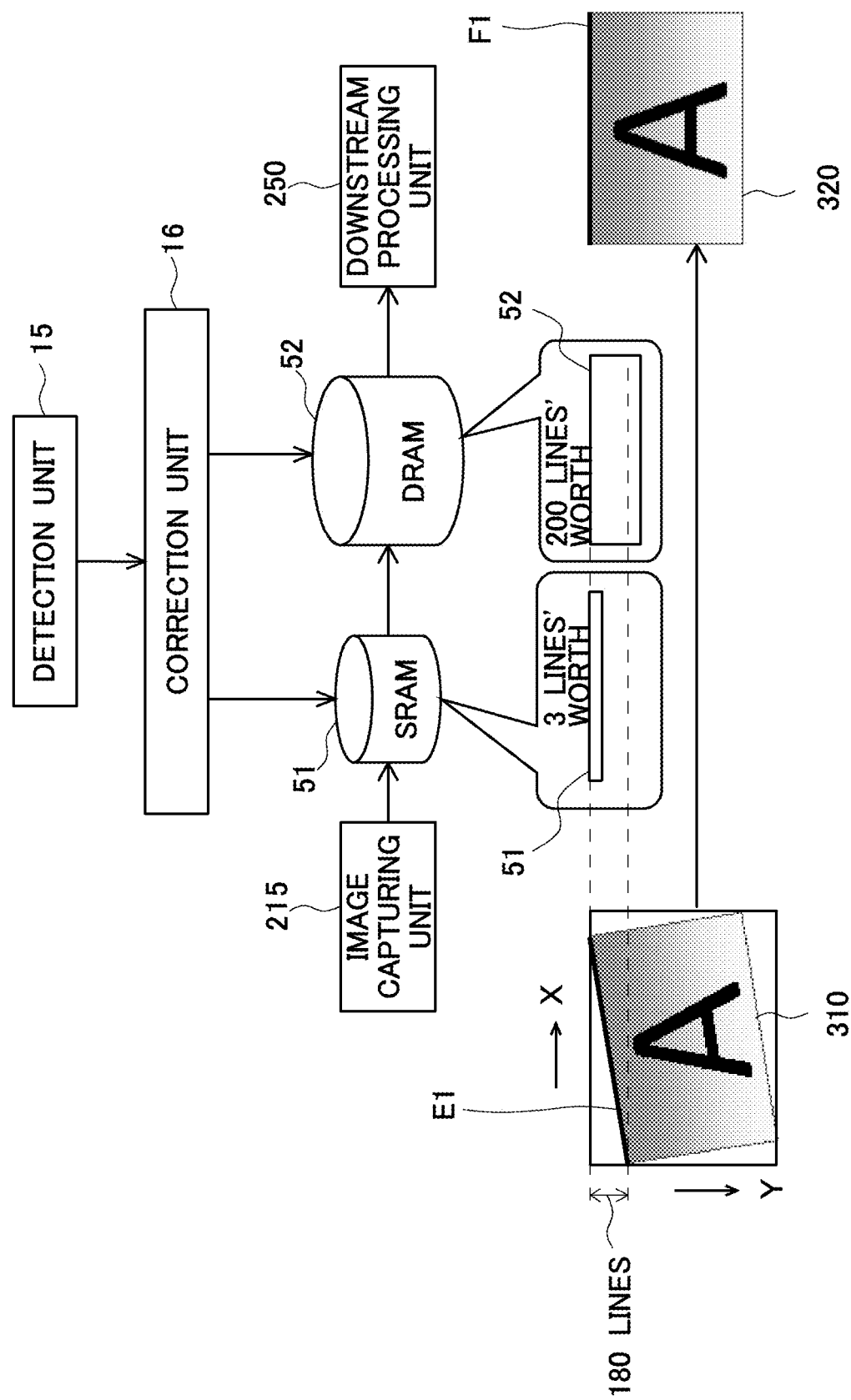
FIG. 4 is a conceptual diagram illustrating an operation of correcting an image.

FIG. 4 is a conceptual diagram illustrating an operation of correcting an image (oblique image).

As illustrated in FIG. 4, an image 310 captured by the image capturing unit 215 of the image reading unit 2 is first corrected using the SRAM 51 and the DRAM 52 and then output to a downstream processing unit 250 of the image reading unit 2.

In the present embodiment, the input image 310 is an oblique image (image that is not in its normal position and is oblique), and a normal image obtained by deforming the oblique image through the aforementioned correction processing is output to the downstream processing unit 250. Then, an image 320 whose obliqueness has been corrected and that has undergone downstream processing is output from the downstream processing unit 250.

The MFP 10 includes image memories including the SRAM 51 and the DRAM 52 as described above. The SRAM 51 and the DRAM 52 are memories for use in obliqueness correction or other correction (correction processing memories or temporary storage memories), and both have a capacity smaller than the memory capacity for storing a single page's worth of images.

In particular, the memory capacity of the SRAM 51 is smaller than the memory capacity of the DRAM 52. The SRAM 51 has a memory capacity for storing a relatively small number of line images, i.e., N line images. For example, while the DRAM 52 has a memory capacity for storing 200 line images (200 lines' worth of memory capacity), the SRAM 51 has a memory capacity for storing three line images (three lines' worth of memory capacity). Specifically, the SRAM 51 is made up of a relatively small number of line memories, i.e., N line memories, where N is a natural number of two or more. Each line image is an image made up of a group of pixels (one-dimensional group of pixels) arranged linearly in the main scanning direction (X direction).

Out of the SRAM 51 and the DRAM 52, the SRAM 51 is capable of higher-speed random access than the DRAM 52.

The aforementioned correction unit 16 uses these memories 51 and 52 and performs correction processing that includes first rearrangement processing P1 and second rearrangement processing P2 on an input image. The first rearrangement processing P1 and the second rearrangement processing P2 are performed in this order. In other words, two-step correction processing including the first-stage rearrangement processing P1 and the second-stage rearrangement processing P2 is performed.

The first rearrangement processing (also referred to as "first correction processing") P1 is processing for rearranging a group of pixels in an input image by using random access at the time of writing to the first memory M1 or random access at the time of reading from the first memory M1.

The second rearrangement processing (also referred to as "second correction processing") P2 is processing for rearranging a group of pixels in an image obtained by the first rearrangement processing P1 by using random access at the time of writing to the second memory M2 or random access at the time of reading from the second memory M2.

One of the first rearrangement processing P1 and the second rearrangement processing P2 is processing for rearranging a group of pixels within each of a plurality of block images Bi (described later) that are generated on the basis of the input image. This one rearrangement processing is also referred to as "intra-block rearrangement processing." The "intra-block rearrangement processing" is performed using the SRAM 51 in the present example. The "intra-block rearrangement processing" is relatively fine rearrangement processing performed in each block image.

The other of the first rearrangement processing P1 and the second rearrangement processing P2 is processing for rearranging pixel rows among the plurality of block images Bi (described later). This other rearrangement processing is also referred to as "inter-block rearrangement processing." The inter-block rearrangement processing can also be expressed as processing for rearranging pixel rows in the plurality of block images Bi in units of block images, the pixel rows each being, for example, continuous across the entire width (or along the length in the X direction) of each block image. The "inter-block rearrangement processing" can also be expressed as rearrangement processing for linearly aligning a plurality of inter-block linear pixel rows (plurality of serialized pixel rows) among the plurality of block images B, the plurality of inter-block linear pixel rows each being pixel rows linearly aligned in its block image to which the pixel rows belong, and being arranged non-linearly among the plurality of block images B. The "inter-block rearrangement processing" is performed using the DRAM 52 in the present example. The "inter-block rearrangement processing" is relatively rough rearrangement processing performed in units of block images.

In the present embodiment, the "intra-block rearrangement processing" is performed as the "first rearrangement processing" P1 performed on a group of pixels in the input image, and the "inter-block rearrangement processing" is performed as the "second rearrangement processing" P2 performed on a group of pixels in the image obtained by the first rearrangement processing. In short, first the "intra-block rearrangement processing" is performed using the SRAM 51, and then the "inter-block rearrangement processing" is performed using the DRAM 52. To be more specific, the SRAM 51 is used as a first memory for use in the "first rearrangement processing" P1, and the DRAM 52 is used as a second memory for use in the "second rearrangement processing" P2 and for use in outputting the image that has undergone the second rearrangement processing for subsequent processing.

Figure 7:
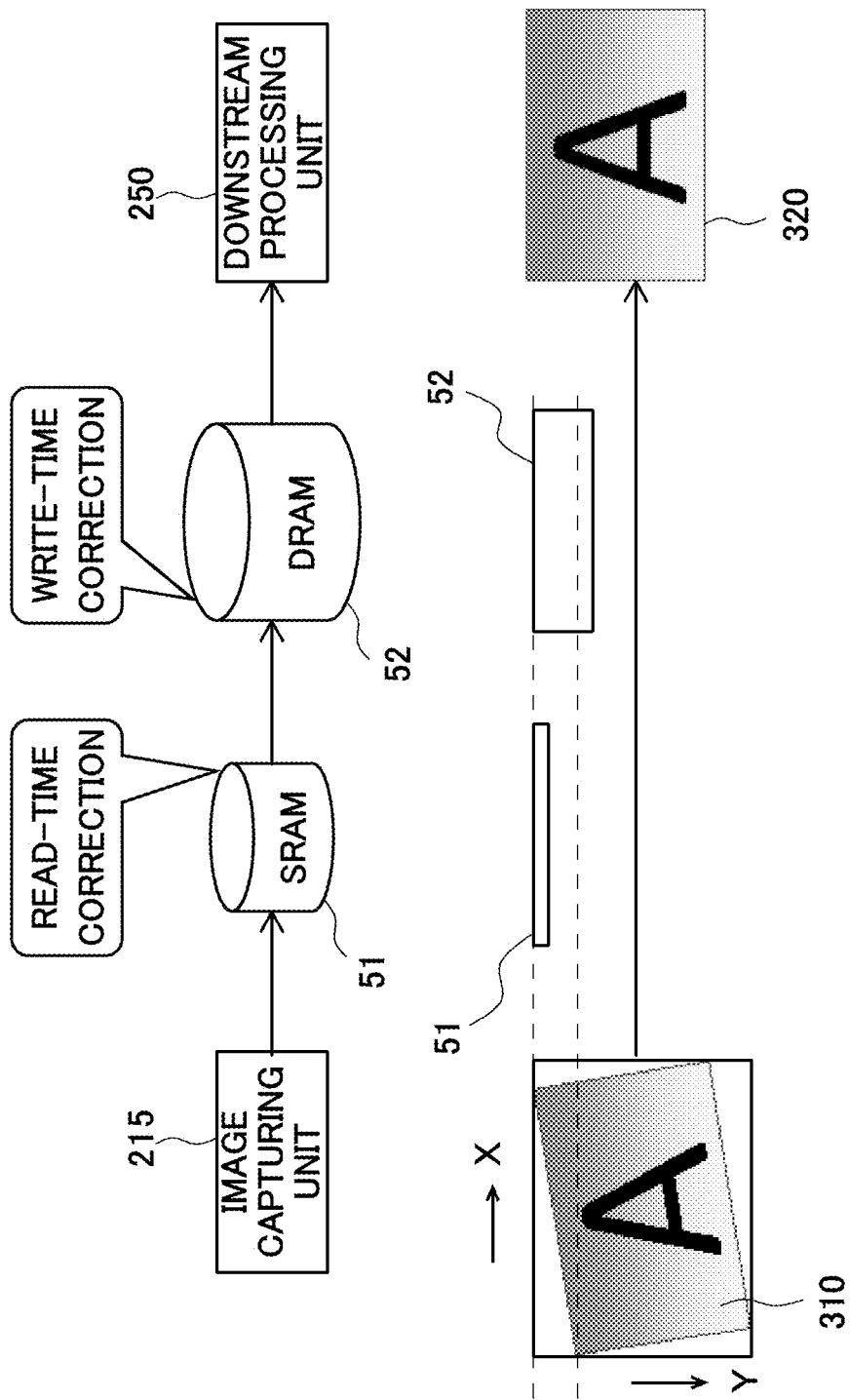
FIG. 7 illustrates an overview of a first embodiment.
Figure 8:
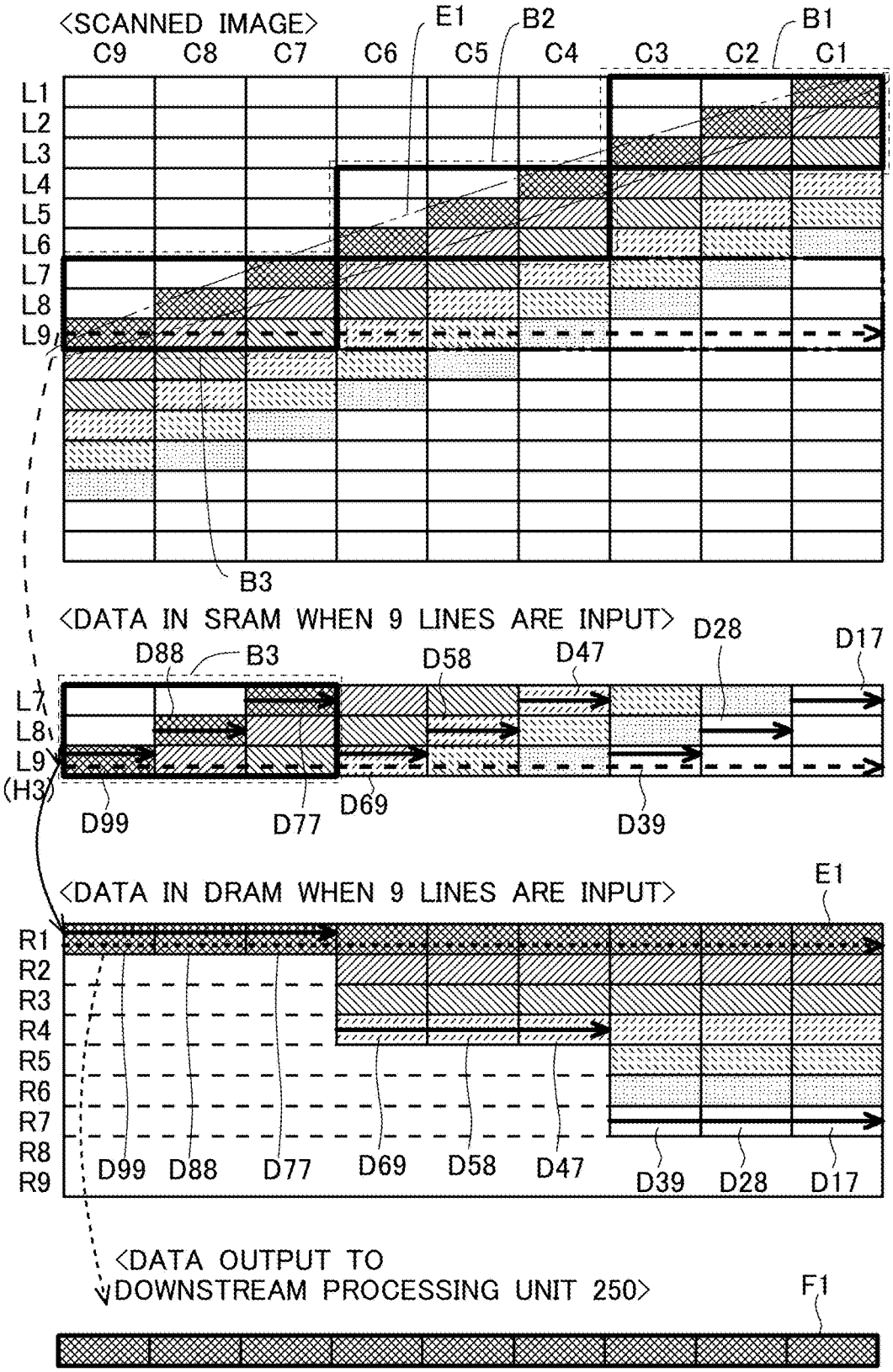
FIG. 8 is a descriptive diagram illustrating a rearrangement operation according to the first embodiment.

In the first embodiment, the first rearrangement processing P1 ("intra-block rearrangement processing") is performed substantially at the time of reading from the SRAM 51 (at the read time), as will be described later (see FIGS. 7 and 8). The second rearrangement processing P2 ("inter-block rearrangement processing") is performed substantially at the time of writing to the DRAM 52 (at the write time). In short, SRAM read-time correction and DRAM write-time correction are performed (in the order) according to the first embodiment. FIGS. 7 and 8 are conceptual diagrams illustrating the operations according to the first embodiment.

FIG. 7 is a simplified diagram of FIG. 4, and FIG. 8 is a descriptive diagram illustrating the rearrangement operation.

Such a mode will be described in detail hereinafter.

1-4. State Prior to Correction

As illustrated in FIG. 4, the image 310 prior to correction is oblique. The obliqueness correction according to the present embodiment makes each oblique line in an image prior to correction parallel to a predetermined reference direction (e.g., X direction). For example, an oblique line E1 in an image prior to correction (line that is inclined an angle θ with respect to the main scanning direction or X direction) is changed into a new line F1 (line parallel to the main scanning direction or X direction) by the obliqueness correction. Note that an oblique line Ei can also be expressed as an oblique line that is made up of a plurality of partial pixel rows arranged in stepwise form, spanning a plurality of X-direction lines in the input image (pixel rows that are continuous in the X direction in part of each X-direction line).

Figure 5:
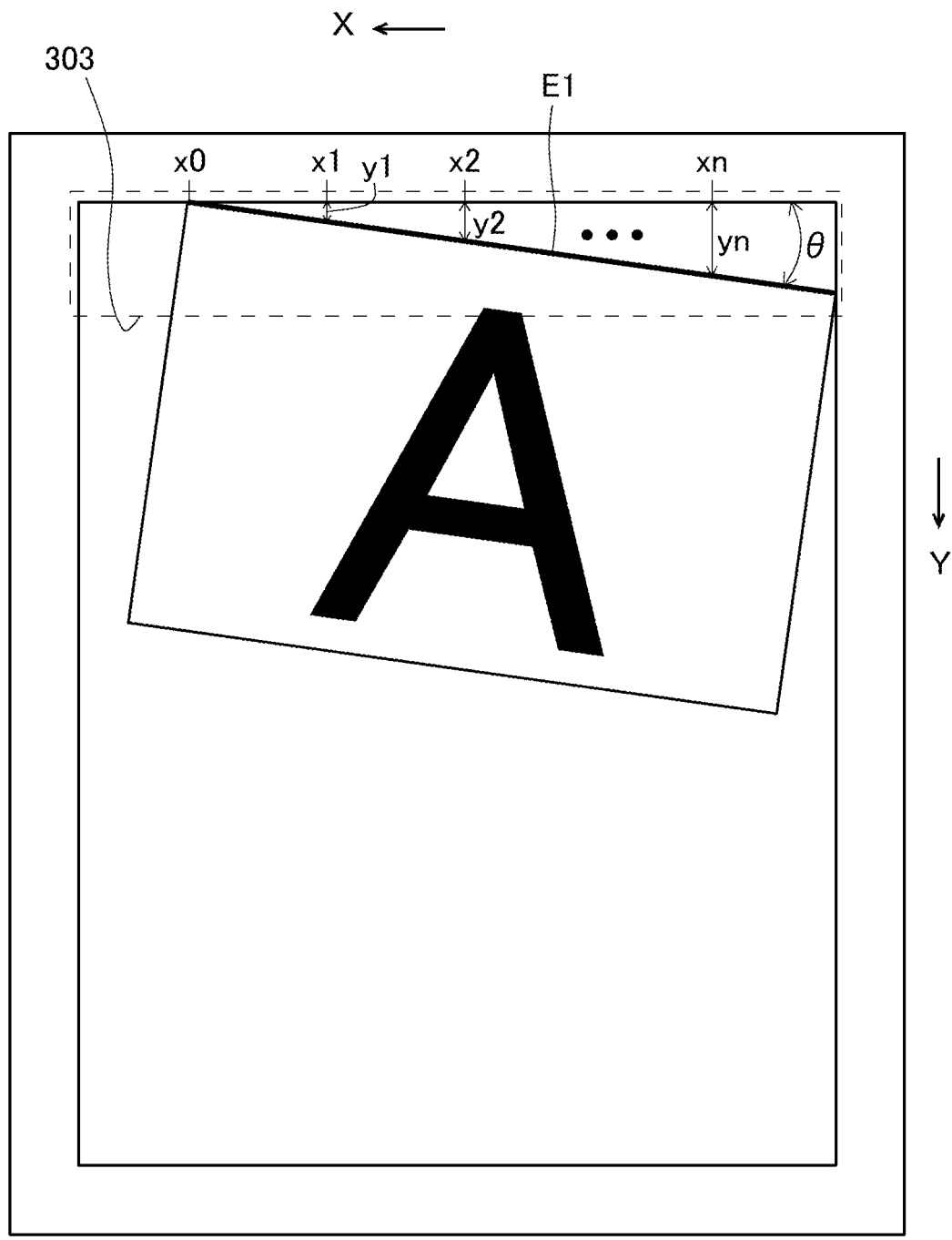
FIG. 5 illustrates a state in which an original document is placed on platen glass.

FIG. 5 illustrates a state in which an A4-size original document is placed on the generally A3-size platen glass 244.

The generally A3-size (slightly larger than A4-size) platen glass 244 is installed such that its length in the main scanning direction (X direction) is shorter than its length in the sub-scanning direction (Y direction). The A4-size original document is placed with its long side roughly along the main scanning direction (X direction), but to be specific, the original document is placed with its long side shifted by the angle θ from the main scanning direction (X direction).

Figure 6:
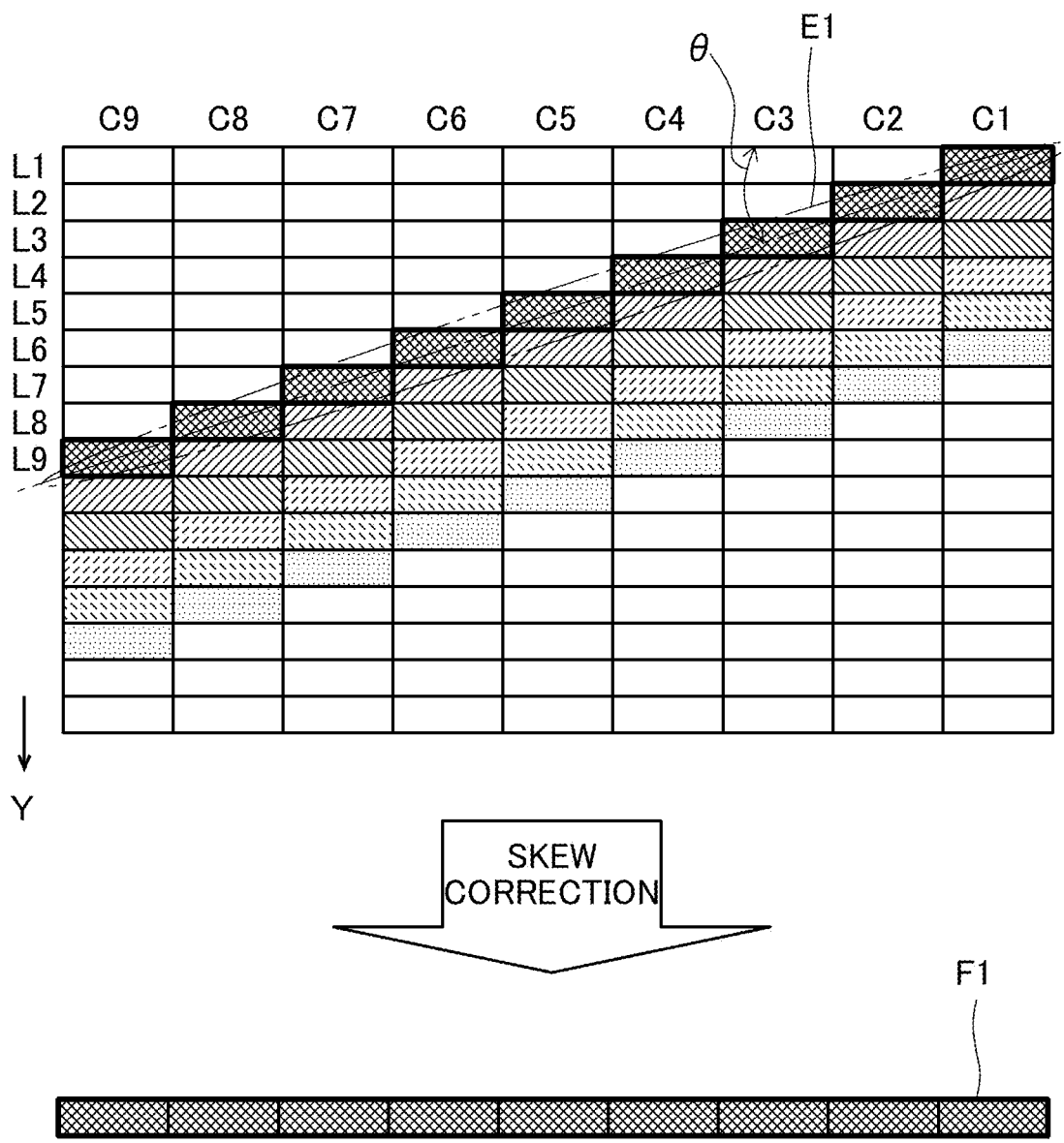
FIG. 6 is a simplified version of an input image (oblique image) prior to correction.

A scan operation is performed with the original document placed in this way, and accordingly the image (image prior correction; oblique image) 310 as illustrated in FIGS. 4 and 6 is generated.

FIG. 6 is a simplified diagram of the image (input image) 310 prior to correction. FIG. 6 shows the case where the obliqueness has nine lines' worth of width.

When the oblique angle θ of the oblique line E1 as described above is 1.5 degrees, the width (Y-direction width) of obliqueness is approximately 180 lines, and the oblique line E1 is present in stepwise form over a relatively large number of different X-direction lines (specifically, 180 X-direction lines L1 to L180). In the present example, for the sake of simplification, a situation is assumed in which the oblique line E1 is inclined spanning a relatively small number of X-direction lines (specifically, nine X-direction lines L1 to L9), or in other words, a situation in which the oblique angle is very small.

In the case illustrated in FIG. 6, the oblique line E1 is made up of, for example, 7200 pixels in the X direction, similarly to lines whose oblique angle is zero (θ=0). The 7200 pixels are, however, present in nine different X-direction lines L1 to L9 in the Y direction. A group of pixels that make up the oblique line E1 is arranged in stepwise form in the image prior to correction. To be more specific, the group of pixels that make up the oblique line E1 is arranged in nine different sectional ranges (also referred to as "sectional intervals") C1 to C9 that are obtained by dividing the group of pixels in the X direction (e.g., a group of 7200 pixels). Each of the sectional ranges C1 to C9 is made up of, for example, a group of 800 (=7200/9) pixels (also referred to as a "partial pixel row") that are continuous in the X direction. In other words, the oblique line E1 is made up of a plurality of partial pixel rows that correspond respectively to the plurality of sectional ranges C1 to C9, and each partial pixel row includes a group of 800 continuous pixels (partial pixel row) arranged in the X direction. The groups of continuous pixels (each group being a group of 800 pixels) in the plurality of sectional ranges C1 to C9 are respectively present in their corresponding X-direction lines L1 to L9 whose Y-direction positions changes gradually. In this way, the oblique line E1 is present in stepwise form over the nine different X-direction lines L1 to L9.

When the oblique angle θ of the oblique line E1 is 1.5 degrees as described above, the oblique line E1 is present in stepwise form over a relatively large number of different lines (specifically, 180 X-direction lines L1 to L180). In this case, the oblique line E1 includes a group of 40 (=7200/180) continuous pixels (partial pixel row) in each of the plurality of sectional ranges C1 to C180. In this way, the number of sections (divisions) of the oblique line and the length of each sectional range (partial pixel row) vary according to factors such as the oblique angle.

As illustrated in, for example, FIGS. 4 and 6, the oblique line E1 is converted into the X-direction line F1 by the obliqueness correction (skew correction) according to the present embodiment. To be more specific, a group of pixels (oblique line E1) that are arranged spanning a plurality of X-direction lines at different Y-direction positions is converted into a group of pixels (new line F1) that are arranged continuously in a single X-direction line.

1-5. Block Images

The correction processing according to the present embodiment uses a plurality of block images Bi generated (conceptually) on the basis of the input image. Specifically, the plurality of block images Bi are generated by (conceptually) dividing the input image into a plurality of blocks.

The block images Bi are (conceptually) generated for each deformed line (e.g., oblique line). A plurality of block images for each deformed line Ei are generated by dividing a stepwise portion (a plurality of partial pixel rows D) of each deformed line Ei (in the present example, a stepwise portion that goes relatively upward toward the right; also referred to as an "increment portion") into every N lines at predetermined Y-direction positions. For example, a plurality of block images B1, B2, and B3 as illustrated in FIG. 8 are (conceptually) formed for the deformed line E1.

Each block image Bi has N lines' worth of length (length corresponding to the total width of N lines) in the Y direction (longitudinal direction), N being the same as the number N of lines in the SRAM 51. The length in the Y direction of each block image Bi is shorter than the length in the Y direction of the input image. Each block image Bi has a length in the X direction that corresponds to a total value of Q sectional ranges C (partial pixel rows) among all sectional ranges C of a single line. To be more specific, each block image Bi has a length in the X direction that corresponds to a total value of the lengths of Q sectional ranges C among the plurality of sectional ranges C, the Q sectional ranges corresponding to partial pixel rows that correspond to the oblique line and that span N different lines. In short, each block image Bi is made up of (Q×N) partial pixel rows. In the present example, each block image Bi has a three (N=3) lines' worth of length in the Y direction and has a total length of three sectional ranges Ci (partial pixel rows) in the X direction. That is, each block image Bi is made up of (3×3) partial pixel rows.

For example, the three block images B1 to B3 each have a dimension (height) that corresponds to three (N) X-direction lines in the Y direction as illustrated in FIG. 8. The three block images B1 to B3 are arranged at different Y-direction positions. For example, the block image B1 is present at a Y-direction position that corresponds to the X-direction lines L1 to L3 in the input image, the block image B2 is present at a Y-direction position that corresponds to the X-direction lines L4 to L6 in the input image, and the block image B3 is present at a Y-direction position that corresponds to the X-direction lines L7 to L9 in the input image. The three block images B1 to B3 are also arranged at different X-direction positions. For example, the block image B1 is present at a X-direction position that corresponds to the sectional ranges C1 to C3 in the input image, the block image B2 is present at a X-direction position that corresponds to the sectional ranges C4 to C6 in the input image, and the block image B3 is present at a X-direction position that corresponds to the sectional ranges C7 to C9 in the input image.

Each block image Bi (for the oblique line E1) includes a plurality of partial pixel rows (here, three partial pixel rows) in the oblique line E1. For example, the block image B1 includes three partial pixel rows D11, D22, and D33 that are arranged in the first three different X-direction lines L1 to L3 in the input image. The block image B2 includes three partial pixel rows D44, D55, and D66 that are arranged in the next three different X-direction lines L4 to L6 in the input image. The block image B3 includes three partial pixel rows D77, D88, and D99 that are arranged in the next three different X-direction lines L7 to L9 in the input image.

In this way, the block images B1 to B3 (for the oblique line E1) are generated so as to include a plurality of partial pixel rows D99, D88, D77, D66, D55, D44, D33, D22, and D11 that make up the oblique line in the input image and that are arranged in stepwise form, spanning the plurality of X-direction lines (lines extending in the X direction) L1 to L9 in the input image.

While the stepwise portion (non-linear portion) of each deformed line Ei is made up of only an increment portion in the present example, the present invention is not limited to this example, and each deformed line E1 may be made up of only a stepwise portion that goes relatively downward toward the right (also referred to as a "decrement portion"). As another alternative, the stepwise portion may include both increment and decrement portions. As will be described later, each block image Bi is not always made up of (N×N) partial pixel rows, in particular in cases such as where the deformed line E1 includes both increment and decrement portions. In other words, the value Q relating to the size of the block image Bi may be different from the value N.

In the present example, the three (=9/N=9/3) block images B1 to B3 are formed for the oblique line E1 that is present in stepwise form over the nine different X-direction lines L1 to L9. However, the number of block images may be changed according to factors such as the oblique angle. When the oblique angle θ of the oblique line E1 is 1.5 degrees as described above, the oblique line E1 is present in stepwise form over the 180 different X-direction lines L1 to L180. In that case, 60 (=180/N=180/3) block images B1 to B60 are formed.

1-6. Correction Operation

Detection of Oblique Angle

Next, the details of the correction operation will be described. When an operator has pressed a start button while an original document is placed as illustrated in FIG. 5, the MFP 10 first performs the operation of detecting the oblique angle.

Specifically, the image reading unit 2 generates the oblique-angle detection image 303 (see FIG. 5) by repeatedly performing the operation of acquiring a line image that extends in the main scanning direction (X direction) while moving in the sub-scanning direction (Y direction) (while moving the reading unit 210). The range of motion (travel distance) of the reading unit 210 in the Y direction may be a relatively small range (distance), e.g., approximately 1 centimeters (cm), that is enough to detect the oblique angle. In other words, the length of the oblique-angle detection image 303 in the sub-scanning direction (Y direction) may be shorter than the length of the original document in the sub-scanning direction.

The detection unit 15 detects the boundary line (edge) of the original document and detects the oblique angle θ of the edge with respect to the main scanning direction on the basis of the oblique-angle detection image 303. To be more specific, the detection unit 15 obtains the (X, Y) coordinates of a plurality of points on the edge and detects the oblique angle θ on the basis of the coordinates of these points.

Start of Scan Operation

Then, the image reading unit 2 once returns the reading unit 210 to the origin position (reference position) in the sub-scanning direction (Y direction) in order to perform the operation of acquiring a scanned image. Thereafter, the image reading unit 2 starts a scan operation. Thus, the image capturing unit 215 sequentially images and captures a line image at each Y-direction position (image made up of a one-dimensional pixel raw (also referred to as a "line pixel row") extending in the X direction), starting from the origin position in the sub-scanning direction (Y direction).

Each line image (each line pixel row such as L1 and L2) captured by the image capturing unit 215 is sequentially output one line at a time to the SRAM 51. In the first embodiment, each line image (line pixel row) captured by the image capturing unit 215 is written in the as-is order (as a single line image) to continuous addresses (in the same line) in the SRAM 51 (see, for example, FIGS. 10 to 18). FIGS. 10 to 18 conceptually illustrate a state in which each line pixel row received from the image capturing unit 215 is accessed in the SRAM 51 and the DRAM 52. The upper section in the drawings illustrates access to the SRAM 51, and the lower section in the drawings illustrates access to the DRAM 52.

First and Second Lines

Figure 10:
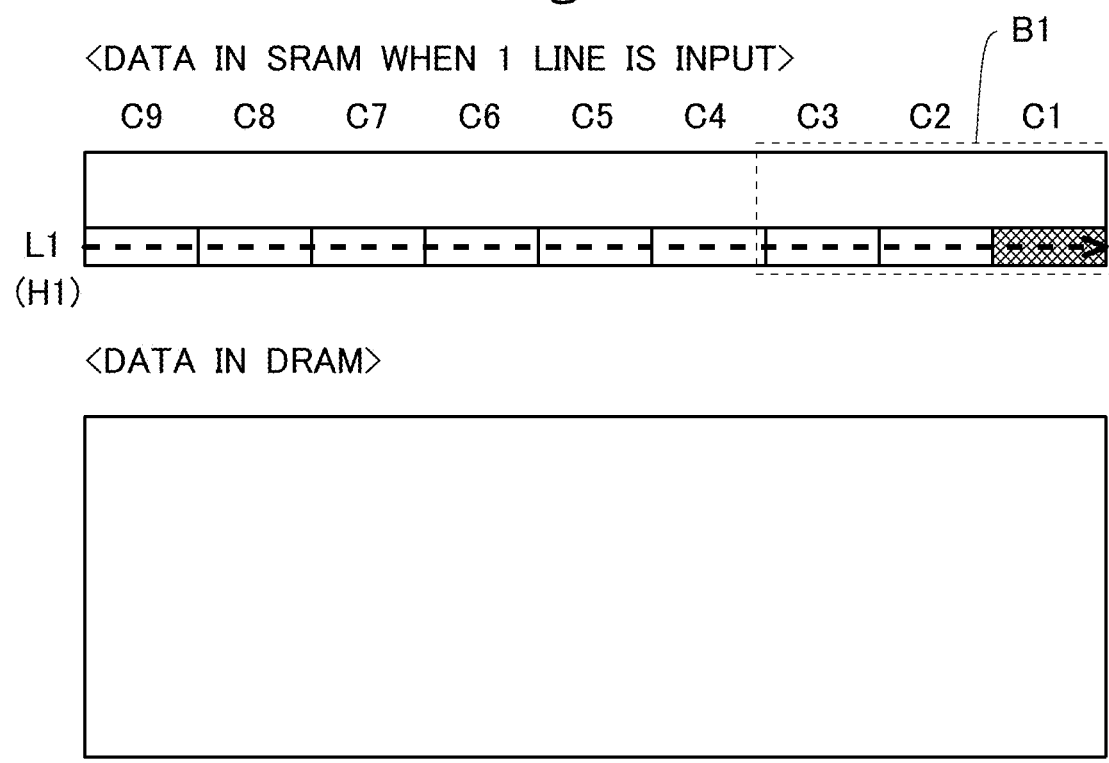
FIG. 10 illustrates processing performed on each line pixel row received from an image capturing unit.

For example, as illustrated in the upper section in FIG. 10, the first line pixel row L1 received from the image capturing unit 215 is written in the as-is order to continuous addresses (in the same line H1) that correspond to one X-direction line in the SRAM 51 (see the thick broken line in FIG. 10).

Figure 11:
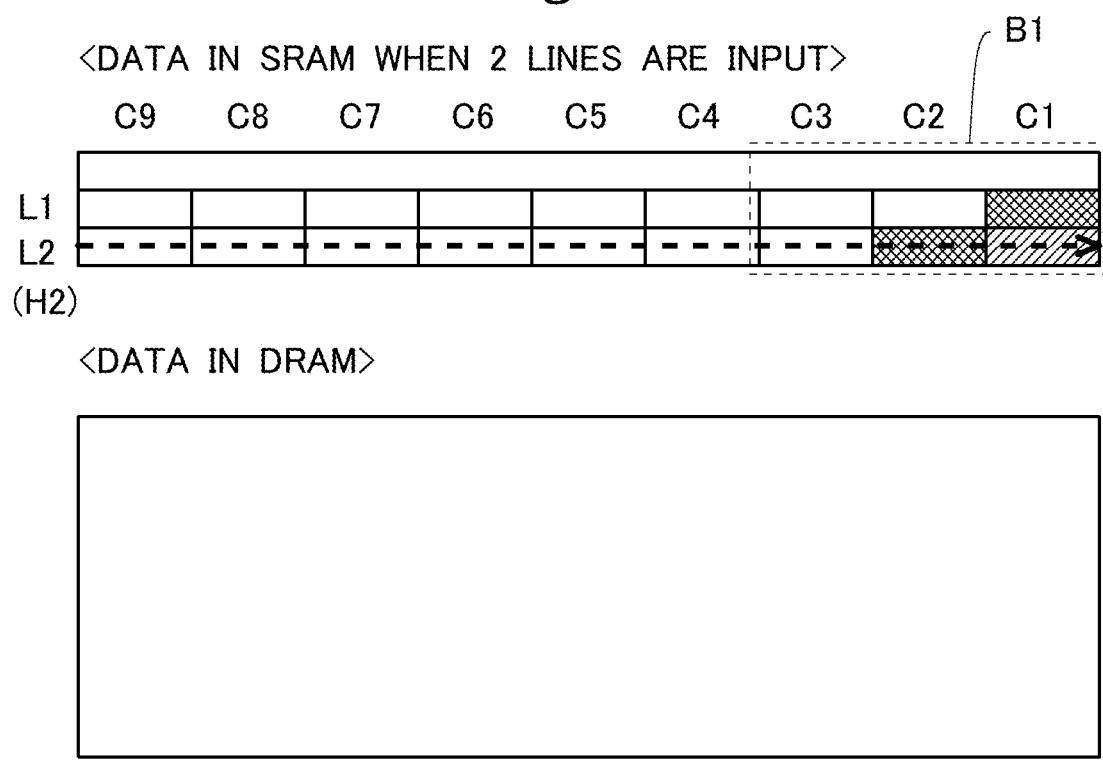
FIG. 11 illustrates processing performed on each line pixel row received from the image capturing unit.

The second line pixel row L2 received from the image capturing unit 215 is written in the as-is order to continuous addresses that correspond to one X-direction line in SRAM 51 as illustrated in the upper section in FIG. 11 (see the thick broken line in FIG. 11). At this time, the first line pixel row L1 is shifted to the line immediately above (the next line in the Y direction), so that the second line pixel row L2 is written to the X-direction line (H2) at a different Y-direction position from the Y-direction position of the first line pixel row L1 in the SRAM 51.

Third Line

Figure 9:
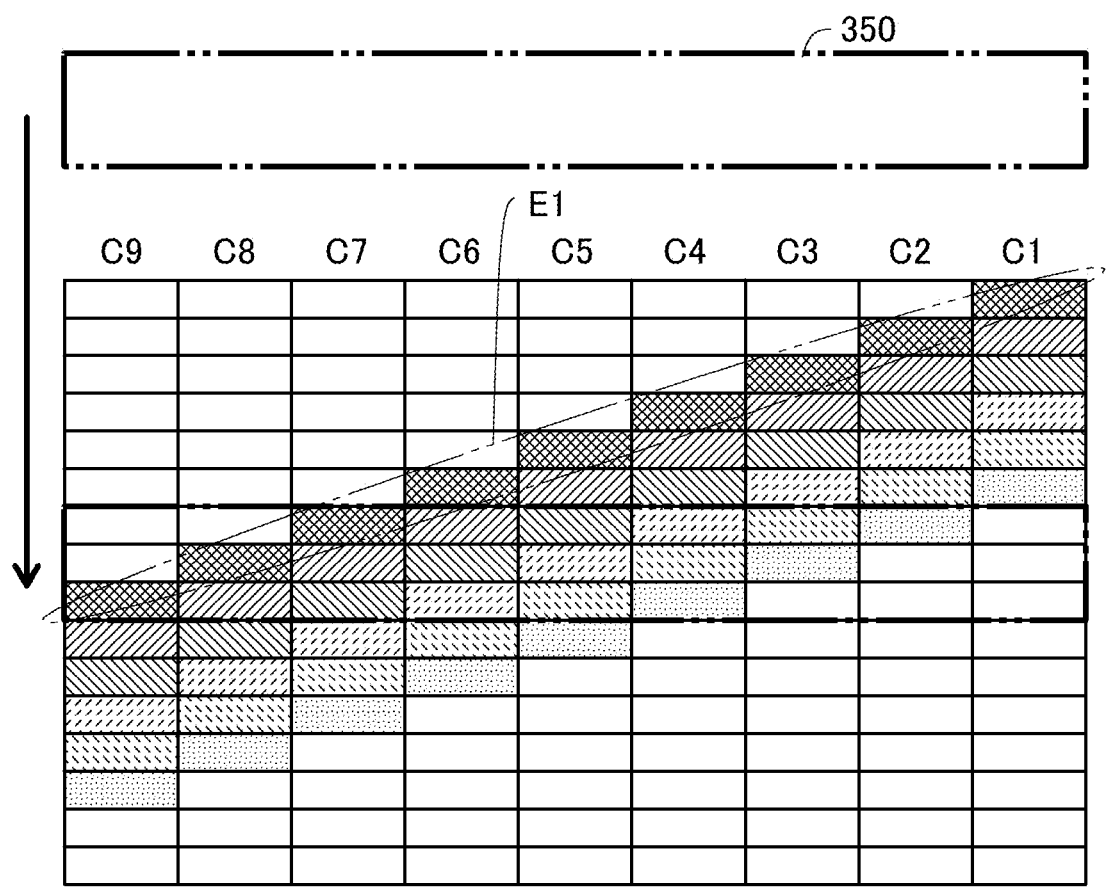
FIG. 9 is a conceptual diagram illustrating an area written to an SRAM.
Figure 12:
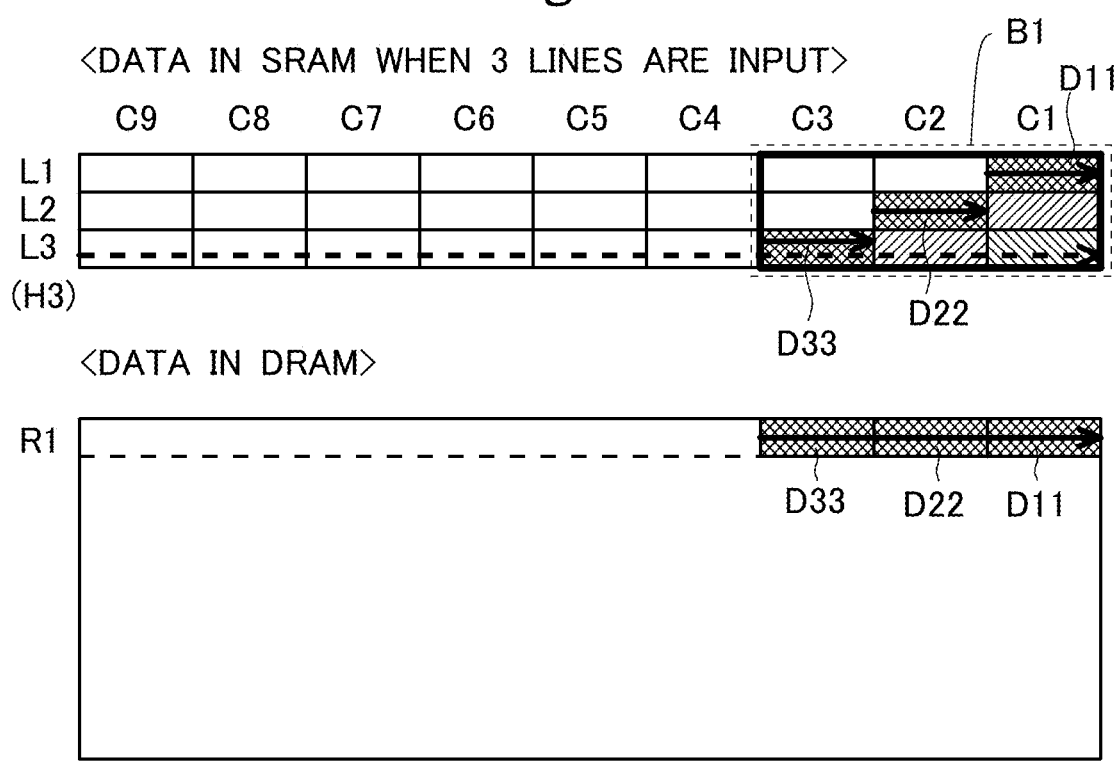
FIG. 12 illustrates processing performed on each line pixel row received from the image capturing unit.

The third line pixel row L3 received from the image capturing unit 215 is written in the as-is order to continuous addresses that correspond to one X-direction line in the SRAM 51 as illustrated in the upper section in FIG. 12 (see the thick broken line in FIG. 12). At this time, the first and second line pixel rows L1 and L2 are each shifted to the line immediately above (the next line in the Y direction), so that the third line pixel row L3 is written to the X-direction line (H3) at a different Y-direction position from the Y-direction positions of the first and second line pixel rows L1 and L2 in the SRAM 51. In the first embodiment, figuratively speaking, an area of the input image (see FIG. 6) that is surrounded by a window 350 of the same size as the SRAM 51 (size in the Y direction that corresponds to N line's worth of width) as illustrated in FIG. 9 is written to the SRAM 51 every time a plurality of line pixel rows L are acquired from the image capturing unit 215.

In this way, a plurality of line images (line pixel rows) captured by the image capturing unit 215 are sequentially written to the SRAM 51. At this time, each line pixel row Li is written in the as-is order (as a single line image) to continuous addresses in the SRAM 51. In other words, each line pixel row in the input image is written to each corresponding line in the SRAM 51 without being rearranged.

When the number of line images (the number of lines) received from the image capturing unit 215 has reached the number N of lines in the SRAM 51 (where N=3), the reading-out from the SRAM 51 is started. Hereinafter, the reading-out from the SRAM 51 is performed at the time when the writing of each line from the image capturing unit 215 to the SRAM 51 is completed. However, the processing for reading out the deformed line Ei is performed every time the reading-out of N lines is completed.

In the first embodiment, the rearrangement processing (intra-block rearrangement processing) using random access to the SRAM 51 is performed substantially at the time of the reading-out.

The "intra-block rearrangement processing" according to the first embodiment is performed at the time of the reading-out from the SRAM 51.

Referring to FIG. 12, when the three line images received from the image capturing unit 215 have been written to the SRAM 51 (see the upper section in FIG. 12), processing for rearranging a plurality of pixel groups (a plurality of partial pixel rows) in the block image B1 (for the deformed line E1).

Specifically, the plurality of partial pixel rows in the block image B1 (three partial pixel rows corresponding to three sectional ranges C1 to C3 (or three partial areas cross-hatched in FIG. 12) D33 (C3, L3), D22 (C2, L2), and D11 (C1, L1)) are continuously read out (see the arrows indicated by thick solid lines in the upper section in FIG. 12). In the present example, a partial pixel row Dij (Ci, Lj) is a partial row of pixels that are continuous in a line Lj and in a sectional range Ci in the original image, and may also be denoted as D (Ci, Lj) or simply as Dij. Each partial pixel row Dij may also be expressed as a partial row of pixels that are continuous in the X direction in the block to which the pixels belong.

The three partial pixel rows D33, D22, and D11 are partial pixel rows that are arranged at discontinuous addresses (in different X-direction lines) in the SRAM 51.

By continuously reading out the three partial pixel rows D33, D22, and D11 arranged at discontinuous addresses in the SRAM 51, the three partial pixel rows D33, D22, and D11 are serialized and aligned.

As a result of this rearrangement processing, serialized pixel rows (also referred to as "intra-block linear pixel rows") are generated in which the partial pixel rows D33, D22, and D11 in the block image B1 (for the oblique line E1) are rearranged so as to become continuous. The serialized pixel rows can also be expressed as pixel rows obtained by rearranging the partial pixel rows D33, D22, and D11 in the block image B1 so as to be linearly aligned.

As will be described later, the serialized pixel rows (partial pixel rows D33, D22, and D11) are used in correction processing relating to the first oblique line E1 in the original image (first X-direction line F1 obtained by correction).

Then, as illustrated in the lower section in FIG. 12, the partial pixel rows D33, D22, and D11 are written to continuous addresses (in the same line) in the DRAM 52 (see the arrow indicated by the thick solid line in the lower section in FIG. 12). Specifically, the partial pixel rows D33, D22, and D11 are written to continuous address areas that correspond to the three sectional ranges C3, C2, and C1 of a first line R1 in the DRAM 52.

Since the SRAM 51 is capable of higher-speed random access (access to discontinuous addresses; in the present example, processing for reading-out from discontinuous addresses) than the DRAM 52, the "intra-block rearrangement processing" using the SRAM 51 will be completed in an extremely short time.

Fourth Line

Figure 13:
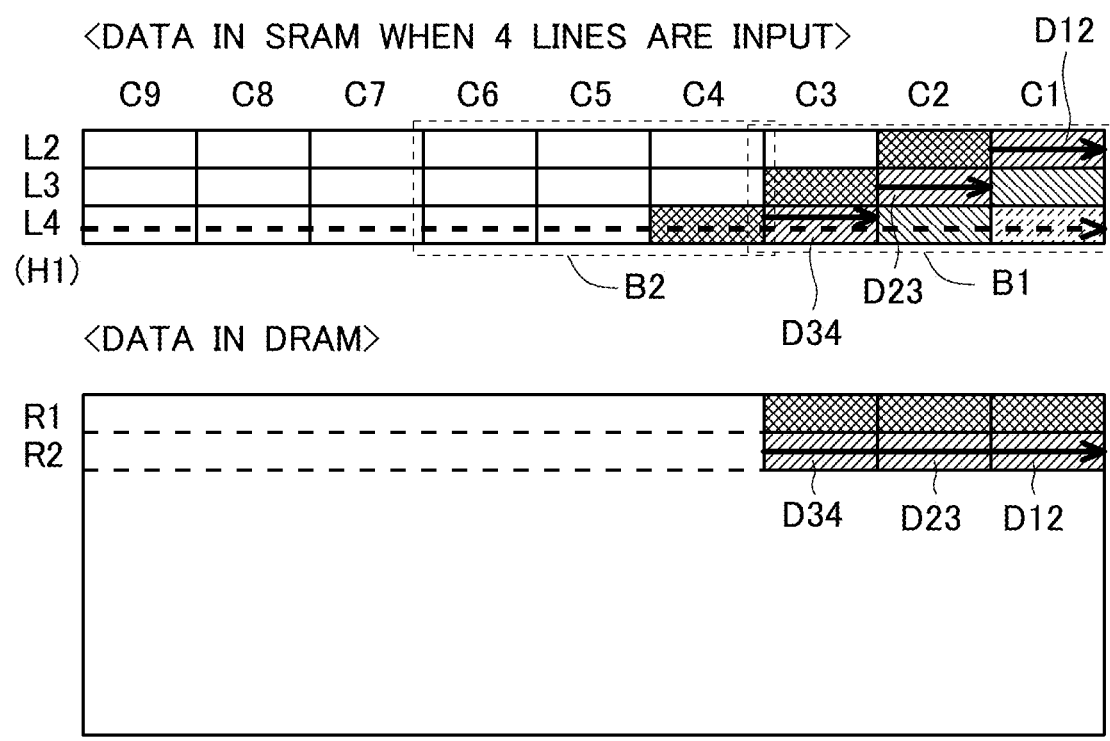
FIG. 13 illustrates processing performed on each line pixel row received from the image capturing unit.

Next, the fourth line pixel row L4 received from the image capturing unit 215 is written in the as-is order to continuous addresses that correspond to one X-direction line in the SRAM 51 as illustrated in the upper section in FIG. 13. At this time, the second and third line pixel rows L2 and L3 are each shifted to the line immediately above (the next line in the Y direction), so that the fourth line pixel row L4 is written to the X-direction line H1 at a different Y-direction position from the Y-direction positions of the second and third line pixel rows L2 and L3 in the SRAM 51. While, for the sake of convenience, each line pixel row (e.g., L1, L2, or L3) is expressed as having been shifted to the line immediately above (the next line in the Y direction), this does not mean the actual shift of each line pixel raw, and it is sufficient for each line pixel row to be theoretically (conceptually) shifted. For example, three line memories (H1, H2, and H3) in the SRAM 51 may be used in cycles for a large number of line images, which are sequentially acquired by the image capturing unit 215.

After the fourth line pixel row L4 has been written to the SRAM 51, "intra-block rearrangement processing" is performed at the time of reading-out from the SRAM 51.

Referring to FIG. 13, a plurality of partial pixel rows in the block image B1 (for the oblique line E2) (three partial pixel rows corresponding to the three sectional ranges C1 to C3; or three partial areas hatched with upward right oblique lines in FIG. 13) D34(C3, L4), D23(C2, L3), D12(C1, L2) are read out continuously. By continuously reading out the three partial pixel rows D34, D23, and D12 arranged at discontinuous addresses in the SRAM 51, the three partial pixel rows D34, D23, and D12 are serialized and aligned (linearly). As a result of this rearrangement processing, serialized pixel rows are generated from the partial pixel rows D34, D23, and D12 in the block image B1.

As will be described later, the serialized pixel rows (partial pixel rows D34, D23, and D12) are used in correction processing relating to the second oblique line E2 in the original image (second X-direction line F2 obtained by correction).

Then, as illustrated in the lower section in FIG. 13, the partial pixel rows D34, D23, and D12 are written to continuous addresses in the DRAM 52 (see the arrow indicated by the thick solid line in FIG. 13). Specifically, the partial pixel rows D34, D23, and D12 are written to continuous address areas that correspond to the three sectional ranges C3, C2, and C1 of a second line R2 in the DRAM 52.

Fifth Line

Figure 14:
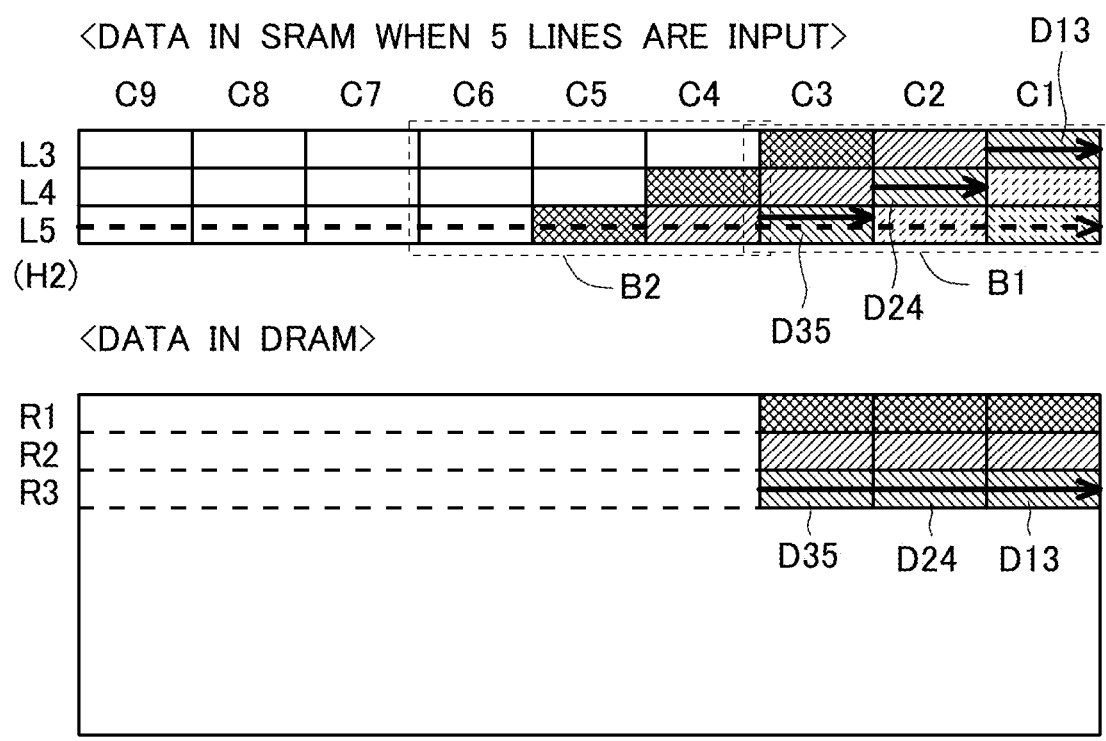
FIG. 14 illustrates processing performed on each line pixel row received from the image capturing unit.

Next, the fifth line pixel row L5 received from the image capturing unit 215 is written in the as-is order to continuous addresses that correspond to one X-direction line in the SRAM 51 as illustrated in the upper section in FIG. 14. At this time, the third and fourth line pixel rows L3 and L4 are each shifted to the line immediately above (the next line in the Y direction), so that the fifth line pixel row L5 is written to the X-direction line H2 at a different Y-direction position from the Y-direction positions of the third and fourth line pixel rows L3 and L4 in the SRAM 51.

Then, "intra-block rearrangement processing" is performed (substantially) at the time of reading-out from the SRAM 51.

Referring to FIG. 14, a plurality of partial pixel rows in the block image B1 (for the oblique line E3) (three partial pixel rows corresponding to the three partial sections C1 to C3; or three partial areas hatched with downward right oblique lines in FIG. 14) D35(C3, L5), D24(C2, L4), D13 (C1, L3) are read out continuously. By continuously reading out the three partial pixel rows D35, D24, and D13 arranged at discontinuous addresses in the SRAM 51, the three partial pixel rows D35, D24, and D13 are serialized and aligned. As a result of this rearrangement processing, serialized pixel rows are generated from the partial pixel rows D35, D24, and D13 in the block image B1.

Then, as illustrated in the lower section in FIG. 14, the partial pixel rows D35, D24, and D13 are written to continuous addresses in the DRAM 52 (see the arrow indicated by the thick solid line in FIG. 14). Specifically, the partial pixel rows D35, D24, and D13 are written to continuous address areas that correspond to the three sectional ranges C3, C2, and C1 of a third line R3 in the DRAM 52.

As will be described later, the serialized pixel rows (partial pixel rows D35, D24, and D13) are used in correction processing relating to the third oblique line E3 in the original image (third X-direction line F3 obtained by correction).

Sixth Line

Figure 15:
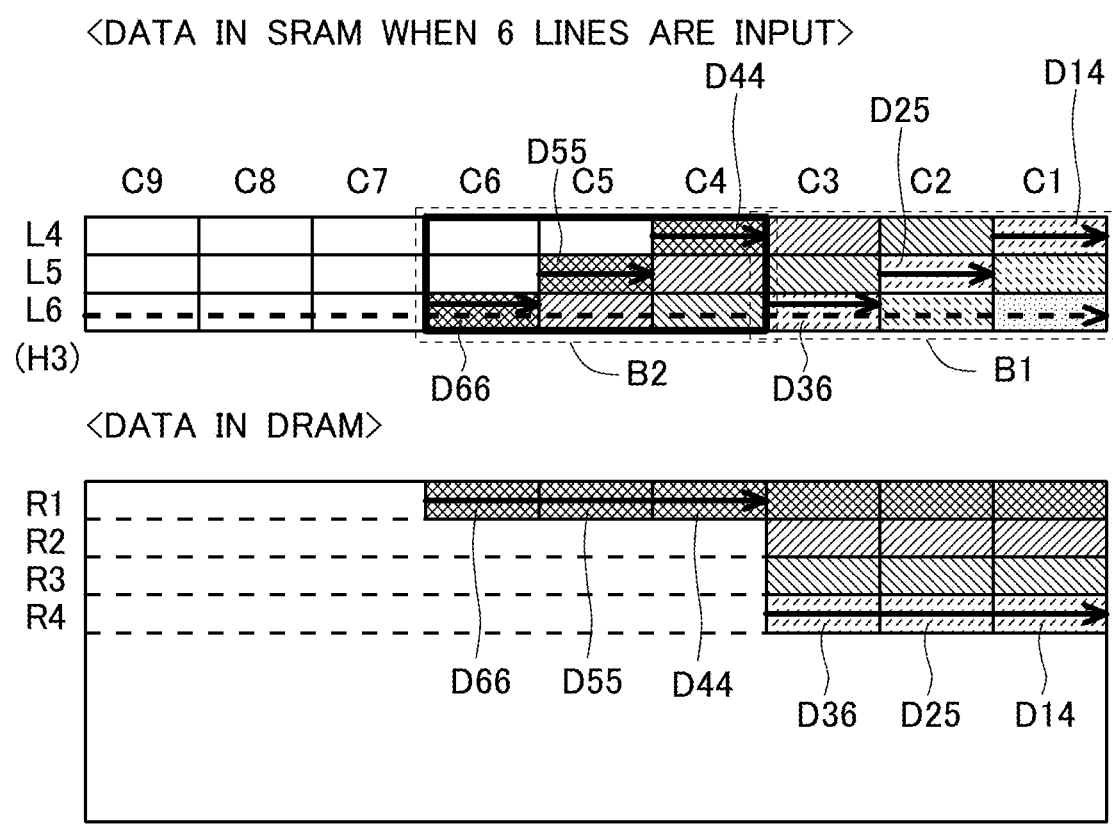
FIG. 15 illustrates processing performed on each line pixel row received from by the image capturing unit.

Next, the sixth line pixel row L6 received from the image capturing unit 215 is written in the as-is order to continuous addresses that correspond to one X-direction line in the SRAM 51 as illustrated in the upper section in FIG. 15 (see the thick broken lines in FIG. 15). At this time, the fourth and fifth line pixel rows L4 and L5 are each shifted to the line immediately above (next line in the Y direction), so that the sixth line pixel row L6 is written to the X-direction line H3 at a different Y-direction position from the Y-direction positions of the fourth and fifth line pixel rows L4 and L5 in the SRAM 51.

Then, "intra-block rearrangement processing" is performed at the time of reading-out from the SRAM 51.

Referring to FIG. 15, a plurality of partial pixel rows in the block image B1 (for the oblique line E4) (three partial pixel rows corresponding to the three sectional ranges C1 to C3; or three partial areas hatched with upward right broken lines in FIG. 15) D36(C3, L6), D25(C2, L5), D14(C1, L4) are continuously read out. By continuously reading out the three partial pixel rows D36, D25, and D14 arranged at discontinuous addresses in the SRAM 51, the three partial pixel rows D36, D25, and D14 are serialized and aligned. As a result of this rearrangement processing, serialized pixel rows are generated from the partial pixel rows D36, D25, and D14 in the block image B1.

Referring to FIG. 15, a plurality of partial pixel rows in the block image B2 (for the oblique line E1) (three partial pixel rows corresponding the three sectional ranges C4 to C6; or three partial areas cross-hatched in FIG. 15) D66(C6, L6), D55(C5, L5), and D44(C4, L4) are also continuously read out. By continuously reading out the three partial pixel rows D66, D55, and D44 arranged at discontinuous addresses in the SRAM 51, the three partial pixel rows D66, D55, and D44 are serialized and aligned. As result of this rearrangement processing, serialized pixel rows are generated from the partial pixel rows D66, D55, and D44 in the block image B2.

Then, as indicated in the lower section in FIG. 15, the partial pixel rows D36, D25, and D14 in the block image B1 (for the oblique line E4) are written to continuous addresses in the DRAM 52 (see the arrow indicated by the (right) thick solid line in the lower section in FIG. 15). Specifically, the partial pixel rows D36, D25, and D14 are written to continuous address areas that correspond to the three sectional ranges C3, C2, and C1 of a fourth line R4 in the DRAM 52.

Moreover, as indicated in the lower section in FIG. 15, the partial pixel rows D66, D55, and D44 in the block image B2 (for the oblique line E1) are written to continuous addresses in the DRAM 52 (see the arrow indicated by the (left) thick solid line in the lower section in FIG. 15). Specifically, the partial pixel rows D66, D55, and D44 are written to continuous address areas that correspond to the three sectional ranges C6, C5, and C4 of the first line R1 in the DRAM 52.

As will be described later, the serialized pixel rows (partial pixel rows D36, D25, and D14) in the block image B1 (for the oblique line E4) are used in correction processing relating to the fourth oblique line E4 in the original image (fourth X-direction line F4 obtained by correction). The serialized pixel rows (partial pixel rows D66, D55, and D44) in the block image B2 (for the oblique line E1) are used in correction processing relating to the first oblique line E1 in the original image (first X-direction line F1 obtained by correction).

Seventh and Eighth Lines

Thereafter, processing for writing the seventh line pixel row L7 received from the image capturing unit 215 to the SRAM 51 is performed as illustrated in FIG. 16 (see the thick broken lines in FIG. 16).

Then, "intra-block rearrangement processing" is performed at the time of reading-out from the SRAM 51. Specifically, three partial pixel rows D37(C3, L7), D26(C2, L6), and D15(C1, L5) in the block image B1 (for the oblique line E5) are continuously read out. By continuously reading out the three partial pixel rows D37, D26, and D15 arranged at discontinuous addresses in the SRAM 51, the three partial pixel rows D37, D26, and D15 are serialized and aligned into serialized pixel rows. Moreover, three partial pixel rows D67(C6, L7), D56(C5, L6), and D45(C4, L5) in the block image B2 (for the oblique line E2) are continuously read out. By continuously reading out the three partial pixel rows D67, D56, and D45 arranged at discontinuous addresses in the SRAM 51, the three partial pixel rows D67, D56, and D45 are serialized and aligned into serialized pixel rows.

Then, as illustrated in the lower section in FIG. 16, the partial pixel rows D37, D26, and D15 in the block image B1 (for the oblique line E5) are written to continuous address areas that correspond to the three sectional ranges C3, C2, and C1 of the fifth line R5 in the DRAM 52 (see the arrow indicated by the thick solid line in the lower section in FIG. 16). Moreover, as illustrated in the lower section in FIG. 16, the partial pixel rows D67, D56, and D45 in the block image B2 (for the oblique line E2) are written to continuous address areas that correspond to the three sectional ranges C6, C5, and C4 of the second line R2 in the DRAM 52 (see the arrow indicated by the solid line in the lower section in FIG. 16).

As will be described later, the serialized pixel rows (partial pixel rows D37, D26, and D15) in the block image B1 (for the oblique line E5) are used in correction processing relating to the fifth oblique line E5 in the original image (fifth X-direction line F5 obtained by correction), and the serialized pixel rows (partial pixel rows D67, D56, and D45) in the block image B2 (for the oblique line E2) are used in correction processing relating to the second oblique line E2 in the original image (second X-direction line F2 obtained by correction).

Thereafter, processing for writing the eighth line pixel row L8 received from the image capturing unit 215 to the SRAM 51 is performed as illustrated in FIG. 17 (see the thick broken lines in FIG. 17).

Then, "intra-block rearrangement processing" is performed at the time of reading-out from the SRAM 51. Specifically, three partial pixel rows D38(C3, L8), D27(C2, L7), and D16(C1, L6) in the block image B1 (for the oblique line E6) are continuously read out. By continuously reading out the three partial pixel rows D38, D27, and D16 arranged at discontinuous addresses in the SRAM 51, the three partial pixel rows D38, D27, and D16 are serialized and aligned into serialized pixel rows. Moreover, three partial pixel rows D68(C6, L8), D57(C5, L7), and D46(C4, L6) in the block image B2 (for the oblique line E3) are continuously read out. By continuously reading out the three partial pixel rows D68, D57, and D46 arranged at discontinuous addresses in the SRAM 51, the three partial pixel rows D68, D57, and D46 are serialized and aligned into serialized pixel rows.

Then, as illustrated in the lower section in FIG. 17, the partial pixel rows D38, D27, and D16 in the block image B1 (for the oblique line E6) are written to continuous address areas that correspond to the three sectional ranges C3, C2, and C1 of a sixth line R6 in the DRAM 52. Moreover, as illustrated in the lower section in FIG. 17, the partial pixel rows D68, D57, and D46 in the block image B2 (for the oblique line E3) are written to continuous address areas that correspond to the three sectional ranges C6, C5, and C4 of the third line R3 in the DRAM 52.

As will be described later, the serialized pixel rows (partial pixel rows D38, D27, and D16) in the block image B1 (for the oblique line E6) are used in correction processing relating to the sixth oblique line E6 in the original image (sixth X-direction line F6 obtained by correction), and the serialized pixel rows (partial pixel rows D68, D57, and D46) in the block image B2 (for the oblique line E3) are used in correction processing relating to the third oblique line E3 in the original image (third X-direction line F3 obtained by correction).

Ninth Line

Thereafter, processing for writing the ninth line pixel row L9 received from the image capturing unit 215 to the SRAM 51 is performed as illustrated in FIG. 18 (see the thick broken lines in FIG. 18).

Then, "intra-block rearrangement processing" is performed at the time of reading-out from the SRAM 51.

Specifically, three partial pixel rows D39(C3, L9), D28(C2, L8), and D17(C1, L7) in the block image B1 (for the oblique line E7) are continuously read out. By continuously reading out the three partial pixel rows D39, D28, and D17 arranged at discontinuous addresses in the SRAM 51, the three partial pixel rows D39, D28, and D17 are serialized and aligned into serialized pixel rows.

Also, three partial pixel rows D69(C6, L9), D58(C5, L8), and D47(C4, L7) in the block image B2 (for the oblique line E4) are continuously read out. By continuously reading out the three partial pixel rows D69, D58, and D47 arranged at discontinuous addresses in the SRAM 51, the three partial pixel rows D69, D58, and D47 are serialized and aligned into serialized pixel rows.

Moreover, three partial pixel rows D99(C9, L9), D88(C8, L8), and D77(C7, L7) in the block image B3 (for the oblique line E1) are continuously read out. By continuously reading out the three partial pixel rows D99, D88, and D77 arranged at discontinuous address in the SRAM 51, the three partial pixel rows D99, D88, and D77 are serialized and aligned into serialized pixel rows.

As a result of this "intra-block rearrangement processing" performed for each of the block images B1, B2, and B3, a plurality of partial pixel rows arranged in stepwise form in each block image Bi is linearly aligned into serialized pixel rows.

Then, when the processing for reading out the nine lines L1 to L9 including the deformed line E1 has been performed, "inter-block rearrangement processing" is started. The "inter-block rearrangement processing" is performed using the DRAM 52. Specifically, at the time of writing to the DRAM 52, random access to the DRAM 52 is used to write each serialized pixel row to a corresponding address at each target position after the rearrangement processing of the serialized pixel rows, the serialized pixel rows having been generated by the intra-block rearrangement processing (described above) performed at the time of reading-out from the SRAM 51.

Specifically, as illustrated in the lower section in FIG. 18, the serialized pixel rows (partial pixel rows D99, D88, and D77) in the block image B3 (for the oblique line E1) are written to continuous address areas that correspond to the three sectional ranges C9, C8, and C7 of the first line R1 in the DRAM 52. These serialized pixel rows (D99, D88, and D77) are used in "inter-block rearrangement processing" relating to the oblique line E1. The first X-direction line R1 (and the sectional ranges C9, C8, and C7) in the DRAM 52 is a target position of the serialized pixel rows (D99, D88, D77).

Similarly, the serialized pixel rows (partial pixel rows D39, D28, and D17) in the block image B1 (for the oblique line E7) are written to continuous address areas that correspond to the three sectional ranges C3, C2, and C1 of a seventh line R7 in the DRAM 52. This serialized pixel rows (D39, D28, D17) are used in "inter-block rearrangement processing" relating to the oblique line E7. The seventh X-direction line R7 (and the sectional ranges C3, C2, and C1) in the DRAM 52 is a target position of the serialized pixel rows (D39, D28, D17) in the "inter-block rearrangement processing" relating to the oblique line E7.

Moreover, the serialized pixel rows (partial pixel rows D69, D58, and D47) in the block image B2 (for the oblique line E4) are written to continuous address areas that correspond to the three sectional ranges C6, C5, and C4 of the fourth line R4 in the DRAM 52. This serialized pixel rows (D69, D58, D47) are used in "inter-block rearrangement processing" relating to the oblique line E4. The fourth X-direction line R4 (and the sectional ranges C6, C5, and C4) in the DRAM 52 is a target position of the serialized pixel rows (D69, D58, D47) in the "inter-block rearrangement processing" relating to the oblique line E4.

Here, the partial pixel rows D33, D22, and D11 in the original image have already been serialized by the intra-block rearrangement processing (see FIG. 12) performed using the SRAM 51 at the time of input of the third line L3 from the image capturing unit 215 and have already been written to the sectional ranges C3 to C1 of the first line R1 in the DRAM 52. That is, the partial pixel rows D33, D22, and D11 have been serialized by the rearrangement processing (see FIG. 12) performed in the block image B1 at the time of input of the line L3. In this way, the serialized pixel rows (D33, D22, D11) have already been written to their target positions, specifically, the first X-direction line R1 (and the sectional ranges C3, C2, and C1) in the DRAM 52.

Moreover, the partial pixel rows D66, D55, and D44 in the original image have already been serialized by the intra-block rearrangement processing (see FIG. 15) performed using the SRAM 51 at the time of input of the sixth line L6 from the image capturing unit 215 and have already been written to the sectional ranges C6 to C4 of the first line R1 in the DRAM 52. That is, the partial pixel rows D66, D55, and D44 have been serialized by the rearrangement processing (see FIG. 15) performed in the block image B2 at the time of input of the line L6. In this way, the serialized pixel rows (D66, D55, D44) have already been written to their target positions, specifically, the first X-direction line R1 (and the sectional ranges C6, C5, and C4) in the DRAM 52.

Thus, each serialized pixel row generated by the intra-block rearrangement processing (described above) performed at the time of reading-out from the SRAM 51 has already been written to a corresponding address at its target position after the rearrangement processing of the serialized pixel row. Specifically, the three serialized pixel rows (D99, D88, D77), (D66, D55, D44), and (D33, D22, D11) have already been written to their target positions in the DRAM 52. These target positions are positions in the same line R1 in the DRAM 52. In other words, the three serialized pixel rows relating to the oblique line E1 in the pre-correction image are continuously arranged in the single X-direction line R1 in the DRAM 52 by using random access in units of block images. To be more specific, the plurality of partial pixel rows D99, D88, D77, D66, D55, D44, D33, D22, and D11 that constitute the oblique line E1 in the original image have been serialized and written to the sectional ranges C9 to C1 of the first line R1 in the DRAM 52. In this way, the "inter-block rearrangement processing" is performed substantially at the time of writing to the DRAM 52.

Then, at the time of reading-out from the DRAM 52, a plurality of serialized pixel rows arranged in the same line in the DRAM 52 are read out from the same line (to be more specific, read out from continuous addresses in the same line). Specifically, continuous pixels in the first X-direction line R1 in the DRAM 52 are read out across all of the sectional ranges C9 to C1. In other words, a group of continuous pixels in the sectional ranges C9 to C1 of the first line R1 in the DRAM 52 are read as-is (which is not random access). As a result, a single line image (corrected line image) is generated in which a plurality of serialized pixel rows are rearranged so as to be linearly aligned. That is, the oblique line E1 in the pre-correction image is read out while having been converted into a group of pixels (new line F1) arranged continuously in the single X-direction line R1.

Thus, the line image of the oblique line E1 (constituted by the partial pixel rows D99, D88, D77, D66, D55, D44, D33, D22, and D11) is arranged in the same line in the DRAM 52 and can be read out at high speed from the DRAM 52 (without requiring random access) and output to the downstream processing unit 250.

The "inter-block rearrangement processing" can also be expressed as rearrangement processing for linearly aligning a plurality of intra-block linear pixel rows (plurality of serialized pixel rows), each being a row of pixels linearly aligned in a block image to which the pixels belong, and the intra-block linear pixel rows being aligned nonlinearly among a plurality of block images B.

Figure 19:
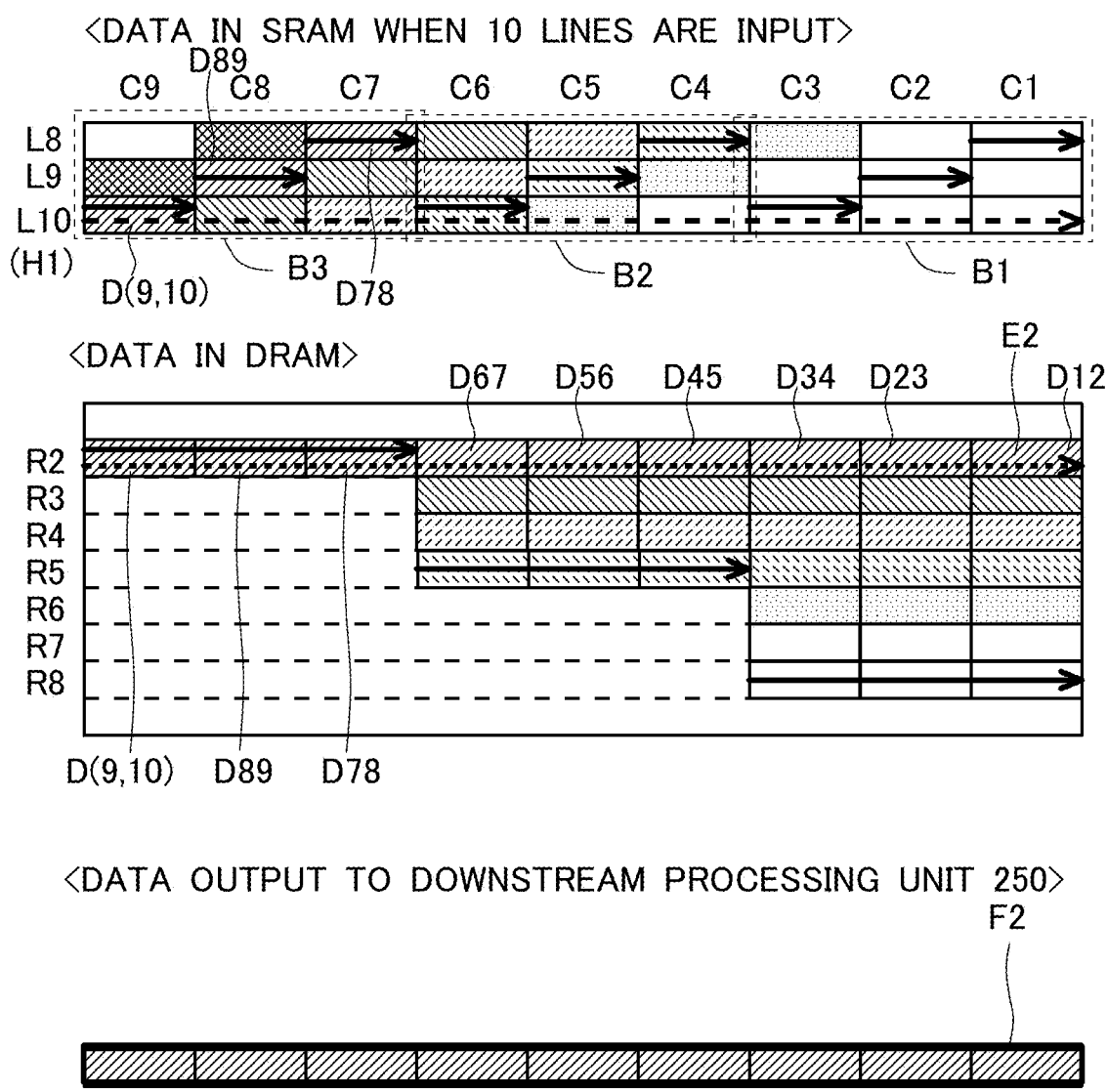
FIG. 19 illustrates processing performed on each line pixel row received from by the image capturing unit.

Thereafter, the second line F2 is also sequentially output as illustrated in FIG. 19.

Specifically, processing for writing the tenth line pixel row L10 received from the image capturing unit 215 to the SRAM 51 is performed.

Then, "intra-block rearrangement processing" is performed at the time of reading-out from the SRAM 51. Specifically, the "intra-block rearrangement processing" is performed by continuously reading out a plurality of partial pixel rows arranged in different lines (at different Y-direction positions) in each block image Bi in the SRAM 51 (a plurality of discontinuous partial pixel rows) by using random access to the SRAM 51.

Moreover, "inter-block rearrangement processing" is performed at the time of writing to the DRAM 52. Specifically, continuous pixel rows in units of blocks, which are read out from the SRAM 51, are written to their target positions in the same line in the DRAM 52.

Thereafter, the second line F2 is output by sequentially reading out the plurality of partial pixel rows (see the diagonally upward hatched portion in FIG. 19) as-is, the partial pixel rows having continuously been written in all of the sectional ranges C of the single X-direction line R2 in the DRAM 52 by the "inter-block rearrangement processing" performed at the time of writing. The partial pixel rows are constituted by D(C9, L10), D89(C8, L9), D78(C7, L8), D67(C6, L7), D56(C5, L6), D45(C4, L5), D34(C3, L4), D23(C2, L3), and D12(C1, L2).

In this way, the oblique line E2 in the pre-correction image is read out while having been converted into a group of pixels (new line F2) arranged continuously in the single X-direction line R2.

Line images corresponding to the third line F3 and subsequent lines are also sequentially output.

Summary

According to the embodiment as described above, the "intra-block rearrangement processing" using the SRAM 51 and the "inter-block rearrangement processing" using the DRAM 52 are combined to correct the obliqueness of the oblique line E1 in the pre-correction image and generate the new line F1 (line parallel to the main scanning direction or X direction).

To be more specific, the intra-block rearrangement processing relating to each of the block images B1, B2, B3 (for the oblique line E1) (see FIGS. 12, 15, and 18) is performed using the SRAM 51. The intra-block rearrangement processing is primarily performed at the time of reading-out from the SRAM 51. Specifically, a plurality of partial pixel rows D arranged in different lines in each block image Bi are sequentially read out by using random access, and thereby rearranged so as to be linearly aligned into a serialized pixel row. For example, the partial pixel rows D99, D88, and D77 arranged in the different lines L9, L8, and L7 in the block image B3 are sequentially read out by using random access so as to be linearly aligned into a serialized pixel row (see FIGS. 8 and 18). The same applies to the other block images B2 and B1. As a result, the serialized pixel row of the partial pixel rows D66, D55, and D44 and the serialized pixel row of the partial pixel rows D33, D22, and D11 are generated.

Moreover, the rearrangement processing (inter-block rearrangement processing; rearrangement processing performed in units of blocks) for rearranging the block images B1, B2, and B3 (for the oblique line E1) (see FIGS. 12, 15, and 18) is performed using the DRAM 52 (see FIG. 18). The inter-block rearrangement processing is primarily performed at the time of writing to the DRAM 52. Specifically, the processing for further rearranging a plurality of serialized pixel rows generated by the rearrangement performed in units of blocks (inside each block) is performed using the DRAM 52 for the block images B1, B2, and B3 (for the oblique line E1). To be more specific, each serialized pixel row generated by the intra-block rearrangement processing using the SRAM 51 is written to a corresponding address at its target position (e.g., in the same line R1 in the DRAM 52) by using random access to the DRAM 52. Then, the serialized pixel rows arranged in the same line in the DRAM 52 at different times for the block images B1 to B3 are sequentially read out. As a result, the single line image F1 is generated in which the serialized pixel rows are rearranged so as to be linearly aligned. In this way, the obliqueness of the oblique line E1 is corrected, and the new line F1 (line image obtained by correcting the oblique line E1) is generated.

Here, an increase in cost can be suppressed because the memory capacity of the SRAM 51 is smaller than the memory capacity of the DRAM 52. To be more specific, installing the SRAM 51 that has an N line images' (e.g., 3 line images') worth of memory capacity and the DRAM 52 that has an M line images' (e.g., 200 line images') worth of memory capacity costs less than installing an SRAM 51 that has an M line images' (200 line images') worth of memory capacity. To be more specific, even if another SRAM 51's worth of extra memory capacity is installed, the cost can be reduced more than in the case where all memory capacities are prepared with the SRAM 51.

The rearrangement processing (intra-block rearrangement processing) relating to a group of pixels in each of a plurality of block images generated on the basis of the input image is performed using random access to the SRAM 51. Following this, the number of random accesses to the DRAM 52 is reduced to 1/N (one N-th). For example, the number of random accesses to the DRAM 52 is reduced to ⅓, where N=3. Thus, the rearrangement processing (serialization processing) can be executed at a relatively high speed.

To be more specific, although nine random accesses are made to the SRAM 51 in order to output the single new line F1, the number of random accesses to the DRAM 52 is suppressed to three as illustrated in, for example, FIGS. 18 and 8. Besides, random access to the SRAM 51 is extremely faster than random access to the DRAM 52. In other words, the relatively high-speed SRAM 51 is used for a relatively large number of random accesses relating to the intra-block rearrangement processing, and the relatively low-speed DRAM 52 is used for a relatively small number of random accesses relating to the inter-block rearrangement processing. With this operation, high-speed rearrangement processing (serialization processing) can be implemented, as compared to the case where nine random accesses are made to the DRAM 52 (i.e., the relatively low-speed DRAM 52 is used for a relatively large number of random accesses).

This effect is even more remarkable when the oblique angle θ of the oblique line E1 is relatively large. For example, when the oblique angle θ of the oblique line E1 is 1.5 degrees as described above, the width of the obliqueness corresponds to approximately 180 lines, and the oblique line E1 is present in stepwise form, spanning a relatively large number of X-direction lines (specifically, 180 X-direction lines L1 to L180). Although 180 random accesses are made to the SRAM 51 in order to output the single new line F1, the number of random accesses to the DRAM 52 can be suppressed to 60. The period of time required for 180 random accesses to the SRAM 51 and 60 random accesses to the DRAM 52 is extremely shorter than the period of time required for 180 random accesses to the DRAM 52. In other words, the period of time required for 180 random accesses to the SRAM 51 is extremely shorter than the period of time required for 120 random accesses to the DRAM 52.

Figure 20:
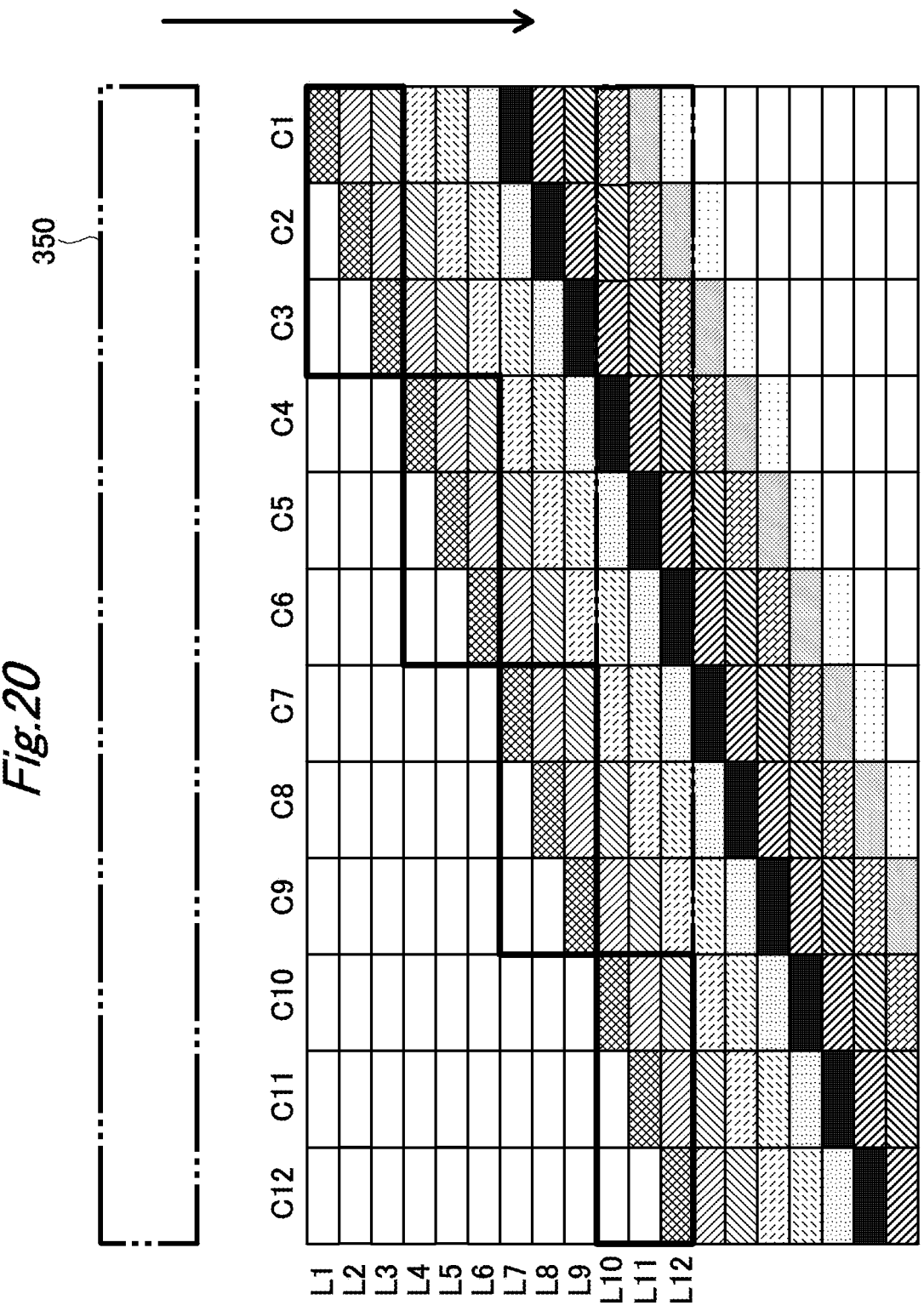
FIG. 20 illustrates an input image according to a variation.
Figure 21:
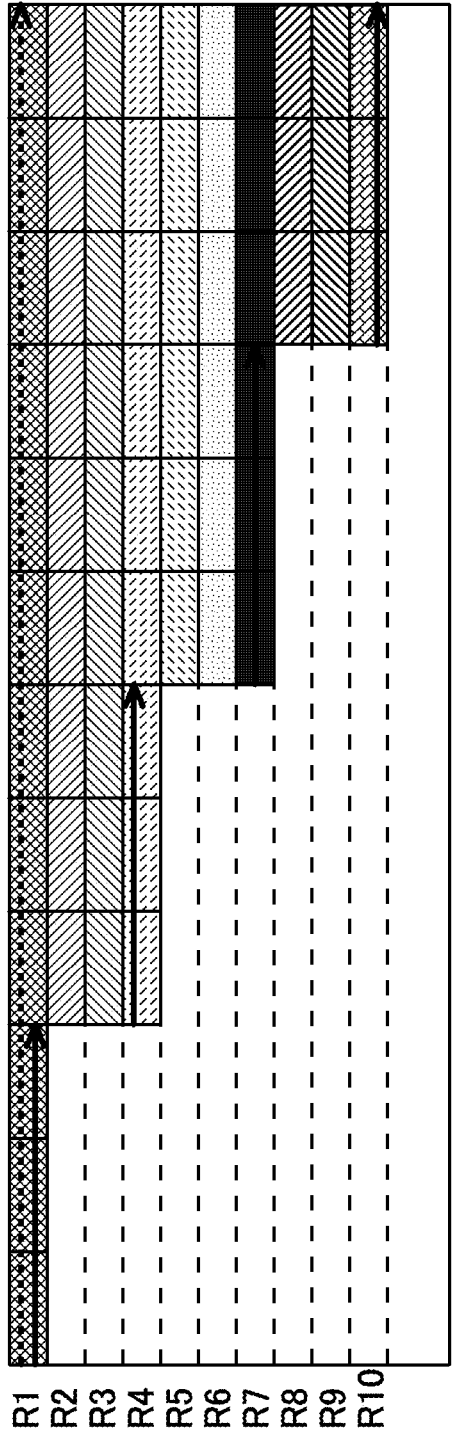
FIG. 21 illustrates processing performed on the input image according to the variation.

In the above-described embodiment, when the oblique line E1 is present in stepwise form, spanning the nine X-direction lines L1 to L9 as illustrated in FIG. 8, the new line F1 corresponding to the first oblique line E1 is output at the time when the nine line pixel rows have been read out from the image capturing unit 215. For example, when the oblique line E1 is present in stepwise form, spanning 12 X-direction lines L1 to L12 as illustrated in FIG. 20, the new line F1 corresponding to the first oblique line E1 will be output at the time when 12 line pixel rows have been read out from the image capturing unit 215 (see also FIG. 21). Similarly, when the oblique line E1 is present in stepwise form, spanning 180 X-direction lines L1 to L180, the new line F1 corresponding to the first oblique line E1 will be output at the time when 180 line pixel rows have been read out from the image capturing unit 215.

While the above-described embodiment illustrates an example of the case where N=3, the present invention is not limited to this example. For example, the number N of lines in the SRAM 51 may be two, or may be four or more (natural number). It is however noted that the processing speed increases as the number N of lines in the SRAM 51 increases. For example, consider a case where N=6 and $\theta$=1.5 degrees. Although 180 random accesses are made to the SRAM 51 (as in the above-described embodiment) in order to output the single new line F1, the number of random accesses to the DRAM 52 is further suppressed to 30 (from 60). This further increase the processing speed.

While the above-described embodiment illustrates a mode in which a scan operation is performed on an original document placed on the platen glass 244, the present invention is not limited to this example. For example, the present invention is also applicable to the case of reading an original document with an auto document feeder (ADF). Similar modifications are also possible for the other embodiments.

2. Second Embodiment

2-1. Overview

A second embodiment is a variation of the first embodiment. The following description focuses on differences from the first embodiment.

While the above-described first embodiment takes an example of SRAM read-time correction and DRAM write-time correction (see FIGS. 7 and 8), the present invention is not limited to this example.

Figure 22:
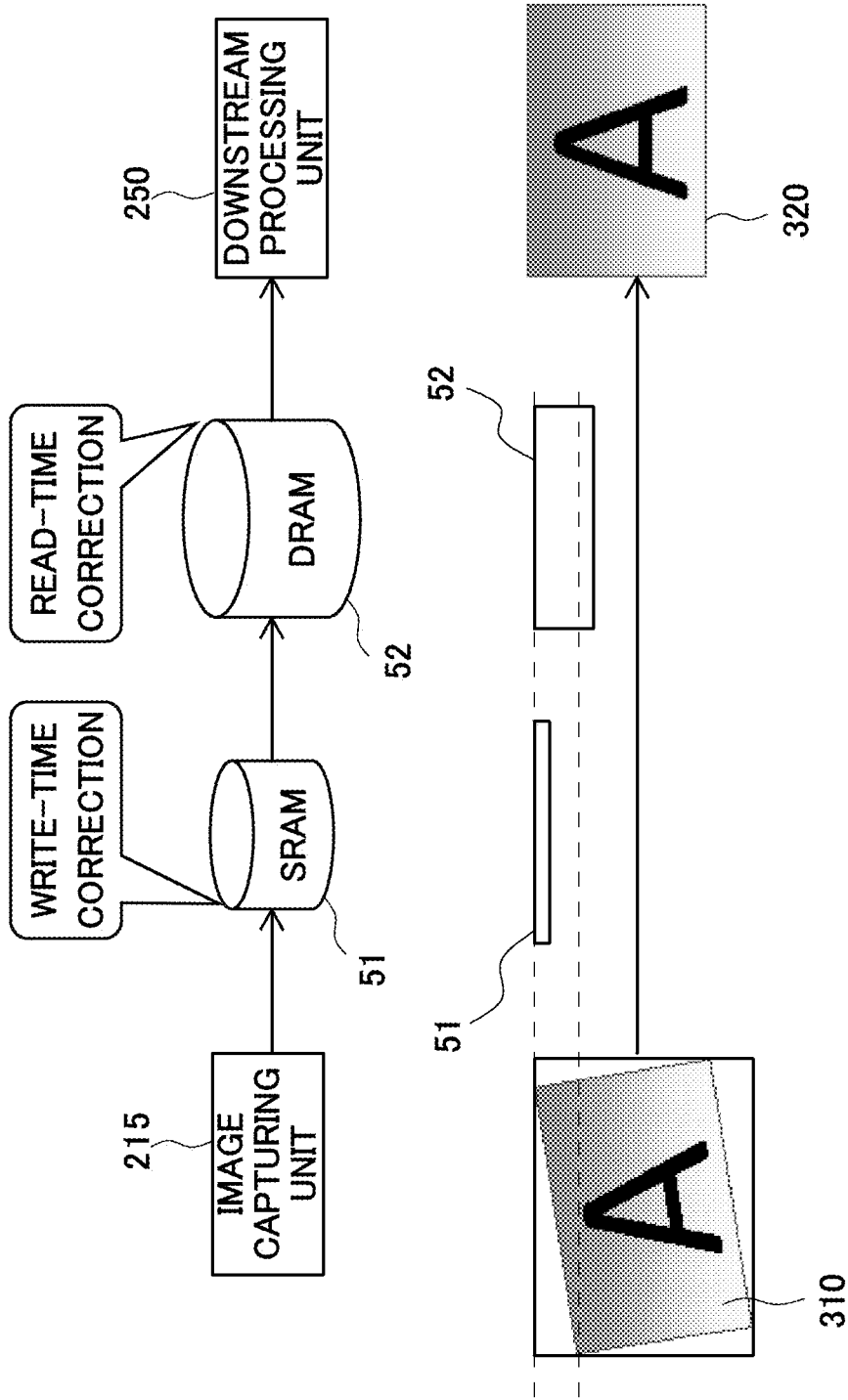
FIG. 22 illustrates an overview of a second embodiment.

In the second embodiment, the first rearrangement processing P1 ("intra-block rearrangement processing") is performed substantially at the time of writing to the SRAM 51 (at the write time) as illustrated in FIG. 22, and the second rearrangement processing P2 ("inter-block rearrangement processing") is performed substantially at the time of reading-out from the DRAM 52 (at the read time). In short, SRAM write-time correction and DRAM read-time correction are performed (in this order) according to the second embodiment.

Figure 23:
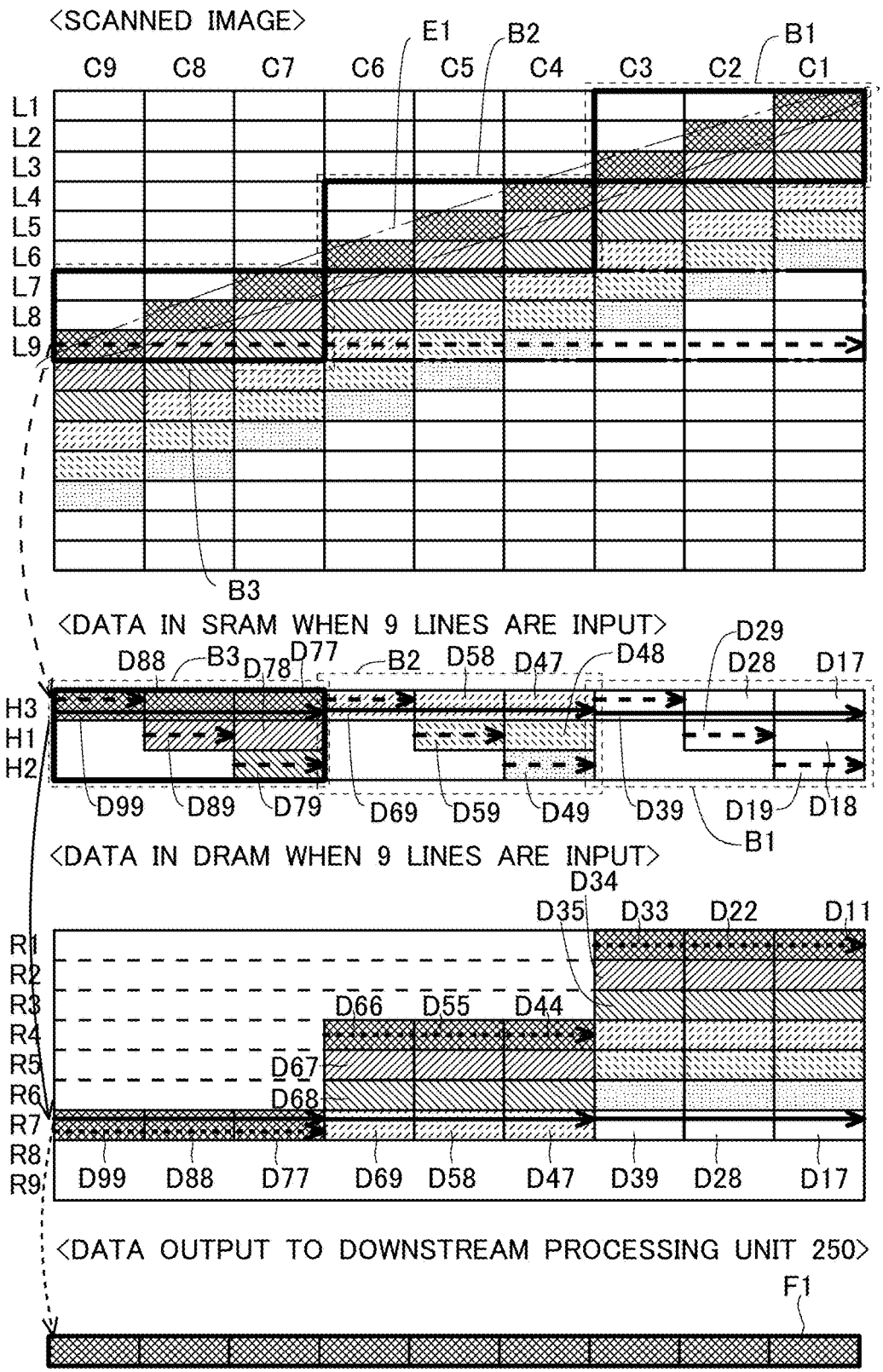
FIG. 23 is a descriptive diagram illustrating a rearrangement operation according to the second embodiment.

More specifically, in the above-described first embodiment, the "intra-block rearrangement processing" using the SRAM 51 is performed at the read time from the SRAM 51 (see the arrows indicated by thick solid lines in the SRAM 51 in FIG. 8). In contrast, in the second embodiment, the "intra-block rearrangement processing" using the SRAM 51 is performed at the time of writing to the SRAM 51 (see the arrows indicated by broken lines in the SRAM 51 in FIG. 23). FIG. 23 is a conceptual diagram illustrating operations according to the second embodiment.

In the above-described first embodiment, the "inter-block rearrangement processing" using the DRAM 52 is performed at the time of writing to the DRAM 52 (see the arrows indicated by thick solid lines in the DRAM 52 in FIG. 8). In contrast, in the second embodiment, the "inter-block rearrangement processing" using the DRAM 52 is performed at the read time from the DRAM 52 (see the arrows indicated by dotted lines in the DRAM 52 in FIG. 23).

2-2. Detailed Operations

In the second embodiment, when the image reading unit 2 has started a scan operation after detection of the oblique angle $\theta$, operations as illustrated in FIGS. 24 to 32 are performed, instead of the operations illustrated in FIGS. 10 to 18.

In the above-described first embodiment, all pixel rows of each line image (e.g., each line pixel row L1 or L2) captured by the image capturing unit 215 are written in the as-is order (as a single line image) to continuous addresses in the SRAM 51 (see the arrow indicated by the broken line in the SRAM 51 in FIG. 8).

In the second embodiment, on the other hand, each partial pixel row in each line image (e.g., each line pixel row L1 or L2) captured by the image capturing unit 215 is written to a corresponding address at its target position after the rearrangement processing of the partial pixel row by using random access to the SRAM 51. In the rearrangement processing using the SRAM 51, each partial pixel row in each block image Bi is written to a corresponding address at its target position after the rearrangement processing of the partial pixel row (see the arrows indicated by broken lines in the SRAM 51 in FIG. 23).

Hereinafter, these operations will be described in more detail.

First and Second Lines

Figure 24:
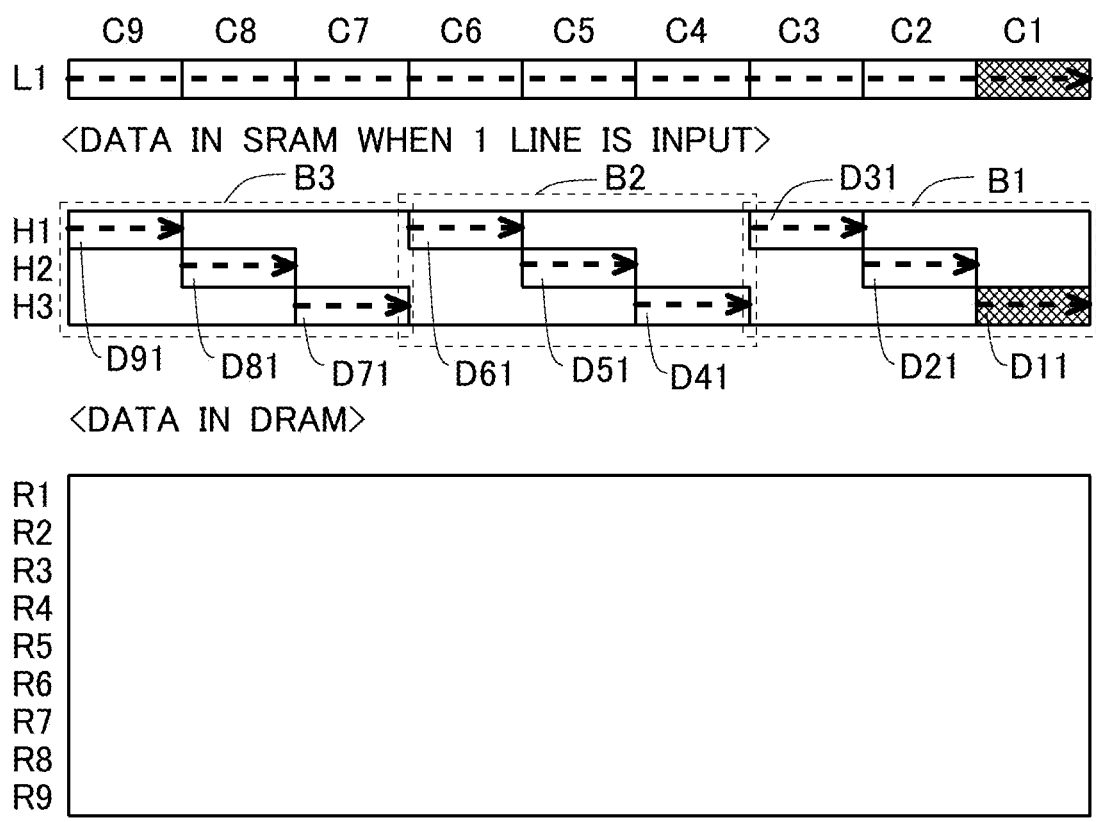
FIG. 24 illustrates processing performed on each line pixel row.

For example, a plurality of different partial pixel rows in the first line pixel row L1 (see the uppermost pixel row in FIG. 24) received from the image capturing unit 215 are written to discontinuous positions (in different lines) in the SRAM 51 as illustrated in FIG. 24 (see thick broken lines in the middle section in FIG. 24).

More specifically, as to a block image B1 (for the oblique line E1), a partial pixel row D11(C1, L1) in the sectional range C1 of the first line pixel row L1 is written to the sectional range C1 of a third line H3 in the SRAM 51. The sectional range C1 of the third line H3 in the SRAM 51 is a target position for the partial pixel row D11. A partial pixel row D21(C2, L1) is written to the sectional range C2 of a second line H2 in the SRAM 51. A partial pixel row D31(C3, L1) is written to the sectional range C3 of a first line H1 in the SRAM 51.

In this way, the different partial pixel rows D31, D21, and D11 in the first line pixel row L1 (see the uppermost pixel row in FIG. 24) are written to discontinuous positions in the SRAM 51 (see thick broken lines in FIG. 24). To be more specific, a plurality of partial pixel rows D in each block image of the X-direction line pixel row L1 are rearranged so as to correct the oblique angle $\theta$ for each block image and arranged in stepwise form (reverse stepwise form) along the reverse angle $\theta$.

Similar rearrangement operations may be performed for partial pixel rows D91, D81, and D71 and partial pixel rows D61, D51, and D41.

Figure 25:
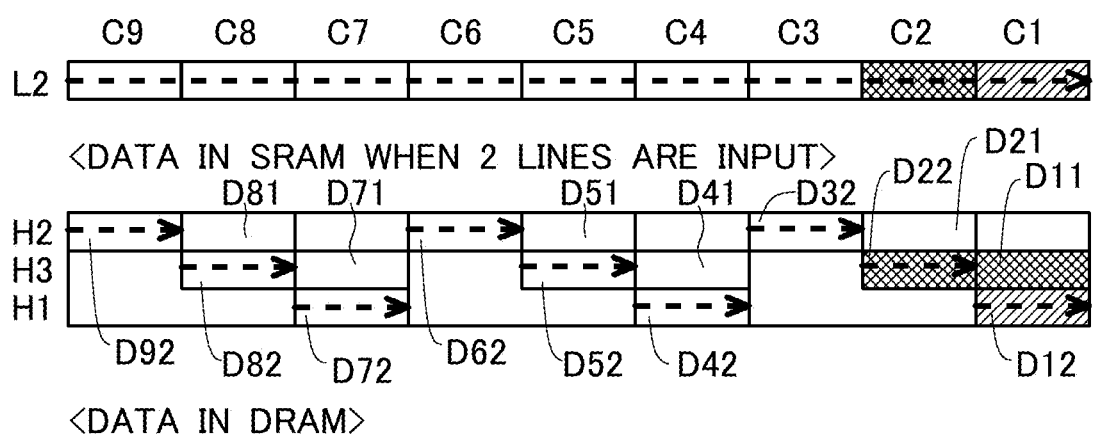
FIG. 25 illustrate processing performed on each line pixel row.

Similarly, a plurality of different partial pixel rows D32, D22, and D12 in the second line pixel row L2 (see the uppermost pixel row in FIG. 25) received from the image capturing unit 215 are written to discontinuous positions in the SRAM 51 as illustrated in FIG. 25 (see thick broken lines in FIG. 25).

At this time, each line Hi in the SRAM 51 is shifted to the line immediately above before the writing of the line pixel row L2 as illustrated in FIG. 25. Specifically, the lowermost line H3 is shifted to the middle position, and the middle line H2 is shifted to the uppermost position. The uppermost line H1 returns again to the lowermost position. In this way, each line in the SRAM 51 is used in cycles.

After each line has conceptually been shifted in this way, a plurality of partial pixel rows in the second line pixel row L2 are arranged at similar positions as described with reference to FIG. 24 (see FIG. 25).

Third Line

Figure 26:
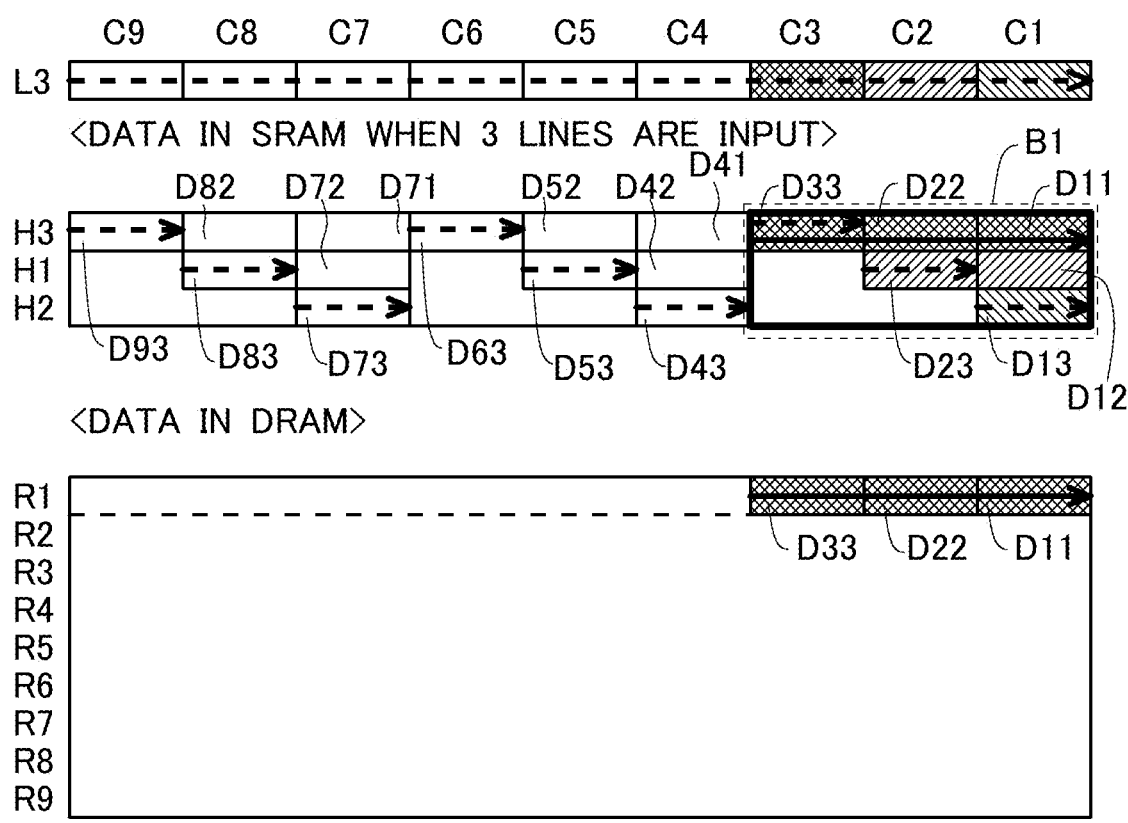
FIG. 26 illustrates processing performed on each line pixel row.

Similarly, a plurality of different partial pixel rows D33, D23, and D13 in the third line pixel row L3 (see the uppermost pixel row in FIG. 26) received from the image capturing unit 215 are written to discontinuous positions in the SRAM 51 as illustrated in FIG. 26 (see thick broken lines in FIG. 26). At this time, a plurality of partial pixel rows in the third line pixel row L3 are written in the same manner as in FIG. 24 after each line has conceptually been shifted as described above (see FIG. 26).

Here, the operations in FIGS. 24 to 26 will be collectively described (i.e., correction processing performed in the block image B1 (sectional ranges C3 to C1) (for the oblique line E1) and processing for serializing the partial pixel rows D33, D22, and D11). First, as illustrated in FIG. 24, a plurality of partial pixel rows (D31, D21, D11) in the block image B1 of the line pixel row L1 are written to corresponding addresses at their target positions (after the rearrangement processing of these partial pixel rows) by using random access to the SRAM 51. In particular, the partial pixel row D11 is written to the sectional range C1 of the line H3 (see FIG. 24). Then, this operation is repeated for the other line pixel rows L2 and L3. Specifically, as illustrated in FIG. 25, a plurality of partial pixel rows (D32, D22, D12) in the line pixel row L2 are written to corresponding addresses at their target positions. In particular, the partial pixel row D22 is written to the sectional range C2 of the line H3. Moreover, as illustrated in FIG. 26, a plurality of partial pixel rows (D33, D23, D13) in the line pixel row L3 are written to corresponding addresses at their target positions. In particular, the partial pixel row D33 is written to the sectional range C3 of the line H3.

As a result, as to the block image B1 (for the oblique line E1), the partial pixel row D33 in the line pixel row L3, the partial pixel row D22 in the line pixel row L2, and the partial pixel row D11 in the line pixel row L1 are continuously arranged in this order in the sectional ranges C3, C2, and C1 of the same line H3 in the SRAM 51. In other words, the different partial pixel rows D33, D22, and D11 that are present in the different line pixel rows L1, L2, and L3 are rearranged and continuously arranged in the same line H3 in the SRAM 51. In this way, each partial pixel row in the block image B1 is written to a corresponding address at its target position (each sectional range C3, C2, or C1 in the same line H3) after the rearrangement processing of the partial pixel row by using random access to the SRAM 51.

Then, these partial pixel rows D33, D22, and D11 relating to the block image B1 and written at different times (partial pixel rows D33, D22, and D11 continuously arranged in the SRAM 51) are continuously read out from the sectional ranges C3, C2, and C1 of the same line H3. As a result of this intra-block rearrangement processing using the SRAM 51, serialized pixel rows are generated in which the partial pixel rows D33, D22, and D11 in the block image B1 are rearranged so as to become continuous. The serialized pixel rows can also be expressed as pixel rows obtained by rearranging the partial pixel rows (D33, D22, D11) so as to be linearly aligned.

Thereafter, the serialized pixel rows (partial pixel rows D33, D22, and D11) read out from the SRAM 51 are continuously written to the ranges C3 to C1 of a first line R1 in the DRAM 52.

Fourth and Fifth Lines

Figure 27:
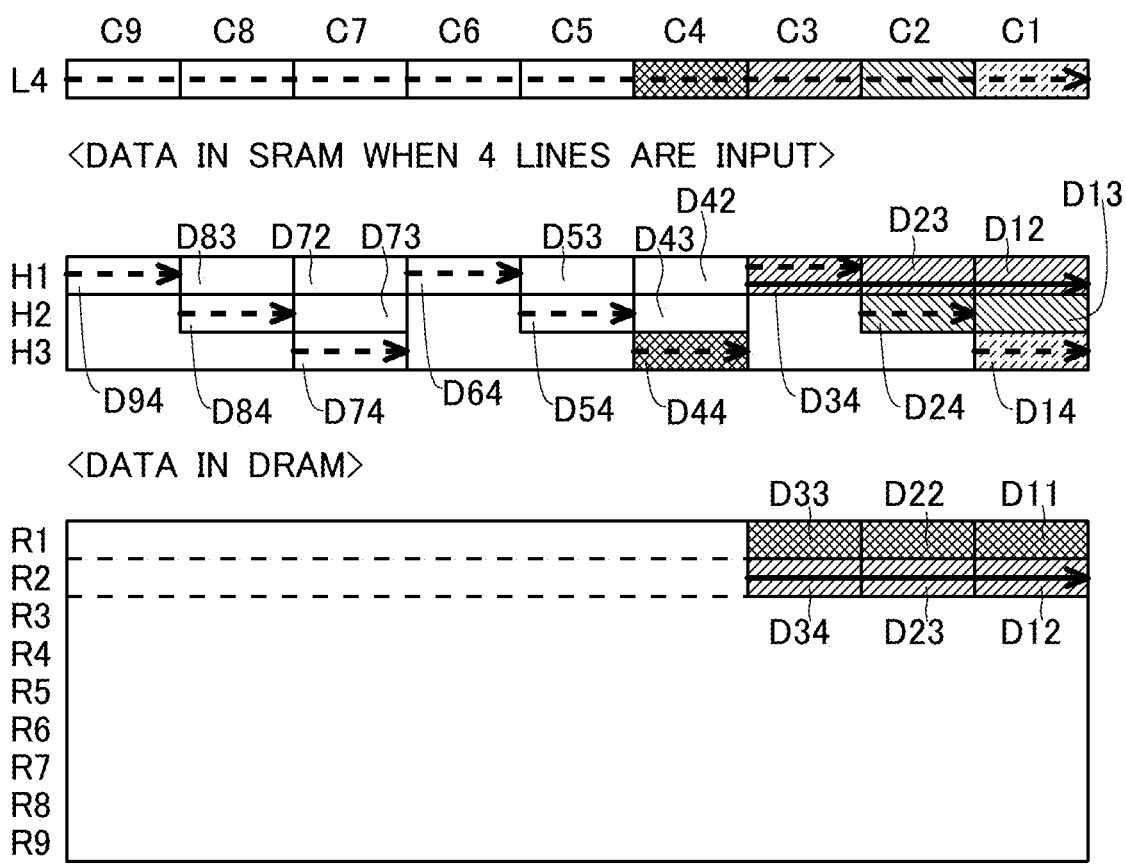
FIG. 27 illustrates processing performed on each line pixel row.

Similarly, a plurality of different partial pixel rows D94, D84, D74, D64, D54, D44, D34, D24, and D14 in the fourth line pixel row L4 (see the uppermost pixel row in FIG. 27) received from the image capturing unit 215 are written to their discontinuous target positions in the SRAM 51 as illustrated in FIG. 27 (see thick broken lines in FIG. 27). At this time, the partial pixel rows in the fourth line pixel row L4 are written in the same manner as in FIG. 24 after each line has conceptually been shifted as described above (see FIG. 27).

As a result, for the block image B1 (for the oblique line E2), the partial pixel row D34 in the line pixel row L4, the partial pixel row D23 in the line pixel row L3, and the partial pixel row D12 in the line pixel row L1 are continuously arranged in this order in the sectional ranges C3, C2, and C1 of the same line H1 in the SRAM 51.

Then, these partial pixel rows D34, D23, D12 written at different times (partial pixel rows in the block image B1) are continuously read out from the sectional ranges C3, C2, and C1 of the same line H1. As a result of this intra-block rearrangement processing using the SRAM 51, serialized pixel rows are generated in which the partial pixel rows D34, D23, and D12 in the block image B1 (for the oblique line E2) are rearranged so as to become continuous.

The serialized pixel rows (partial pixel rows D34, D23, and D12) read out from the SRAM 51 are continuously written to the ranges C3 to C1 of the second line R2 in the DRAM 52.

In this way, the correction processing (processing for serializing the partial pixel rows D34, D23, and D12) is performed in the block image B1 (sectional ranges C3 to C1) (for the oblique line E2). The serialized pixel rows (partial pixel rows D34, D23, and D12) obtained by the serialization processing are used in correction processing relating to the second oblique line E2 in the original image (second X-direction line F2 obtained by correction).

Figure 28:
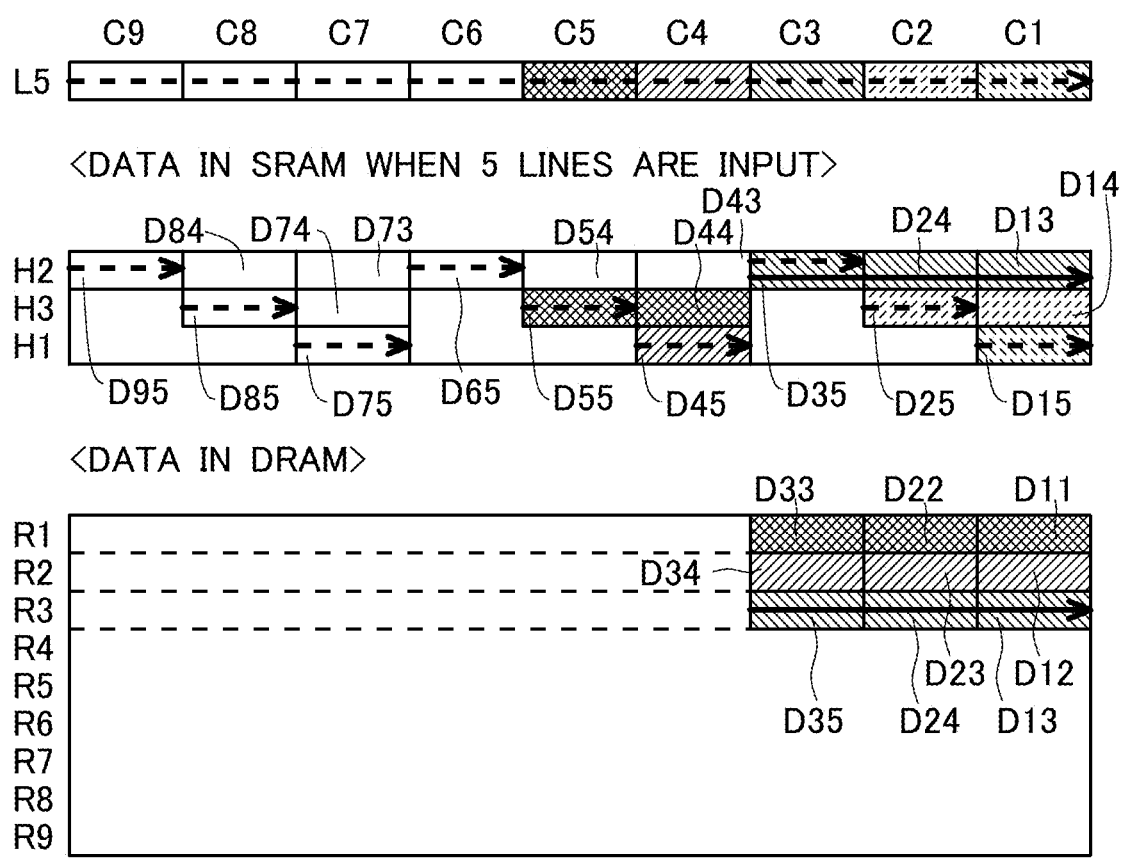
FIG. 28 illustrates processing performed on each line pixel row.

Similarly, a plurality of different partial pixel rows D95, D85, D75, D65, D55, D45, D35, D25, and D15 in the fifth line pixel row L5 (see the uppermost pixel row in FIG. 28) received from the image capturing unit 215 are written to their discontinuous target positions in the SRAM 51 as illustrated in FIG. 28 (see thick broken lines in FIG. 28). At this time, the partial pixel rows in the fifth line pixel row L5 are written in the same manner as in FIG. 24 after each line has conceptually been shifted as described above (see FIG. 28).

As a result, for the block image B1 (for the oblique line E3), the partial pixel row D35 in the line pixel row L5, the partial pixel row D24 in the line pixel row L4, and the partial pixel row D13 in the line pixel row L3 are continuously arranged in this order in the sectional ranges C3, C2, and C1 of the same line H2 in the SRAM 51.

Then, these partial pixel rows D35, D24, and D13 written at different times are continuously read out from the sectional ranges C3, C2, and C1 of the same line H2. As a result of this intra-block rearrangement processing using the SRAM 51, serialized pixel rows are generated in which the partial pixel rows D35, D24, and D13 in the block image B1 (for the oblique line E3) are rearranged so as to become continuous.

The serialized pixel rows (partial pixel rows D35, D24, and D13) read out from the SRAM 51 are continuously written to the ranges C3 to C1 of the third line R3 in the DRAM 52.

In this way, correction processing (processing for serializing the partial pixel rows D35, D24, and D13) is performed in the block image B1 (sectional ranges C3 to C1) (for the oblique line E3). The serialized pixel rows (partial pixel rows D35, D24, and D13) obtained by the serialization processing are used in correction processing relating to the third oblique line E3 in the original image (X-direction line F3 obtained by correction).

Sixth Line

Figure 29:
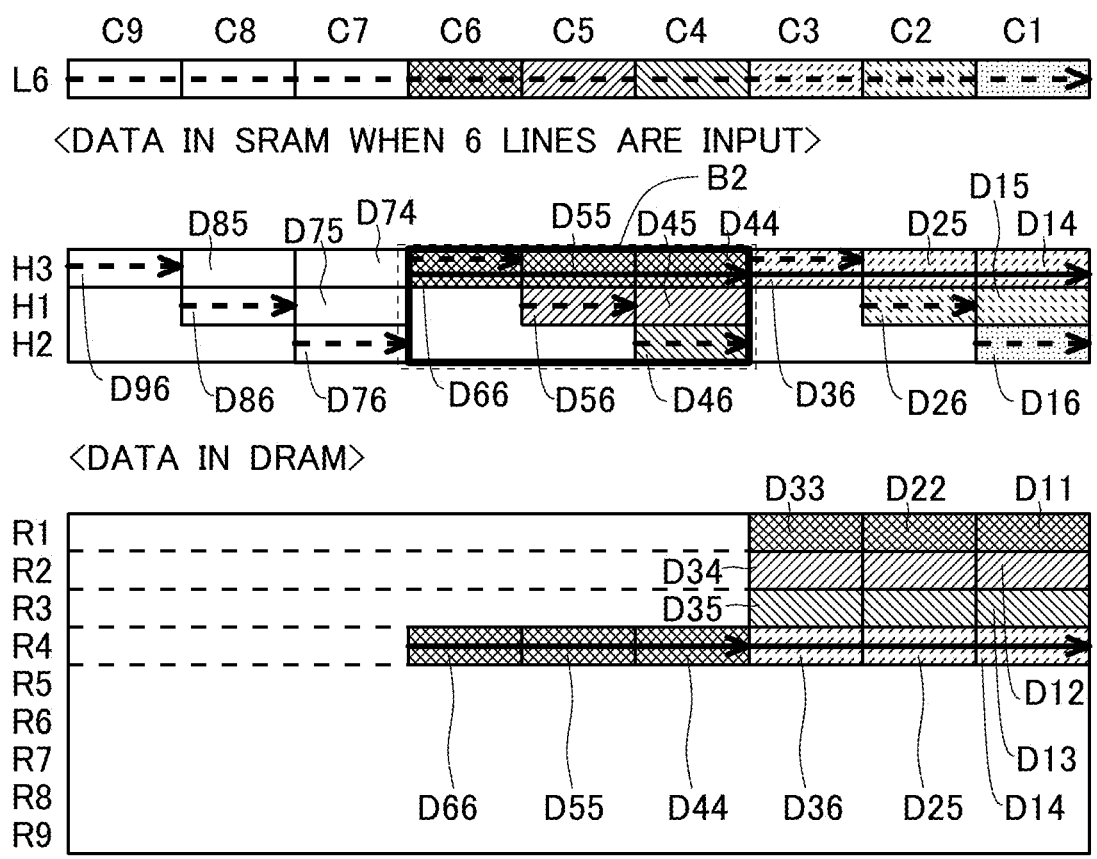
FIG. 29 illustrates processing performed on each line pixel row.

As illustrated in FIG. 29, a plurality of different partial pixel rows D96, D86, D76, D66, D56, D46, D36, D26, and D16 in the sixth line pixel row L6 (uppermost pixel row in FIG. 29) received from the image capturing unit 215 are written to their discontinuous target positions in the SRAM 51 (see thick broken lines in FIG. 29). At this time, the partial pixel rows in the sixth line pixel row L6 are written in the same manner as in FIG. 24 after each line has conceptually been shifted as described above (see FIG. 29).

As a result, for the block image B2 (for the oblique line E1), the partial pixel row D66 in the line pixel row L6, the partial pixel row D55 in the line pixel row L5, and the partial pixel row D44 in the line pixel row L4 are continuously arranged in this order in the sectional ranges C6, C5, and C4 of the same line H3 in the SRAM 51. Then, these partial pixel rows D66, D55, and D44 written at different times (partial pixel rows relating to the block image B2) are continuously read out from the sectional ranges C6, C5, and C4 of the same line H3. As a result of this intra-block rearrangement processing using the SRAM 51, serialized pixel rows are generated in which the partial pixel rows D66, D55, and D44 in the block image B2 are rearranged so as to become continuous. The serialized pixel rows (partial pixel rows D66, D55, and D44) obtained by the serialization processing are used in correction processing relating to the first oblique line E1 in the original image (first X-direction line F1 obtained by correction).

Moreover, for the block image B1 (for the oblique line E4), the partial pixel row D36 in the line pixel row L6, the partial pixel row D25 in the line pixel row L5, and the partial pixel row D14 in the line pixel row L4 are continuously arranged in this order in the sectional ranges C3, C2, and C1 of the same line H3 in the SRAM 51. Then, these partial pixel rows D36, D25, and D14 written at different times are continuously read out from the sectional ranges C3, C2, and C1 of the same line H3. As a result of this intra-block rearrangement processing using the SRAM 51, serialized pixel rows are generated in which the partial pixel rows D36, D25, and D14 in the block image B1 are rearranged so as to become continuous. The serialized pixel rows (partial pixel rows D36, D25, and D14) obtained by the serialization processing are used in correction processing relating to the fourth oblique line E4 in the original image (fourth X-direction line F4 obtained by correction).

Then, the serialized pixel rows (partial pixel rows D66, D55, and D44) generated for the block image B2 (for the oblique line E1) and the serialized pixel rows (partial pixel rows D36, D25, and D14) generated for the block image B1 (for the oblique line E4) are read out from the SRAM 51 and continuously written in the as-is order to the same line in the DRAM 52. Specifically, the partial pixel rows D66, D55, and D44 are written to the ranges C6 to C4 of the fourth line R4 in the DRAM 52, and the partial pixel rows D36, D25, and D14 are written to the ranges C3 to C1 of the fourth line R4 in the DRAM 52. The sectional ranges C6 to C4 of the fourth line R4 can also be expressed as target positions of the serialized pixel rows (partial pixel rows D66, D55, and D44) (after rearrangement).

Seventh and Eighth Lines

Figure 30:
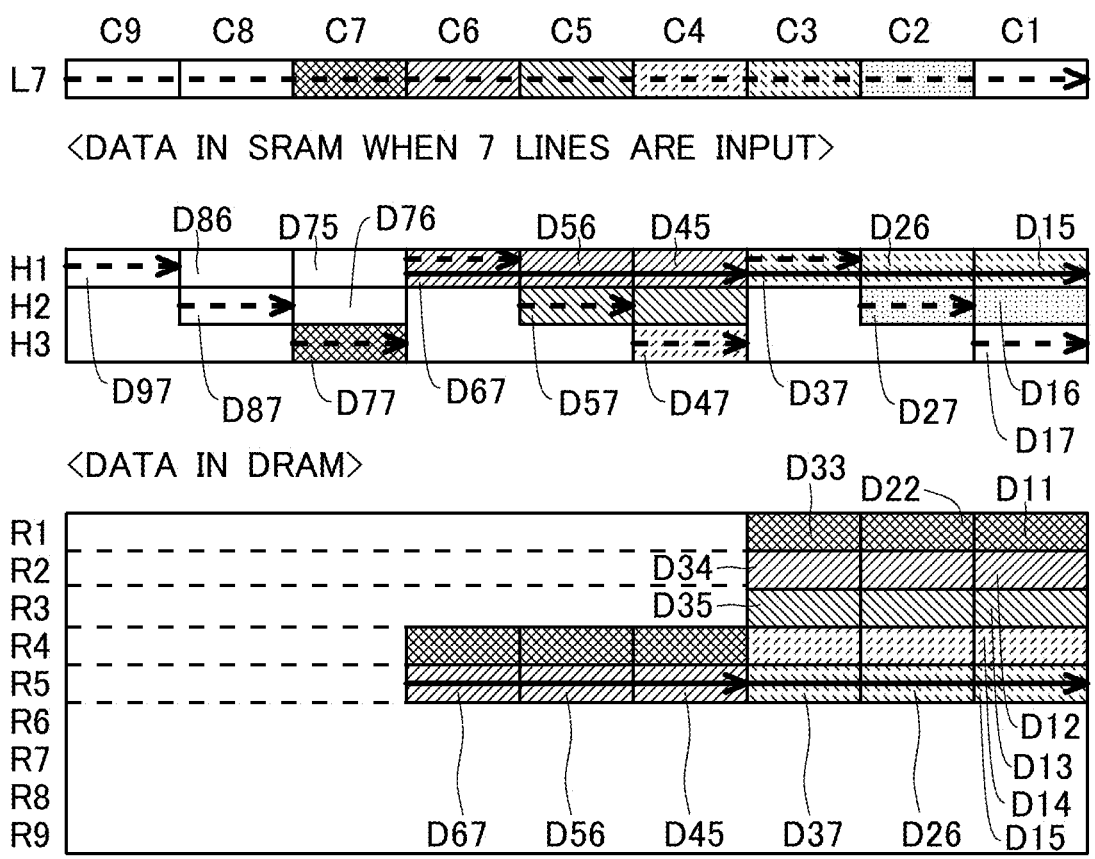
FIG. 30 illustrates processing performed on each line pixel row.

As illustrated in FIG. 30, similar processing is also performed on a plurality of different partial pixel rows D97, D87, D77, D67, D57, D47, D37, D27, and D17 in the seventh line pixel row L7 (see the uppermost pixel row in FIG. 30) received from the image capturing unit 215.

As a result of the rearrangement processing performed in the block image B1 (for the oblique line E5) using the SRAM 51, pixel rows (serialized pixel rows) are generated in which the partial pixel rows D37, D26, and D15 in the block image B1 are serialized. The serialized pixel rows (partial pixel rows D37, D26, and D15) are used in correction processing relating to the fifth oblique line E5 in the original image (fifth X-direction line F5 after correction).

Moreover, as a result of the rearrangement processing performed in the block image B2 (for the oblique line E2) using the SRAM 51, pixel rows (serialized pixel rows) are generated in which the partial pixel rows D67, D56, and D45 in the block image B2 are serialized. The serialized pixel rows (partial pixel rows D67, D56, and D45) are used in correction processing relating to the second oblique line E2 in the original image (second X-direction line F2 obtained by correction).

Then, the serialized pixel rows (partial pixel rows D37, D26, and D15) generated for the block image B1 (for the oblique line E5) are read out from the SRAM 51 and continuously written in the as-is order to the ranges C3 to C1 of the fifth line R5 in the DRAM 52. The serialized pixel rows (partial pixel rows D67, D56, and D45) generated for the block image B2 (for the oblique line E2) are read out from the SRAM 51 and continuously written in the as-is order to the ranges C6 to C4 of the fifth line R5 in the DRAM 52.

Figure 31:
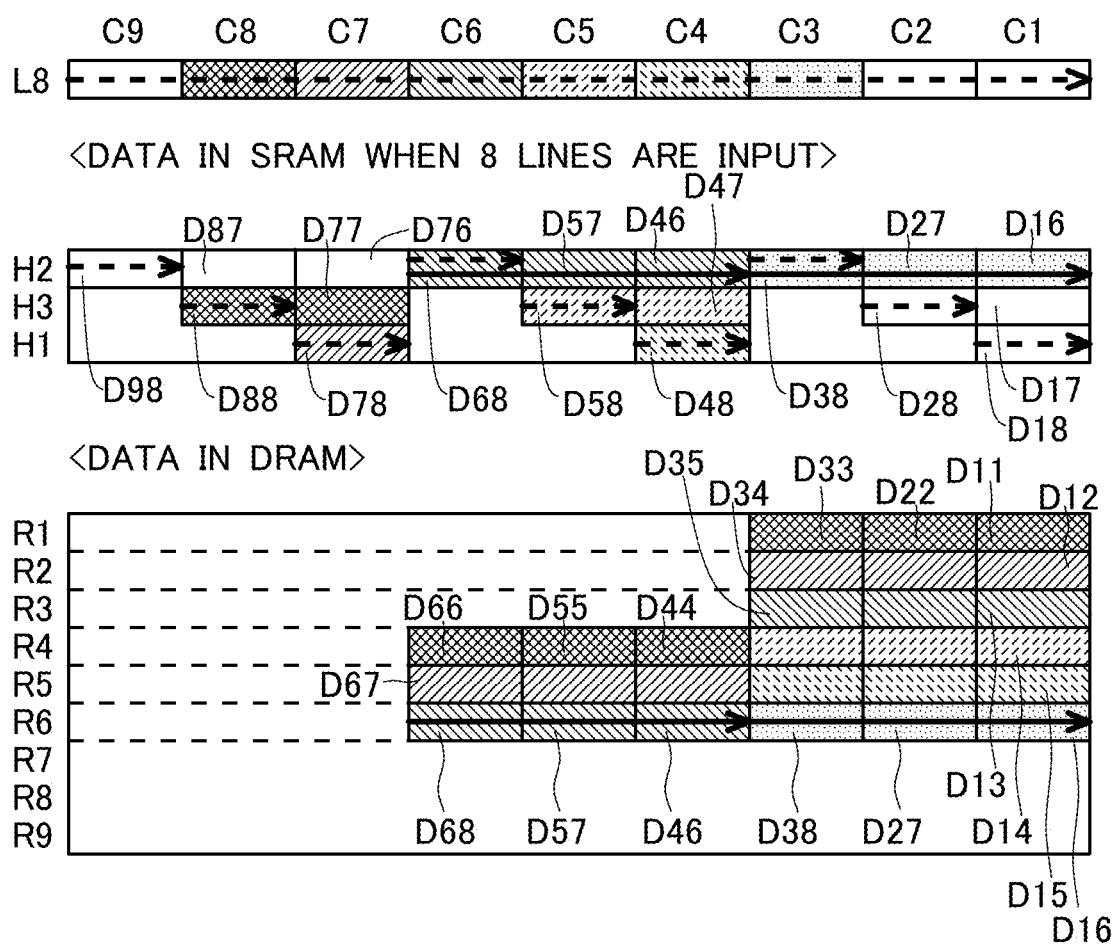
FIG. 31 illustrates processing performed on each line pixel row.

As illustrated in FIG. 31, similar processing is also performed on a plurality of different partial pixel rows D98, D88, D78, D68, D58, D48, D38, D28, and D18 in the eighth line pixel row L8 (see the uppermost pixel row in FIG. 31) received from the image capturing unit 215.

As a result of the rearrangement processing performed for the block image B1 (for the oblique line E6) using the SRAM 51, pixel rows (serialized pixel rows) are generated in which the partial pixel rows D38, D27, and D16 in the block image B1 are serialized. The serialized pixel rows (partial pixel rows D38, D27, and D16) are used in correction processing relating to the sixth oblique line E6 in the original image (sixth X-direction line F6 obtained by correction).

Moreover, as a result of the rearrangement processing performed for the block image B2 (for the oblique line E3) using the SRAM 51, pixel rows (serialized pixel rows) are generated in which the partial pixel rows D68, D57, and D46 in the block image B2 are serialized. The serialized pixel rows (partial pixel rows D68, D57, and D46) are used in correction processing relating to the third oblique line E3 in the original image (third X-direction line F3 obtained by correction).

Then, the serialized pixel rows (partial pixel rows D38, D27, and D16) generated for the block image B1 (for the oblique line E6) are read out from the SRAM 51 and continuously written in the as-is order to the ranges C3 to C1 of the sixth line R6 in the DRAM 52. The serialized pixel rows (partial pixel rows D68, D57, and D46) generated for the block image B2 (for the oblique line E3) are read out from the SRAM 51 and continuously written in the as-is order to the ranges C6 to C4 of the sixth line R6 in the DRAM 52.

Ninth Line

Figure 32:
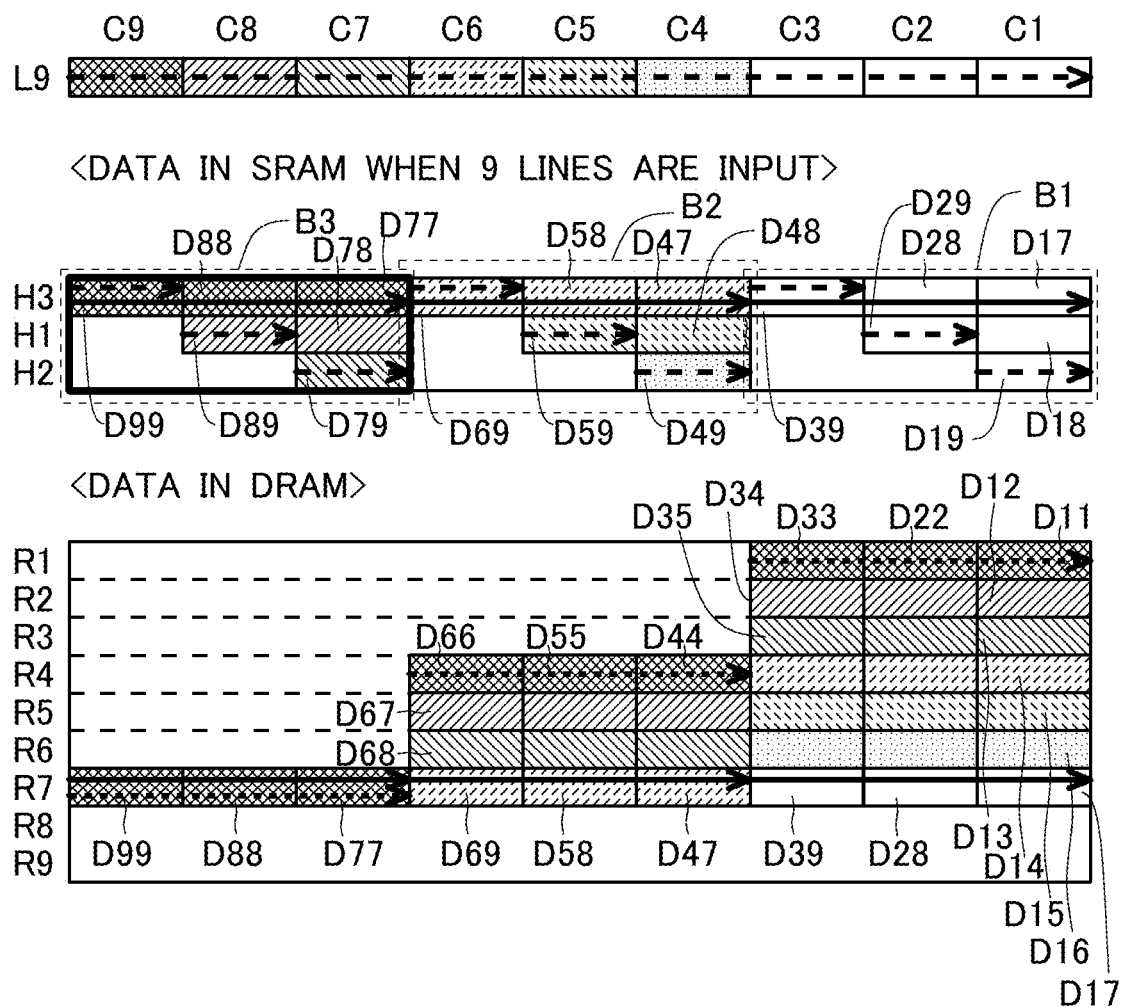
FIG. 32 illustrates processing performed on each line pixel row.

As illustrated in FIG. 32, similar processing is also performed on a plurality of different partial pixel rows D99, D89, D79, D69, D59, D49, D39, D29, and D19 in the ninth line pixel row L9 (see the uppermost pixel row in FIG. 32) received from the image capturing unit 215.

As a result of the rearrangement processing performed for the block image B1 (for the oblique line E7) using the SRAM 51, pixel rows (serialized pixel rows) are generated in which the partial pixel rows D39, D28, and D17 in the block image B1 are serialized. The serialized pixel rows (partial pixel rows D39, D28, and D17) are used in correction processing relating to the seventh oblique line E7 in the original image (seventh X-direction line F7 obtained by correction).

Moreover, as a result of the rearrangement processing performed for the block image B2 (for the oblique line E4) using the SRAM 51, pixel rows (serialized pixel rows) are generated in which the partial pixel rows D69, D58, and D47 in the block image B2 are serialized. The serialized pixel rows (partial pixel rows D69, D58, and D47) are used in correction processing relating to the fourth oblique line E4 in the original image (fourth X-direction line F4 obtained by correction).

Furthermore, rearrangement processing using the SRAM 51 is performed in the block image B3 (for the oblique line E1). Specifically, for the block image B3, the partial pixel row D99 in the line pixel row L9, the partial pixel row D88 in the line pixel row L8, and the partial pixel row D77 in the line pixel row L7 are continuously arranged in this order in the sectional ranges C9 C8, and C7 of the same line H3 in the SRAM 51. In short, the partial pixel rows D99, D88, and D77 are linearly aligned.

Then, these partial pixel rows D99, D88, and D77 written at different times (partial pixel rows relating to the block image B3) are continuously read out from the sectional ranges C9, C8, and C7 of the same line H3. As a result of this intra-block rearrangement processing using the SRAM 51, pixel rows (serialized pixel rows) are generated in which the partial pixel rows D99, D88, and D77 in the block image B3 are serialized. As will be described later, the serialized pixel rows (partial pixel rows D99, D88, and D77) are used in correction processing relating to the first oblique line E1 in the original image (first X-direction line F1 obtained by correction).

Thereafter, a plurality of serialized pixel rows generated (at different times) for all of the block images B1, B2, and B3 are read out from the SRAM 51 (to be more specific, from the line H3 of the SRAM 51) and continuously written to the same line R7 (to be more specific, the sectional ranges C9 to C1 of the line R7) in the DRAM 52. To be more specific, the serialized pixel rows (partial pixel rows D99, D88, and D77) generated for the block image B3 (for the oblique line E1), the serialized pixel rows (partial pixel rows D69, D58, and D47) generated for the block image B2 (for the oblique line E4), and the serialized pixel rows (partial pixel rows D39, D28, and D17) generated for the block image B1 (for the oblique line E7) are continuously written in the as-is order to the ranges C9 to C7, C6 to C4, and C3 to C1 of the seventh line R7 in the DRAM 52. Each serialized pixel row is arranged at its target position (each of the sectional ranges C9 to C7, C6 to C4, and C3 to C1 of the seventh line R7) in the DRAM 52.

At the time of writing to the DRAM 52, the "inter-block rearrangement processing" has not yet substantially been performed. At the time of writing to the DRAM 52, the pixel rows linearly arranged in a provisional manner by the intra-block rearrangement processing are written as-is to the same line in the DRAM 52. For example, the partial pixel rows D99, D88, D77, D69, D58, D47, D39, D28, and D17 linearly aligned in a provisional manner by the intra-block rearrangement processing are written in the as-is order to the same line R7 in the DRAM 52.

Then, the "inter-block rearrangement processing" is performed substantially at the time of reading-out from the DRAM 52. Specifically, random access to the DRAM 52 is used to continuously read out a plurality of serialized pixel rows (D99, D88, D77), (D66, D55, D44), and (D33, D22, D11) arranged at discontinuous addresses in the DRAM 52. These serialized pixel rows can also be expressed as a plurality of serialized pixel rows that are arranged at their target positions (after rearrangement processing) and that are arranged at different times in different lines in the DRAM 52. As a result of the operations as described above, the serialized pixel row (partial pixel rows D99, D88, and D77) relating to the block image B3 (for the oblique line E1) is arranged in the sectional ranges C9 to C7 of the seventh line R7 in the DRAM 52, and the serialized pixel row (partial pixel rows D66, D55, and D44) relating to the block image B2 (for the oblique line E1) is arranged in the sectional ranges C6 to C4 of the fourth line R4 in the DRAM 52, and the serialized pixel row (partial pixel rows D33, D22, and D11) relating to the block image B1 (for the oblique line E1) is arranged in the sectional ranges C3 to C1 of the first line R1 in the DRAM 52.

Here, a single line image F1 is generated by continuously reading out the plurality of serialized pixel rows (D99, D88, D77), (D66, D55, D44), and (D33, D22, D11) arranged (at discontinuous addresses) in different lines in the DRAM 52 by using random access to the DRAM 52. In other words, the serialized pixel rows (D99, D88, D77), (D66, D55, D44), and (D33, D22, D11) relating to the block images B3, B2, B1 (for the oblique line E1) are rearranged so as to be linearly aligned (so as to become continuous) among the block images B3, B2, B1, so as to generate a single line image.

According to the second embodiment, the intra-block rearrangement processing is performed substantially at the time of writing to the SRAM 51 (at the write time) as described above. The inter-block rearrangement processing is performed substantially at the time of reading-out from the DRAM 52 (at the read time).

Specifically, at the time of writing to the SRAM 51, random access to the SRAM 51 is used to write each partial pixel row in each block image to a corresponding address at its target position after the rearrangement processing of the partial pixel row. For example, the partial pixel rows D99, D88, and D77 that respectively belong to the different lines L9, L8, and L7 (see FIG. 23) in the block image B3 of the input image are written to corresponding addresses at their target positions (e.g., positions of the sectional ranges C9 to C7 of the same line H3 in the SRAM 51) by using random access to the SRAM 51. The same applies to the other block images B2 and B1. That is, the partial pixel rows D66, D55, and D44 are written to corresponding addresses at their target positions (e.g., positions of the sectional ranges C6 to C4 of the same line H3 in the SRAM 51), and the partial pixel rows D33, D22, and D11 are written to corresponding addresses at their target positions (e.g., positions of the sectional ranges C3 to C1 of the same line H3 in the SRAM 51).

Then, at the time of reading-out from the SRAM 51, the partial pixel rows written at different times in each block image (partial pixel rows arranged in the same line (H3) in the SRAM 51) are sequentially read out. For example, the partial pixel rows D99, D88, and D77 written at different times in the block image B3 (partial pixel rows arranged in the same line (H3) in the SRAM 51) are sequentially read out. As a result, a serialized pixel row is generated in which the partial pixel rows in each block image are rearranged so as to be linearly aligned. For example, a serialized pixel row is generated by rearranging the partial pixel rows D99, D88, and D77 in the block image B3. The other blocks B2 and B1 are performed in the same manner so as to generate a serialized pixel row in which the partial pixel rows D66, D55, and D44 are rearranged, and a serialized pixel row in which the partial pixel rows D33, D22, and D11 are rearranged.

Moreover, rearrangement processing (inter-block rearrangement processing; rearrangement processing in units of blocks) among the block images B1, B2, and B3 (for the oblique line E1) (see FIGS. 26, 29, and 32) is performed by using the DRAM 52 (see FIGS. 23 and 32). The inter-block rearrangement processing is performed at the time of reading-out from the DRAM 52.

At the time of writing to the DRAM 52, the pixel rows linearly aligned in a provisional manner by the intra-block rearrangement processing are written without being rearranged (in the as-is order) to the DRAM 52. Specifically, a plurality of partial pixel rows D linearly aligned in a provisional manner are written to the same line in the DRAM 52. For example, the partial pixel rows D99, D88, D77, D69, D58, D47, D39, D28, and D17 are written to the same line R7 (to be more specific, the sectional ranges C9 to C1 of the line R7) in the DRAM 52.

Then, at the time of reading-out from the DRAM 52, the serialized pixel rows (D99, D88, D77), (D66, D55, D44), and (D33, D22, D11) relating to the block images B1 to B3 and written and arranged at different times in different lines in the DRAM 52 are read out by using random access to the DRAM 52. As a result, the single line image F1 is generated in which the serialized pixel rows are linearly rearranged and aligned. In this way, the obliqueness of the oblique line E1 is corrected, and the new line F1 (line image obtained by correcting the oblique line E1) is generated.

The above-described mode can also achieve the same effect as the first embodiment.

3. Third Embodiment

A third embodiment is a variation of the first and other embodiments. The following description focuses on differences from the first and other embodiments.

Figure 33:
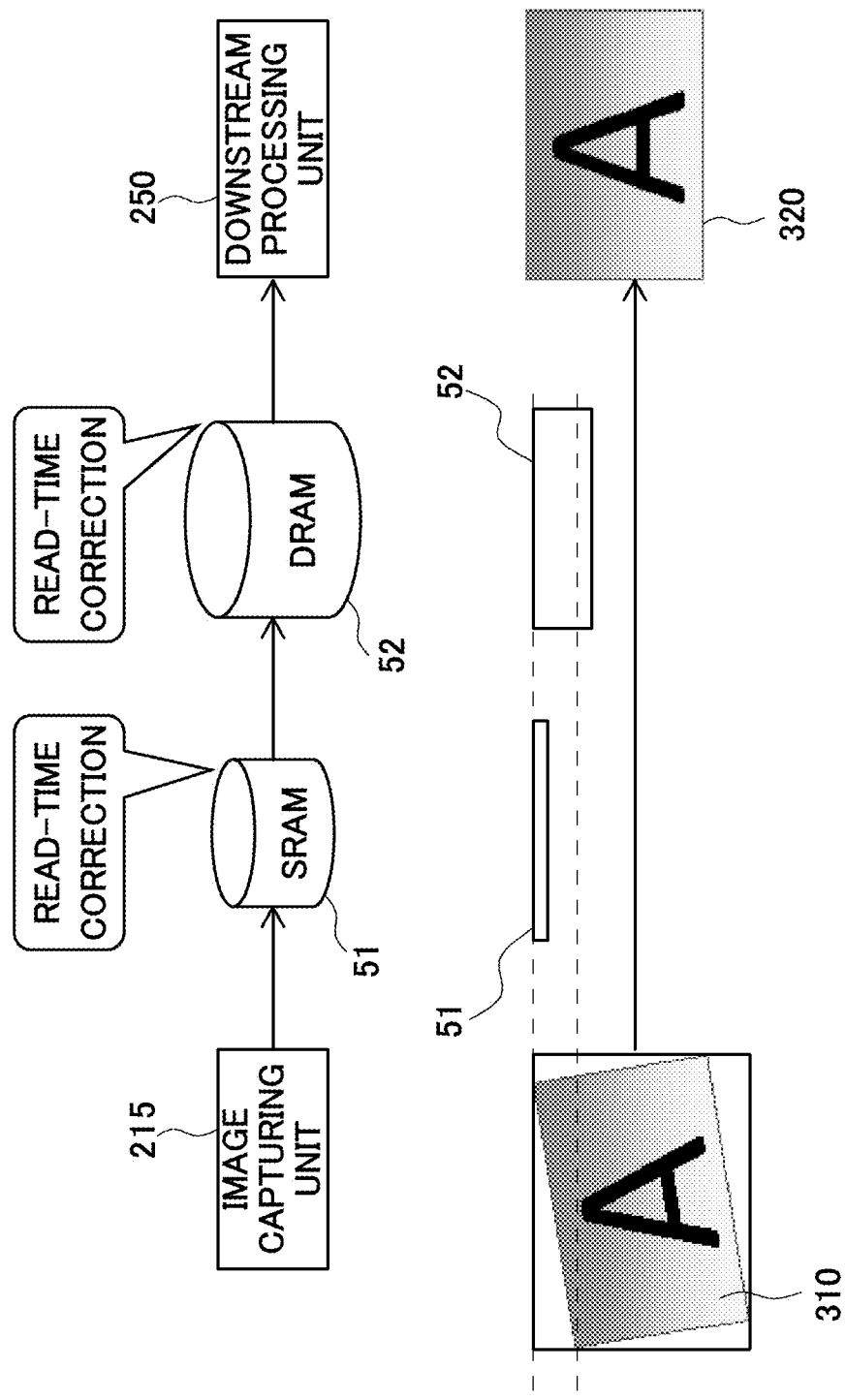
FIG. 33 illustrates an overview of a third embodiment.

According to the third embodiment, the first rearrangement processing P1 (and the "intra-block rearrangement processing") is performed substantially at the time of reading-out from the SRAM 51 (at the read time) as illustrated in FIG. 33. The second rearrangement processing P2 (and the "inter-block rearrangement processing") is performed substantially at the time of reading-out from the DRAM 52 (at the read time). In short, SRAM read-time correction and DRAM read-time correction are performed (in this order) according to the third embodiment.

Figure 34:
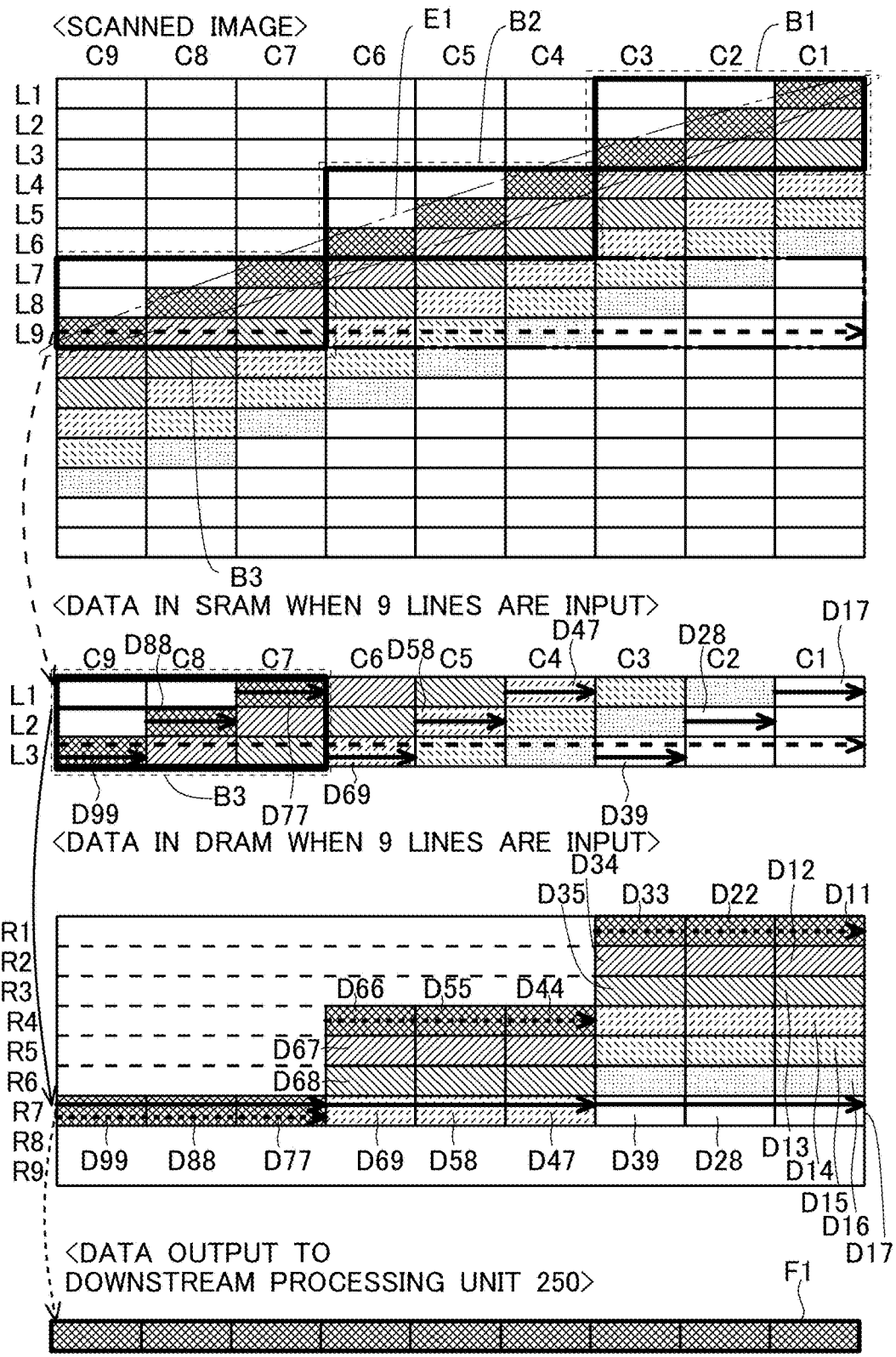
FIG. 34 is a descriptive diagram illustrating a rearrangement operation according to the third embodiment.

FIG. 34 conceptually illustrates operations according to the third embodiment. An operation of writing to the SRAM 51 at the time of reading out the line pixel row L9 (see the arrow indicated by the broken line in the middle section in FIG. 34) and an operation of reading-out from the SRAM 51 (involving random access) (see the arrows indicated by thick solid lines in FIG. 34) are conceptually illustrated in FIG. 34. An operation of writing to the DRAM 52 (see the arrows indicated by thick solid lines in the lower section in FIG. 34) and an operation of reading-out from the DRAM 52 (involving random access) (see the arrows indicated by dotted lines in FIG. 34) are also conceptually illustrated.

The "intra-block rearrangement processing" using the SRAM 51 may be performed in the same manner as in the first embodiment. Specifically, the operation at the time of writing to the SRAM 51 (at the write time) may be performed in the same manner as the operation at the time of writing to the SRAM 51 according to the first embodiment. The operation at the time of reading-out from the SRAM 51 (at the read time) (including a rearrangement operation) may also be performed in the same manner as the operation at the time of reading-out from the SRAM 51 according to the first embodiment.

The "inter-block rearrangement processing" using the DRAM 52 may be performed in the same manner as in the second embodiment. Specifically, the operation at the time of writing to the DRAM 52 (at the write time) may be performed in the same manner as the operation at the time of writing to the DRAM 52 according to the second embodiment. An operation at the time of reading-out from the DRAM 52 (at the read time) (including a rearrangement operation) may also be performed in the same manner as the operation at the time of reading-out from the DRAM 52 according to the second embodiment.

4. Fourth Embodiment

A fourth embodiment is a variation of the first and other embodiments. The following description focuses on differences from the first and other embodiments.

Figure 35:
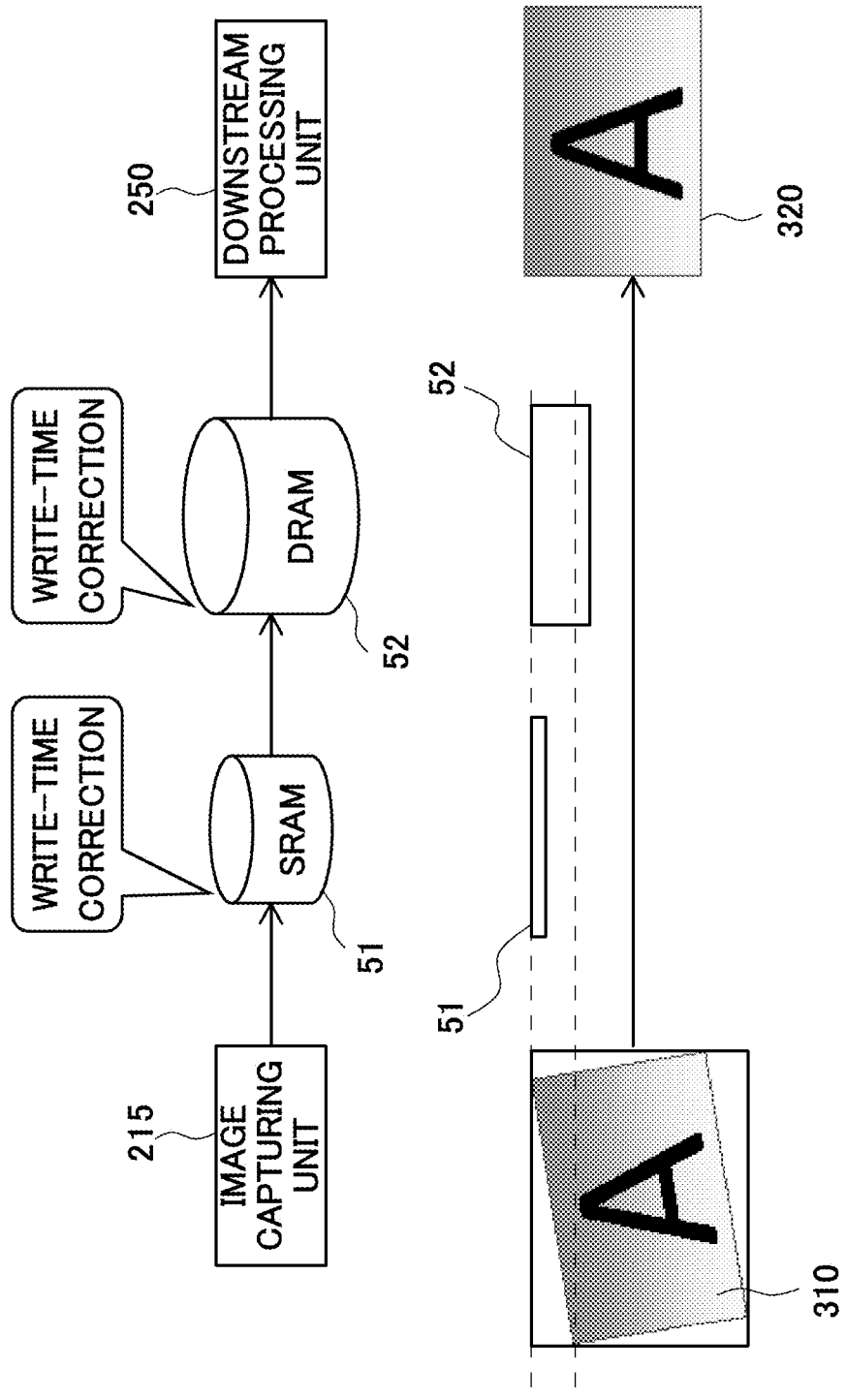
FIG. 35 illustrates an overview of a fourth embodiment.

According to the fourth embodiment, the first rearrangement processing P1 (and the "intra-block rearrangement processing") is performed substantially at the time of writing to the SRAM 51 (at the write time) as illustrated in FIG. 35. The second rearrangement processing P2 (and the "inter-block rearrangement processing") is performed substantially at the time of writing to the DRAM 52 (at the write time). In short, SRAM write-time correction DRAM write-time correction are performed (in this order) according to the fourth embodiment.

Figure 36:
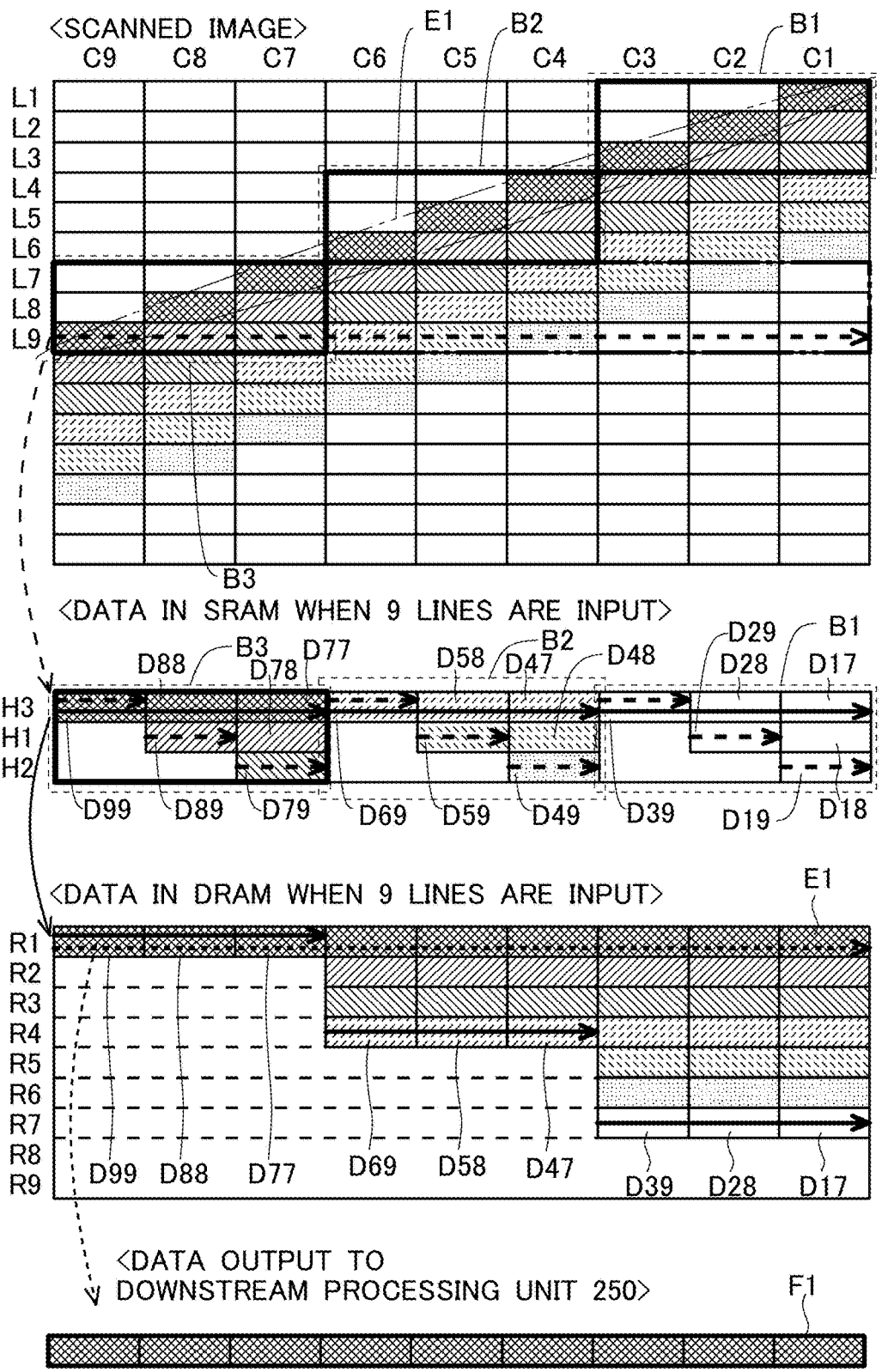
FIG. 36 is a descriptive diagram illustrating a rearrangement operation according to the fourth embodiment.

FIG. 36 conceptually illustrates operations according to the fourth embodiment. An operation of writing to the SRAM 51 (involving random access) at the time of reading out the line pixel row L9 (see the arrows indicated by broken lines in FIG. 36) and an operation of reading-out from the SRAM 51 (see the arrows indicated by thick solid lines in FIG. 36) are conceptually illustrated in FIG. 36. An operation of writing to the DRAM 52 (involving random access) (see the arrows indicated by thick solid lines in FIG. 36) and an operation of reading-out from the DRAM 52 (see the arrow of the dotted line in FIG. 36) are also conceptually illustrated.

The "intra-block rearrangement processing" using the SRAM 51 may be performed in the same manner as in the second embodiment. Specifically, the operation at the time of writing to the SRAM 51 (at the write time) (including a rearrangement operation) may be performed in the same manner as the operation at the time of writing to the SRAM 51 according to the second embodiment. The operations at the time of reading-out from the SRAM 51 (at the read time) may also be performed in the same manner as the operation at the time of reading-out from the SRAM 51 according to the second embodiment.

The "inter-block rearrangement processing" using the DRAM 52 may be performed in the same manner as in the first embodiment. Specifically, the operation at the time of writing to the DRAM 52 (at the write time) (including a rearrangement operation) may be performed in the same manner as the operation at the time of writing to the DRAM 52 according to the first embodiment. The operation at the time of reading-out from DRAM 52 (at the read time) may also be performed in the same manner as the operation at the time of reading-out from the DRAM 52 according to the first embodiment.

5. Fifth Embodiment 5-1. Overview

A fifth embodiment is a variation of the first and other embodiments. The following description focuses on differences from the first embodiment.

In the first to fourth embodiments described above, out of the SRAM 51 and the DRAM 52, first the SRAM 51 is used and then the DRAM 52 is used. The present invention is, however, not limited to this example. For example, out of the SRAM 51 and the DRAM 52, first the DRAM 52 may be used and then the SRAM 51 may be used. Specifically, the DRAM 52 may be used as a first memory to perform the "first rearrangement processing" on a group of pixels in the input image, and the SRAM 51 may be used as a second memory (second memory for outputting the image that has undergone the second rearrangement processing for subsequent processing) to perform the second rearrangement processing P2. In other words, the "inter-block rearrangement processing" may be performed as the "first rearrangement processing" P1, and the "intra-block rearrangement processing" may be performed as the "second rearrangement processing" P2. The fifth to eighth embodiments describe such modes.

Figure 37:
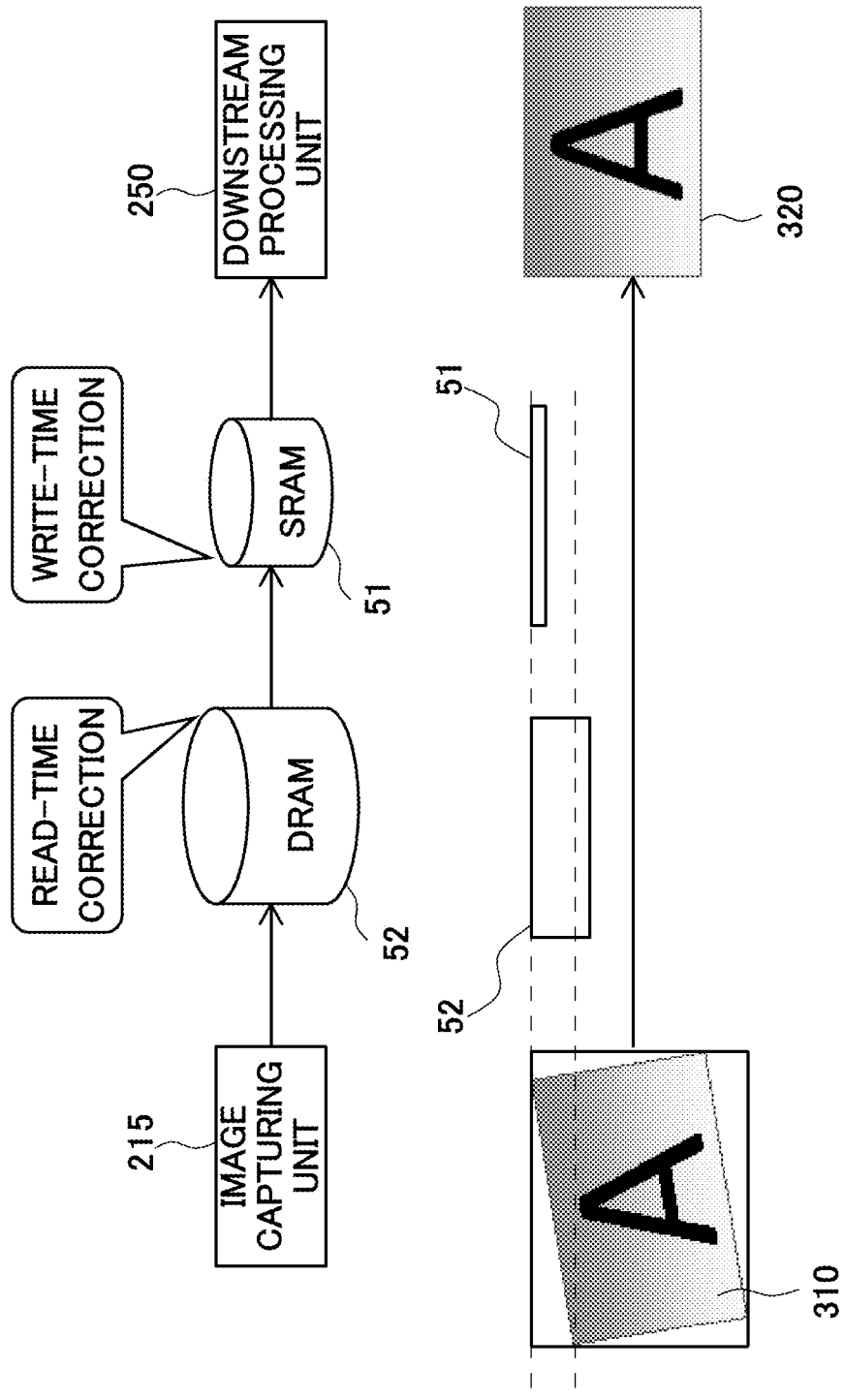
FIG. 37 illustrates an overview of a fifth embodiment.

According to the fifth embodiment, the first rearrangement processing P1 (and the "inter-block rearrangement processing") is performed substantially at the time of reading-out from the DRAM 52 (at the read time) as illustrated in FIG. 37. The second rearrangement processing P2 (and the "intra-block rearrangement processing") is performed substantially at the time of writing to the SRAM 51 (at the write time). In short, DRAM read-time correction and SRAM write-time correction are performed (in this order) according to the fifth embodiment. Variations of the fifth embodiment (variations similar to the second to fourth embodiments) will be described in the sixth to eighth embodiments.

Figure 38:
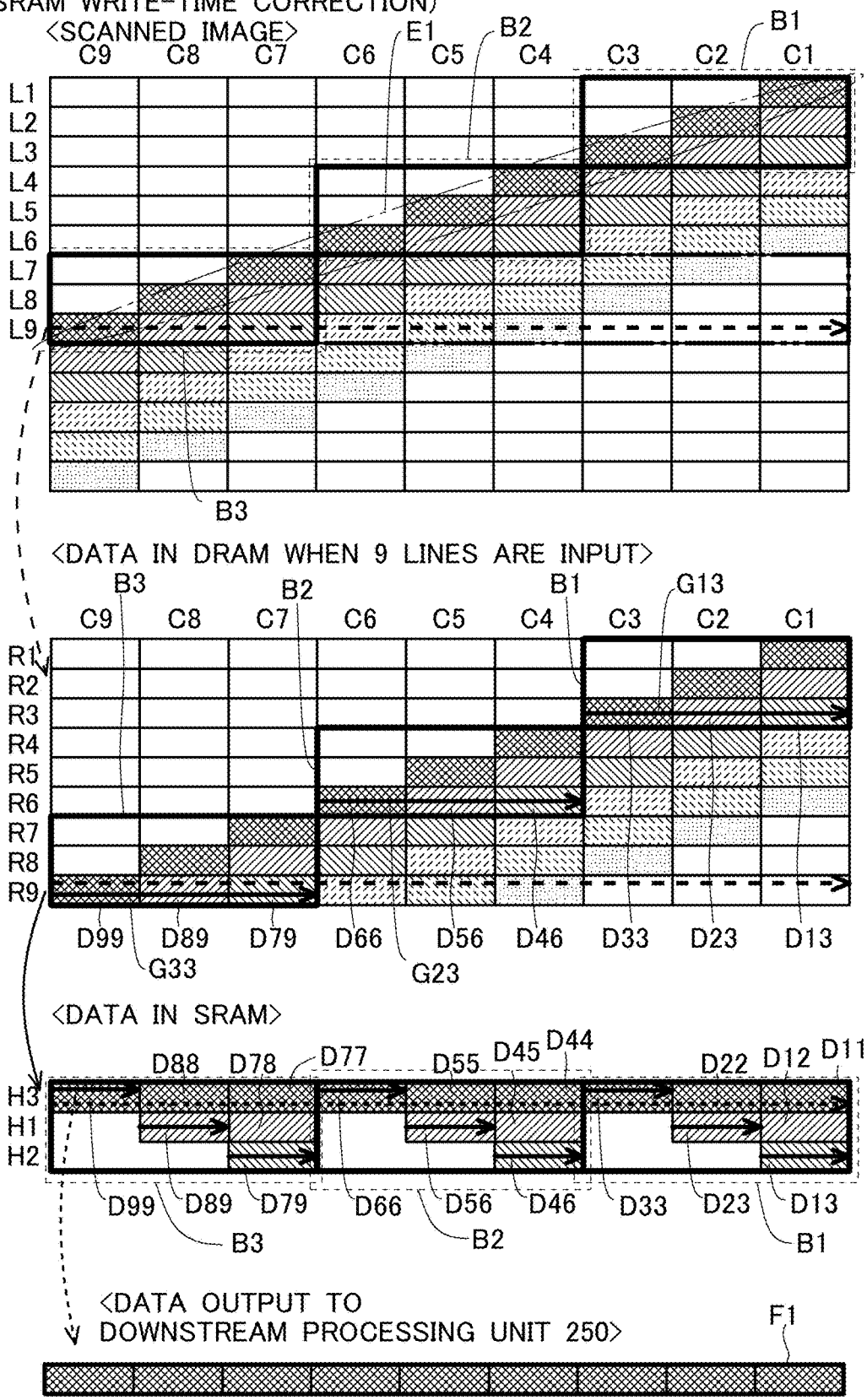
FIG. 38 is a descriptive diagram illustrating a rearrangement operation according to the fifth embodiment.

In the fifth embodiment, rearrangement processing in units of block images ("inter-block rearrangement processing") is performed using the DRAM 52 on the three block images B1 to B3 that include the first oblique line E1 in the input image (three block images for the oblique line E1), and pixel rows obtained by the rearrangement are arranged in the SRAM 51, as illustrated in FIG. 38 and other drawings. Moreover, rearrangement processing ("intra-block rearrangement processing") in each block image Bi is performed using the SRAM 51.

5-2. Detailed Operation

In the fifth embodiment, when the image reading unit 2 has started a scan operation after detection of the oblique angle θ, operations as illustrated in FIGS. 39 to 47 are performed, instead of the operations illustrated in FIGS. 10 to 18.

In the above-described first embodiment, all pixel rows in each line image (e.g., each line pixel row L1 or L2) captured by the image capturing unit 215 are written in the as-is order (as a single line image) to continuous addresses (in the same line) in the SRAM 51 (see the arrow indicated by the broken line in the SRAM 51 in FIG. 8).

In the fifth embodiment, on the other hand, all pixel rows in each line image (e.g., each line pixel row L1 or L2) captured by the image capturing unit 215 are written in the as-is order (as a single line image) to continuous addresses in the "DRAM 52" (see the arrow indicated by the broken line in the DRAM 52 in FIG. 38).

First to Sixth Lines

Figure 39:
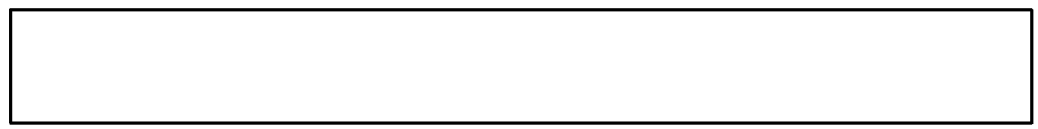
FIG. 39 illustrates processing performed on each line pixel row.

First, the first line pixel row L1 (see the uppermost row in FIG. 38) received from the image capturing unit 215 is continuously written in the as-is order to a single X-direction line R1 (to be more specific, continuous addresses corresponding to the line R1) in the DRAM 52 as illustrated in the upper section in FIG. 39 (see the thick broken line in FIG. 39).

Figure 40:
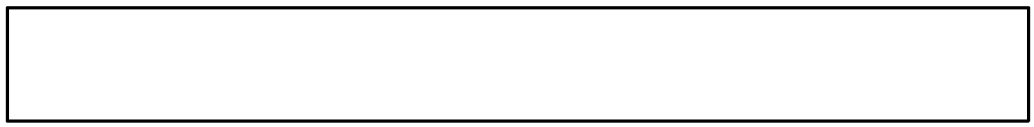
FIG. 40 illustrates processing performed on each line pixel row.

Next, the second line pixel row L2 received from the image capturing unit 215 is continuously written in the as-is order to a single X-direction line R2 (to be more specific, continuous addresses corresponding to the line R2) in the DRAM 52 as illustrated in the upper section in FIG. 40 (see the thick broken line in FIG. 40).

Similarly, the line pixel rows L3 to L6 received from the image capturing unit 215 are respectively written to single X-direction lines R3 to R6 in the DRAM 52 as illustrated in FIGS. 41 to 44 (see the thick broken lines in FIGS. 41 to 44).

Seventh Line

Thereafter, the seventh line pixel row L7 received from the image capturing unit 215 is continuously written in the as-is order to a single X-direction line R7 in the DRAM 52 as illustrated in the upper section in FIG. 45 (see the thick broken line in FIG. 45).

In this way, at the time of writing to the DRAM 52, each line pixel row in the input image is written in the as-is order to each corresponding line (line extending in the X direction) in the DRAM 52.

Here, the line pixel row L7 to be read out is a line pixel row that is (N−1) rows (in the present example, two rows) before the line pixel row L9 including the partial pixel row D99 at the other end (left end in FIG. 38) of the oblique line E1, and belongs to the last block image B3 (on the left end) including the partial pixel row D99. The processing of reading-out from the DRAM 52 is started from this point in time (at the time when the writing of the line pixel row L7 is completed).

In the processing of reading-out from the DRAM 52, a plurality of block images arranged nonlinearly in the DRAM 52 (to be more specific, a plurality of block images arranged in different groups of lines (at different Y-direction poisons) in the DRAM 52) are read out by using random access to the DRAM 52 (random access in units of blocks). Thus, the block images are rearranged so as to be linearly aligned (in the X direction).

To be more specific, a plurality of intra-block serial pixel rows in different lines in the DRAM 52 (in other words, arranged at discontinuous positions in the DRAM 52) are continuously read out. Each of the intra-block serial pixel rows is constituted by pixel rows arranged continuously in the same line in each block image. At the time of writing to the DRAM 52, the intra-block serial pixel rows that belong to different block images are arranged at discontinuous positions (nonlinearly).

In the processing of reading-out from the DRAM 52, the intra-block serial pixel row (partial pixel rows D97, D87, and D77) in the line pixel row L7, the intra-block serial pixel row (partial pixel rows D64, D54, and D44) in the line pixel row L4, and the intra-block serial pixel row (partial pixel rows D31, D21, and D11) in the line pixel row L1 are continuously read out as illustrated in FIG. 45.

In other words, a plurality of intra-block serial pixel rows G31, G21, and G11 relating respectively to the plurality of block images B3, B2, and B1 (for the oblique line E) are read out in this order. The partial pixel rows D97, D87, and D77 constitute the intra-block serial pixel row G31(3, 1) relating to the block image B3, the partial pixel rows D64, D54, and D44 constitute the intra-block serial pixel row G21(2, 1) relating to the block image B2, and the partial pixel rows D31, D21, and D11 constitute the intra-block serial pixel row G11(1, 1) relating to the block image B1. Here, an intra-block serial pixel row Gij(i, j) represents a serial pixel row in the j-th line in the i-th block image Bi, and can also be expressed simply as "Gij."

As a result of this reading-out processing, the intra-block serial pixel rows G31, G21, and G11 are rearranged among the block images B3, B2, and B1 so as to become continuous.

In this way, the "inter-block rearrangement processing" is performed substantially at the time of reading-out from the DRAM 52.

The intra-block serial pixel rows G31, G21, and G11 read out from the DRAM 52 are written to the SRAM 51.

According to the fifth embodiment, the "intra-block rearrangement processing" is performed substantially at the time of writing to the SRAM 51.

Specifically, for the intra-block serial pixel row G31 in the block image B3, the partial pixel row D97 is written to the sectional range C9 of the line H1 in the SRAM 51, the partial pixel row D87 is written to the sectional range C8 of the line H2 in the SRAM 51, and the partial pixel row D77 is written to the sectional range C7 of the line H3 in the SRAM 51.

For the intra-block serial pixel row G21 in the block image B2, the partial pixel row D64 is written to the sectional range C6 of the line H1 in the SRAM 51, the partial pixel row D54 is written to the sectional range C5 of the line H2 in the SRAM 51, and the partial pixel row D44 is written to the sectional range C4 of the line H3 in the SRAM 51.

For the intra-block serial pixel row G11 in the block image B1, the partial pixel row D31 is written to the sectional range C3 of the line H1 in the SRAM 51, the partial pixel row D21 is written to the sectional range C2 of the line H2 in the SRAM 51, and the partial pixel row D11 is written to the sectional range C1 of the line H3 in the SRAM 51.

Eighth Line

Thereafter, the eighth line pixel row L8 received from the image capturing unit 215 is continuously written in the as-is order to the single X-direction line R8 in the DRAM 52 as illustrated in the upper section in FIG. 46 (see the thick broken line in FIG. 46).

Then, processing of reading-out from the DRAM 52 is performed.

In this reading-out processing, an intra-block serial pixel row (partial pixel rows D98, D88, and D78) in the line pixel row L8 (R8), an intra-block serial pixel row (partial pixel rows D65, D55, and D45) in the line pixel row L5(R5), and an intra-block serial pixel row (partial pixel rows D32, D22, and D12) in the line pixel row L2 are continuously read out.

In other words, a plurality of intra-block serial pixel rows G32, G22, and G12 relating respectively to the plurality of block images B3, B2, and B2 (for the oblique line E1) are read out in this order. The partial pixel rows D98, D88, and D78 constitute the intra-block serial pixel row G32(3, 2) relating to the block image B3, the partial pixel rows D65, D55, and D45 constitute the intra-block serial pixel row G22(2, 2) relating to the block image B2, and the partial pixel rows D32, D22, and D12 constitute the intra-block serial pixel row G12(1, 2) relating to the block image B1.

Thus, the intra-block serial pixel rows G32, G22, and G12 are rearranged among the block images B3, B2, B1 so as to become continuous.

In this way, the "inter-block rearrangement processing" is performed substantially at the time of reading-out from the DRAM 52.

The intra-block serial pixel rows G32, G22, and G12 read out from the DRAM 52 are written to the SRAM 51.

Next, "intra-block rearrangement processing" (SRAM write-time correction) is performed.

First, each line Hi in the SRAM 51 is shifted to the line immediately above before the writing of the line pixel row L8 as illustrated in the lower section in FIG. 46. Specifically, the lowermost line H3 is shifted to the middle position, and the middle line H2 is shifted to the uppermost position. The uppermost line H1 is returned again to the lowermost position. In this way, each line in the SRAM 51 is used in cycles.

Then, for the intra-block serial pixel row G32 in the block image B3, the partial pixel row D98 is written to the sectional range C9 of the line H2 in the SRAM 51, the partial pixel row D88 is written to the sectional range C8 of the line H3 in the SRAM 51, and the partial pixel row D78 is written to the sectional range C7 of the line H1 in the SRAM 51.

For the intra-block serial pixel row G22 in the block image B2, the partial pixel row D65 is written to the sectional range C6 of the line H2 in the SRAM 51, the partial pixel row D55 is written to the sectional range C5 of the line H3 in the SRAM 51, and the partial pixel row D45 is written to the sectional range C4 of the line H1 in the SRAM 51.

For the intra-block serial pixel row G12 in the block image B1, the partial pixel row D32 is written to the sectional range C3 of the line H2 in the SRAM 51, the partial pixel row D22 is written to the sectional range C2 of the line H3 in the SRAM 51, and the partial pixel row D12 is written to the sectional range C1 of the line H1 in the SRAM 51.

Ninth Line

Figure 47:
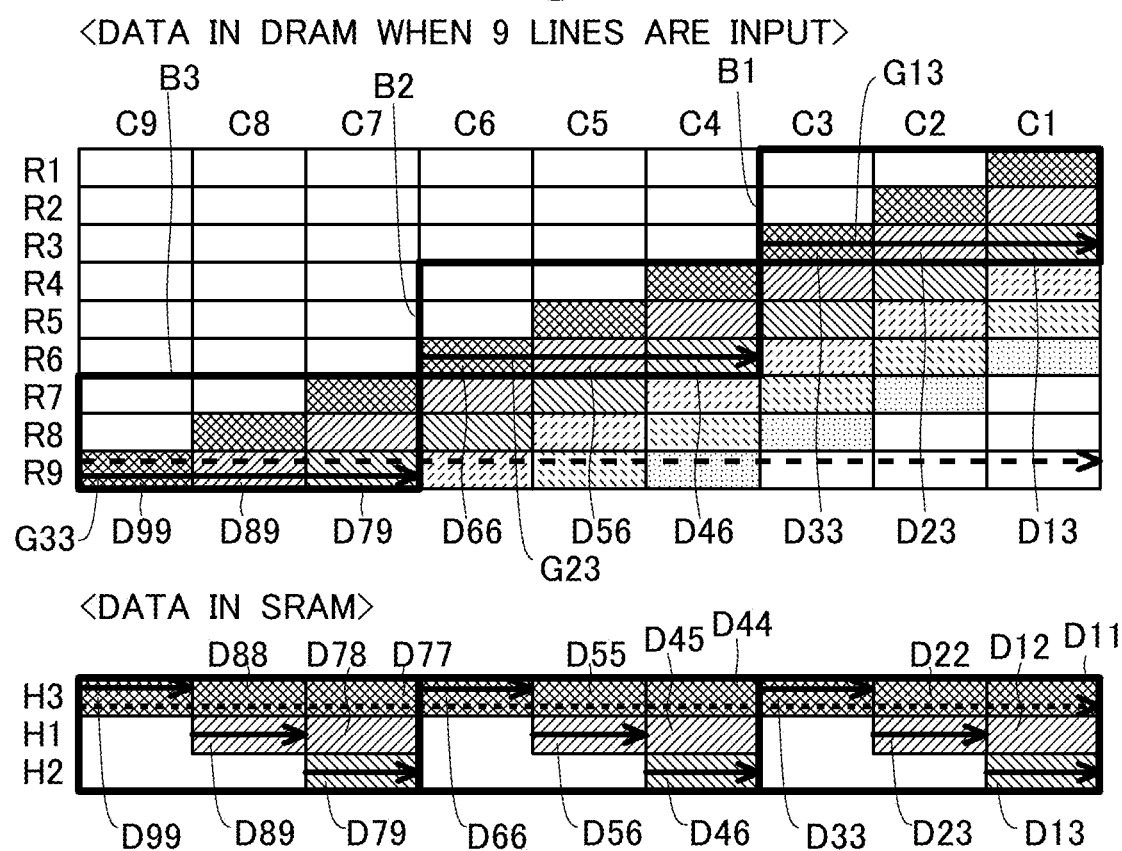
FIG. 47 illustrates processing performed on each line pixel row.

Thereafter, the ninth line pixel row L9 received from the image capturing unit 215 is continuously written in the as-is order to the single X-direction line R9 in the DRAM 52 as illustrated in FIG. 47 (see the thick broken line in FIG. 47).

Then, processing of reading-out from the DRAM 52 is performed. In the processing of reading-out from the DRAM 52, a plurality of intra-block serial pixel rows arranged in different lines (at different Y-direction positions) in the DRAM 52 are read out by using random access to the DRAM 52. In other words, a plurality of block images arranged in different groups of lines (at different Y-direction positions) in the DRAM 52 are read out by using random access to the DRAM 52 (random access in units of blocks). Thus, the block images are linearly aligned (in the X direction).

To be more specific, an intra-block serial pixel row G33 (partial pixel rows D99, D89, and D79) in the line pixel row L9 (R9), an intra-block serial pixel row G23 (partial pixel rows D66, D56, and D46) in the line pixel row L6 (R6), and an intra-block serial pixel row G13 (partial pixel rows D33, D23, and D13) in the line pixel row L3 are continuously read out. In other words, the intra-block serial pixel rows G33, G23, and G13 relating respectively to the block images B3, B2, and B1 (for the oblique line E1) are read out in this order. The partial pixel rows D99, D89, and D79 constitute the intra-block serial pixel row G33(3, 3) relating to the block image B3, the partial pixel rows D66, D56, and D46 constitute the intra-block serial pixel row G23(2, 3) relating to the block image B2, and the partial pixel rows D33, D23, and D13 constitute the intra-block serial pixel row G13(1, 3) relating to the block image B1.

As a result, the intra-block serial pixel rows G33, G23, and G13 are rearranged among the block images B3, B2, and B1 are rearranged so as to become continuous (to be linearly aligned). In other words, the intra-block serial pixel rows G33, G23, and G13 are rearranged so as to be linearly aligned.

In this way, the "inter-block rearrangement processing" is performed substantially at the time of reading-out from the DRAM 52.

The intra-block serial pixel rows G33, G23, and G13 read out from the DRAM 52 are written to the SRAM 51.

Next, "intra-block rearrangement processing" (SRAM write-time correction) is performed.

First, each line Hi in the SRAM 51 is shifted to the line immediately above before the writing of the line pixel row L9 as illustrated in the lower section in FIG. 47. Specifically, the lowermost line H1 is shifted to the middle position, and the middle line H3 is shifted to the uppermost position. The uppermost line H2 is returned again to the lowermost position.

Then, for the intra-block serial pixel row G33 in the block image B3, the partial pixel row D99 is written to the sectional range C9 of the line H3 in the SRAM 51, the partial pixel row D89 is written to the sectional range C8 of the line H1 in the SRAM 51, and the partial pixel row D79 is written to the sectional range C7 of the line H2 in the SRAM 51.

For the intra-block serial pixel row G23 in the block image B2, the partial pixel row D66 is written to the sectional range C6 of the line H3 in the SRAM 51, the partial pixel row D56 is written to the sectional range C5 of the line H1 in the SRAM 51, and the partial pixel row D46 is written to the sectional range C4 of the line H2 in the SRAM 51.

For the intra-block serial pixel row G13 in the block image B1, the partial pixel row D33 is written to the sectional range C3 of the line H3 in the SRAM 51, the partial pixel row D23 is written to the sectional range C2 of the line H1 in the SRAM 51, and the partial pixel row D13 is written to the sectional range C1 of the line H2 in the SRAM 51.

In this way, when each of the intra-block serial pixel rows G33, G23, and G13 rearranged by using the DRAM 52 is written to the SRAM 51, each partial pixel row ((D99, D89, D79), (D66, D56, D46), and (D33, D23, D13)) in each of the block images B3, B2, and B1 is written to a corresponding address at its target position after the rearrangement processing of the partial pixel row by using random access to the SRAM 51.

As a result, the corrected line image F1 for the deformed line E1 is arranged in particular in the line H3. To be more specific, serialized pixel rows (D99, D88, D77), (D66, D55, D44), and (D33, D22, D11) are generated in which the partial pixel rows in each block image Bi (for the oblique line E1) are rearranged so as to become continuous. Each of the serialized pixel rows can also be expressed as a pixel row obtained by rearranging the partial pixel rows in each block image Bi so as to arrange the partial pixel rows in the same line.

Then, at the time of reading-out from the SRAM 51, the partial pixel rows written at different times in each block image Bi (for the oblique line E1) (i.e., partial pixel rows arranged in the same line in the SRAM 51) (D99, D88, D77), (D66, D55, D44), and (D33, D22, D11) are continuously read out. In particular, the three serialized pixel rows (D99, D88, D77), (D66, D55, D44), and (D33, D22, D11) arranged in the same line in the SRAM 51 are continuously read out. Thus, a single line image (corrected line image F1) extracted from a plurality of blocks is generated.

Tenth and Subsequent Lines

Thereafter, processing for inputting the tenth line pixel row L10 from the image capturing unit 215 and other processing are also performed in the same manner.

After the processing for writing the tenth line pixel row L10 received from the image capturing unit 215 to the DRAM 52 has been performed, "inter-block rearrangement processing" is performed substantially at the time of reading-out from the DRAM 52. More specifically, rearrangement processing in units of block images ("inter-block rearrangement processing") is performed using the DRAM 52 on new three block images (block images for the oblique line E2) B1 to B3 that include the second oblique line E2 in the input image. Then, the rearranged pixel rows are arranged in the SRAM 51. Moreover, rearrangement processing ("intra-block rearrangement processing") in each block image Bi is performed using the SRAM 51. Then, through the same processing as described above, the oblique line E2 is converted into and output as the new line image F2.

As compared with the three block images B1 to B3 for the oblique line E1, the three block images B1 to B3 for the oblique line E2 are shifted to the line immediately below in the Y direction. For example, the block image B1 (for the oblique line E2) is present at a Y-direction position that corresponds to the X-direction lines L2 to L4 in the input image, the block image B2 (for the oblique line E2) is present at a Y-direction position that corresponds to the X-direction lines L5 to L7 in the input image, and the block image B3 (for the oblique line E2) is present at a Y-direction position that corresponds to the X-direction lines L8 to L10 in the input image.

Summary

As described above, the "inter-block rearrangement processing" is performed substantially at the time of reading-out from the DRAM 52 according to the fifth embodiment. The "intra-block rearrangement processing" is performed substantially at the time of writing to the SRAM 51.

More specifically, as illustrated in FIG. 45 to FIG. 47 (and FIG. 38), the rearrangement processing in units of block images ("inter-block rearrangement processing") is performed using the DRAM 52 on the three block images B1 to B3 that include the first oblique line E1 in the input image, and the rearranged pixel rows are arranged in the SRAM 51. Moreover, the rearrangement processing ("intra-block rearrangement processing") in each block image Bi is performed using the SRAM 51.

First, at the time of writing to the DRAM 52, each line pixel row in the input image is written to each corresponding line (extending in the X direction) in the DRAM 52. The rearrangement processing has not yet been performed at the time of this writing.

Then, at the time of reading-out from the DRAM 52, the block images B3 to B1 arranged in different groups of lines (at different Y-direction positions) in the DRAM 52 are read out by using random access to the DRAM 52. As a result of this reading-out processing (rearrangement processing), the block images B3 to B1 are linearly aligned (in the X direction).

According to the "inter-block rearrangement processing" using the DRAM 52, the pixel rows relating to the oblique line E1 included in the three block images B1 to B3 at different Y-direction positions are aggregated in the Y-direction size of the SRAM 51 (Y-direction size of N X-direction lines). To be more specific, the partial pixel rows D11, D12, D13, D22, D23, D33, D44, D45, D46, D55, D56, D66, D77, D78, D79, D88, D89, and D99 arranged at different Y-direction positions in the input image are arranged within the SRAM 51 (to be more specific, three X-direction lines in the SRAM 51).

Thereafter, the "intra-block rearrangement processing" is performed using the SRAM 51 (substantially at the time of writing to the SRAM 51).

Specifically, at the time of writing to the SRAM 51, each partial pixel row in each of the block images B3, B2, and B1 is written to a corresponding address at its target position after the rearrangement of the partial pixel row by using random access to the SRAM 51. For example, for the block image B3, the partial pixel rows D99, D88, and D77 arranged in different lines in the DRAM 52 are written to corresponding addresses at their target positions after the rearrangement processing of the partial pixel rows (sectional ranges C9, C8, and C7 of the line H3) by using random access to the SRAM 51. As a result, a serialized pixel row is generated in which the partial pixel rows D in each of the block image B3 to B1 are rearranged so as to be arranged in the same line. For example, the partial pixel rows D99, D88, and D77 in the block image B3 are rearranged so as to be arranged in the same line H3, so that a serialized pixel row of the partial pixel rows D99, D88, and D77 is generated. The same applies to the other block images B2 and B1. Specifically, the partial pixel rows D66, D55, and D44 in the block image B2, and the partial pixel rows D33, D22, and D11 in the block image B1 are arranged in the same line H3.

Then, at the time of reading-out from the SRAM 51, the partial pixel rows written at different times in each of the block images B3 to B1 (partial pixel rows arranged in the same line in the SRAM 51) are read out.

For example, the partial pixel rows D99, D88, and D77 written at different times in the block image B3 (partial pixel rows arranged in the same line H3 in the SRAM 51) are read out. The other partial pixel rows D arranged in the same line H3 (specifically, partial pixel rows D66, D55, and D44 in the block image B2 and partial pixel rows D33, D22, and D11 in the block image B1) are also sequentially read out. As a result, a single line image F1 extracted from the block images B3 to B1 is generated.

According to this "intra-block rearrangement processing" using the SRAM 51, the partial pixel rows D99, D88, D77, D66, D55, D44, D33, D22, and D11 that are in the single oblique line E1 and that are arranged in the three different X-direction lines H1, H2, and H3 in the SRAM 51 are continuously aligned in a single X-direction line (e.g., H3). That is, the partial pixel rows in the single oblique line E1 are written to the single X-direction line in the SRAM 51. By reading out these partial pixel rows as-is, the new line image F1 (corrected line image) corresponding to the oblique line E1 can be output to the downstream processing unit 250.

6. Sixth Embodiment

6-1. Overview

A sixth embodiment is a variation of the fifth and other embodiments. The following description focuses on differences from the fifth embodiment.

Figure 48:
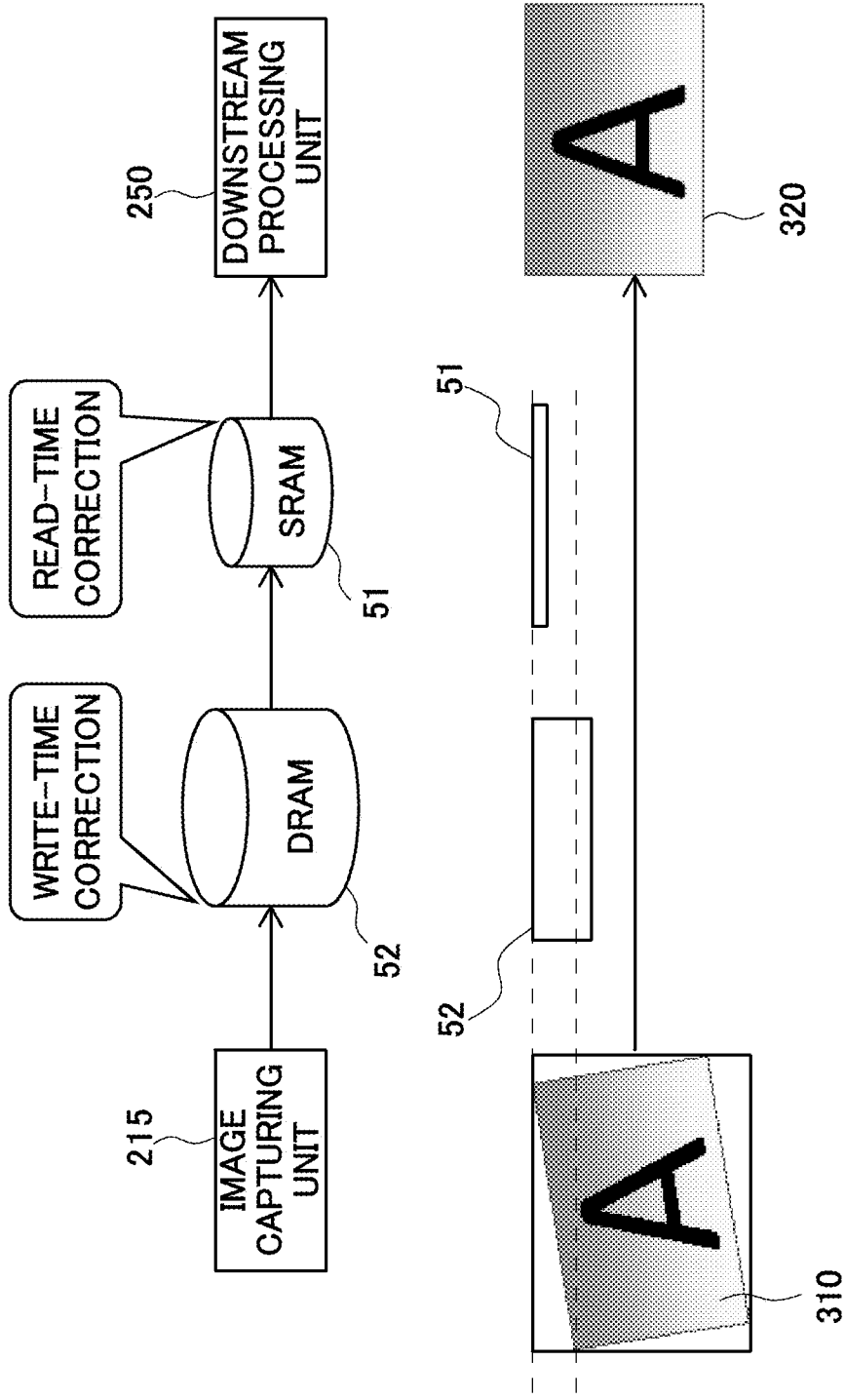
FIG. 48 illustrates an overview of a sixth embodiment.
Figure 52:
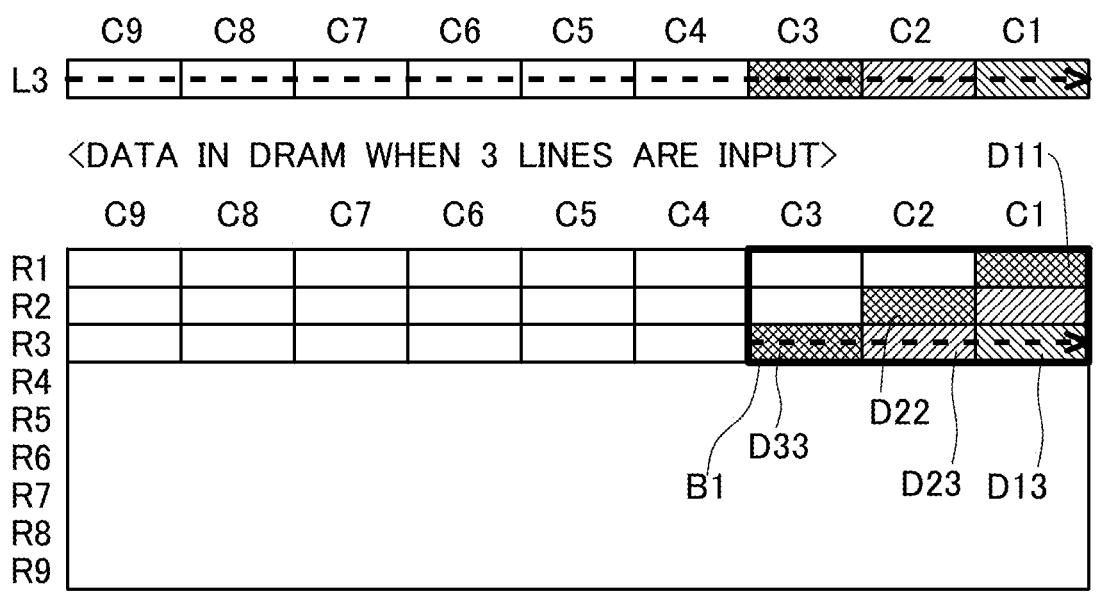
FIG. 52 illustrates processing performed on each line pixel row.

According to the sixth embodiment, the first rearrangement processing P1 (and the "inter-block rearrangement processing") is performed substantially at the time of writing to the DRAM 52 (at the write time) as illustrated in FIG. 48. The second rearrangement processing P2 (and the "intra-block rearrangement processing") is performed substantially at the time of reading-out from the SRAM 51 (at the read time). In short, DRAM write-time correction and SRAM read-time correction are performed (in this order) according to the sixth embodiment.

Specifically, as illustrated in FIG. 49 and other drawings, rearrangement processing in units of block images ("inter-block rearrangement processing") is performed using the DRAM 52 on the three block images B1 to B3 including the oblique line E1 in the input image (block images for the first oblique line E1), and the rearranged pixel rows are arranged in the SRAM 51. Moreover, rearrangement processing ("intra-block rearrangement processing") in each block image Bi (for the oblique line E1) is performed using the SRAM 51.

In particular in the sixth embodiment, at the time of writing to the DRAM 52, the block images B1 to B3 including the oblique line E1 are rearranged in units of blocks so as to be arranged at the same Y-direction position. Moreover, at the time of reading-out from the SRAM 51, a plurality of partial pixel rows D relating to the oblique line E1 in each block image Bi are rearranged so as to be arranged at the same Y-direction position.

6-2. Detailed Operations

In the sixth embodiment, when the image reading unit 2 has started a scan operation after detection of the oblique angle θ, operations as illustrated in FIGS. 50 to 58 are performed, instead of the operations illustrated in FIGS. 39 to 47.

First to Third Lines

Figure 41:
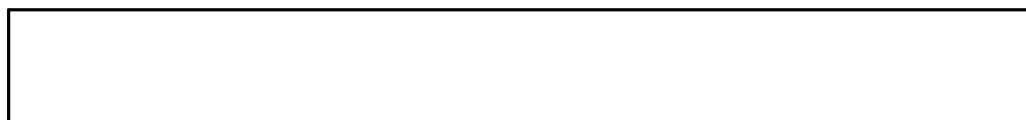
FIG. 41 illustrates processing performed on each line pixel row.
Figure 42:
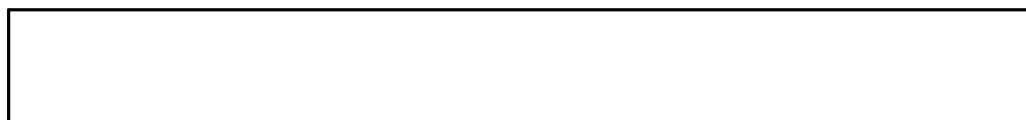
FIG. 42 illustrates processing performed on each line pixel row.
Figure 43:
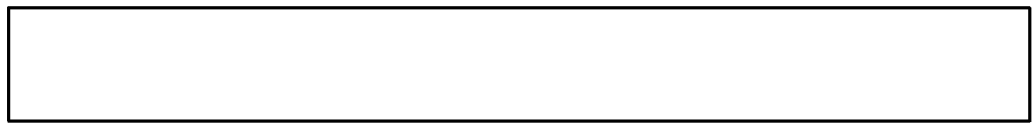
FIG. 43 illustrates processing performed on each line pixel row.
Figure 44:
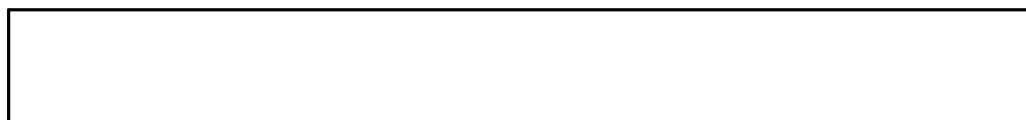
FIG. 44 illustrates processing performed on each line pixel row.

As can be seen from comparison with FIGS. 39, 40, and 41, processing performed on the first line pixel row L1 (FIG. 50), processing performed on the second line pixel row L2 (FIG. 51), and processing performed on the third line pixel row L3 (FIG. 52) according to the sixth embodiment are the same as those in the fifth embodiment. In particular, in each of the line pixel rows L1, L2, and L3, a portion (sectional ranges C3 to C1) corresponding to the block image B1 (for the oblique line E1) is written to the DRAM 52. As a result, the block image B1 including the partial pixel rows D11, D22, and D33 in the oblique line E1 is stored in the DRAM 52.

Fourth to Sixth Lines

Next, for the fourth line pixel row L4 received from the image capturing unit 215, the sectional ranges C3 to C1 (partial pixel rows D34, D24, and D14) that correspond to the block image B1 (for the oblique line E2) are written to corresponding areas (sectional ranges C3 to C1 of the fourth line R4) in the DRAM 52 as illustrated in FIG. 53 (see the arrow indicated by the broken line). Moreover, in the fourth line pixel row L4 received from the image capturing unit 215, the sectional ranges C6 to C4 (partial pixel rows D46, D54, and D44) that correspond to the block image B2 (for the oblique line E1) are written to corresponding areas (sectional ranges C6 to C4 of the first line R1) in the DRAM 52 (see the arrow indicated by the broken line). Note that a portion corresponding to the sectional range C9 to C7 of the fourth line pixel row L4 received from the image capturing unit 215 is discarded. In this way, the portion corresponding to the sectional ranges C1 to C6 (portion corresponding to the block images B1 and B2) in the fourth line pixel row L4 is stored in the DRAM 52.

Figure 54:
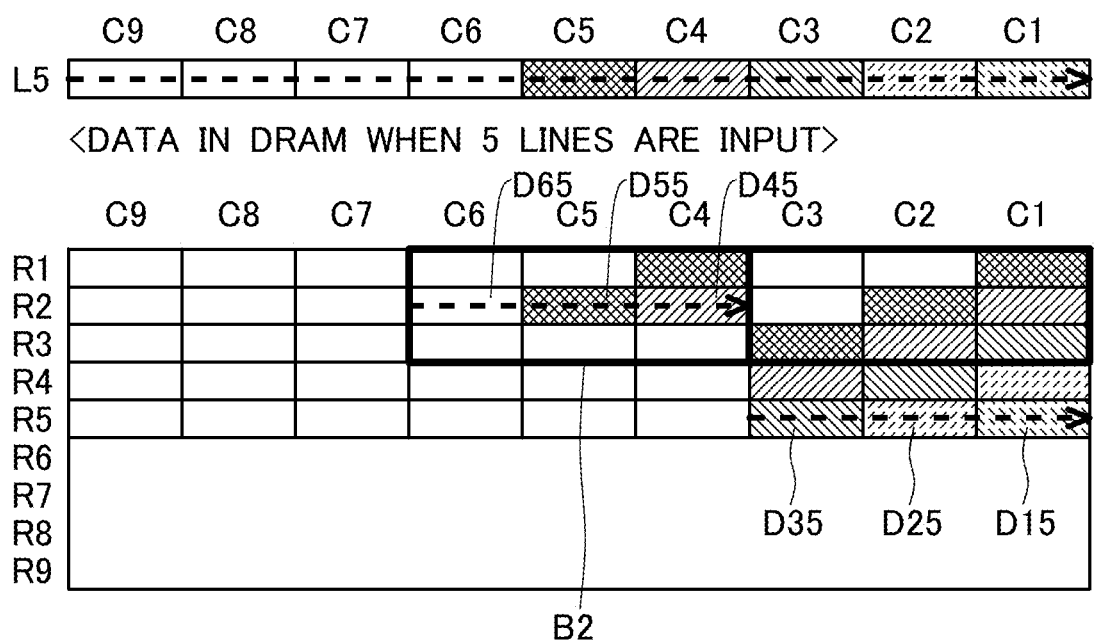
FIG. 54 illustrates processing performed on each line pixel row.

For the fifth line pixel row L5 received from the image capturing unit 215, the sectional ranges C3 to C1 (partial pixel rows D35, D25, and D15) that correspond to the block image B1 (for the oblique line E3) are written to corresponding areas (sectional ranges C3 to C1 of the fifth line R5) in the DRAM 52 as illustrated in FIG. 54. For the fifth line pixel row L5 received from the image capturing unit 215, the sectional ranges C6 to C4 (partial pixel rows D65, D55, and D45) that correspond to the block image B2 (for the oblique line E1) are also written to corresponding areas (sectional ranges C6 to C4 of the second line R2) in the DRAM 52. Note that a portion corresponding to the sectional ranges C9 to C7 of the fifth line pixel row L5 received from the image capturing unit 215 is discarded. In this way, the portion corresponding to the sectional ranges C1 to C6 of the fifth line pixel row L5 (portion corresponding to the block images B1 and B2) is stored in the DRAM 52.

Moreover, For the sixth line pixel row L6 received from the image capturing unit 215, the sectional ranges C3 to C1 (partial pixel rows D36, D26, and D16) that correspond to the block image B1 (for the oblique line E4) are written to corresponding areas (sectional ranges C3 to C1 of the sixth line R6) in the DRAM 52 as illustrated in FIG. 55 (see the arrow indicated by the broken line). For the sixth line pixel row L6 received from the image capturing unit 215, the sectional ranges C6 to C4 (partial pixel rows D66, D56, and D46) that correspond to the block image B2 (for the oblique line E1) are also written to corresponding areas (sectional ranges C6 to C4 of the third line R3) in the DRAM 52 (see the arrow indicated by the broken line). Note that a portion corresponding to the sectional range C9 to C7 of the sixth line pixel row L6 received from the image capturing unit 215 is discarded. In this way, the portion corresponding to the sectional ranges C1 to C6 (portion corresponding to the block images B1 and B2) in the sixth line pixel row L6 is stored in the DRAM 52.

Seventh Line

Figure 56:
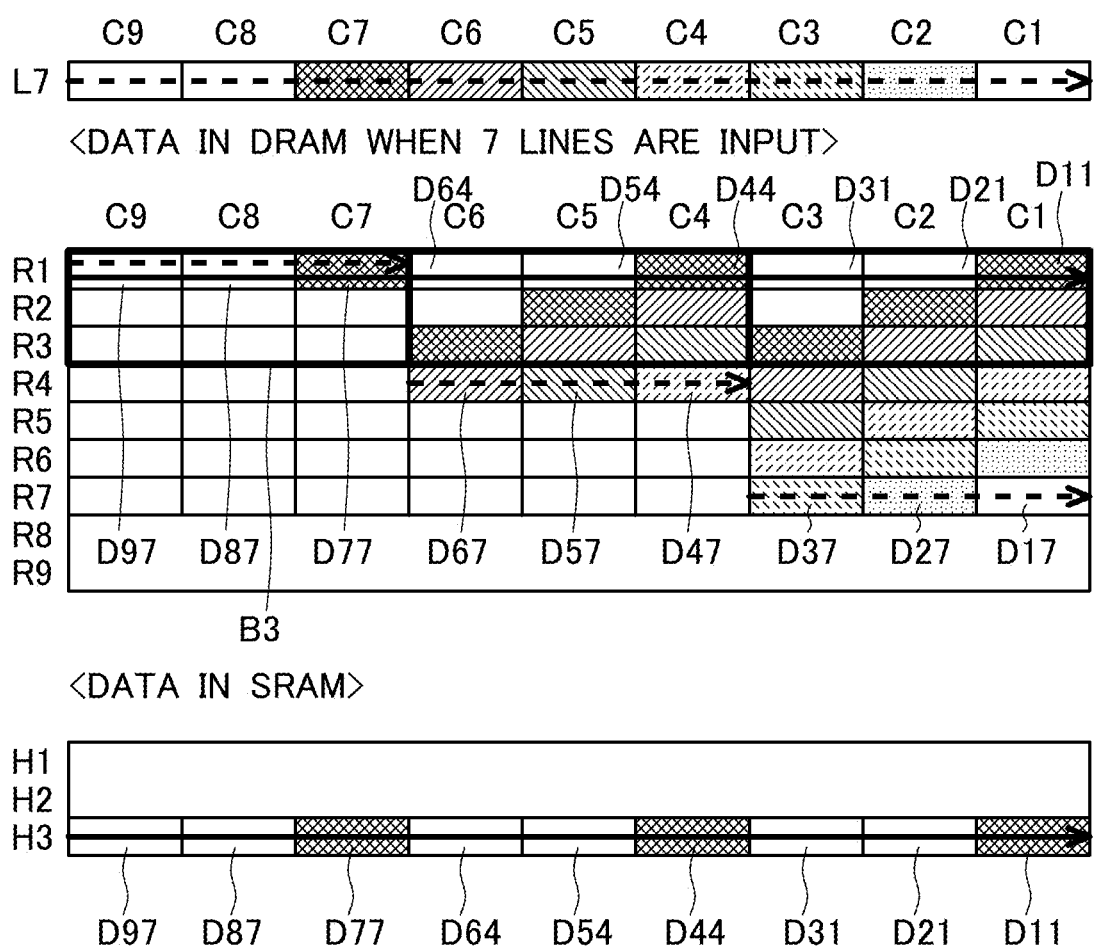
FIG. 56 illustrates processing performed on each line pixel row.

Next, for the seventh line pixel row L7 received from the image capturing unit 215, the sectional ranges C3 to C1 (partial pixel rows D37, D27, and D17) that correspond to the block image B1 (for the oblique line E5) are written to corresponding areas (sectional ranges C3 to C1 of the seventh line R7) in the DRAM 52 as illustrated in FIG. 56 (see the arrow indicated by the broken line). For the seventh line pixel row L7 received from the image capturing unit 215, the sectional ranges C6 to C4 (partial pixel rows D67, D57, and D47) that correspond to the block image B2 (for the oblique line E2) are written to corresponding areas (sectional ranges C6 to C4 of the fourth line R4) in the DRAM 52 (see the arrow indicated by the broken line). Moreover, for the seventh line pixel row L7 received from the image capturing unit 215, the sectional ranges C9 to C7 (partial pixel rows D97, D87, and D77) that correspond to the block image B3 (for the oblique line E1) are written to corresponding areas (sectional range C9 to C7 of the first line R1) in the DRAM 52 (see the arrow indicated by the broken line). As a result of this processing, the portion corresponding to the sectional ranges C1 to C9 (portions corresponding to the block images B1, B2, and B3) in the seventh line pixel row L7 is stored in the DRAM 52. Note that the three partial pixel rows D97, D87, and D77 in the block image B3 can also be expressed as intra-block serial pixel rows (D97, D87, D77). Continuous partial pixel rows in the other same block image B can also be expressed in this way.

As a result, the block images (block images for the oblique line E1) B1, B2, B3 that are present at different X-direction positions in the input image are rearranged so as to be arranged at the same Y-direction position. Specifically, these block images B1, B2, and B3 are arranged at the Y-direction position that corresponds to the lines R1 to R3 in the DRAM 52.

In this way, the "inter-block rearrangement processing" using the DRAM 52 is performed.

Thereafter, processing of reading-out from the DRAM 52 is performed. At this time, the pixel rows in the first line R1 are read out from the DRAM 52 (see the arrow indicated by the thick solid line in FIG. 56). More specifically, a plurality of intra-block serial pixel rows (D97, D87, D77), (D64, D54, D44), and (D31, D21, D11) written at different times to the DRAM 52 for the block images B1, B2, and B3 (for the oblique line E1) and continuously arranged in the same line in the DRAM 52 are continuously read out. As a result, the intra-block serial pixel rows (D97, D87, D77), (D64, D54, D44), and (D31, D21, D11) are read out from the DRAM 52 (from the same line R1) so as to be continuous among the block images.

The read intra-block serial pixel rows are continuously written in the as-is order to the SRAM 51 (the same line; e.g., line H3).

Eighth Line

Figure 57:
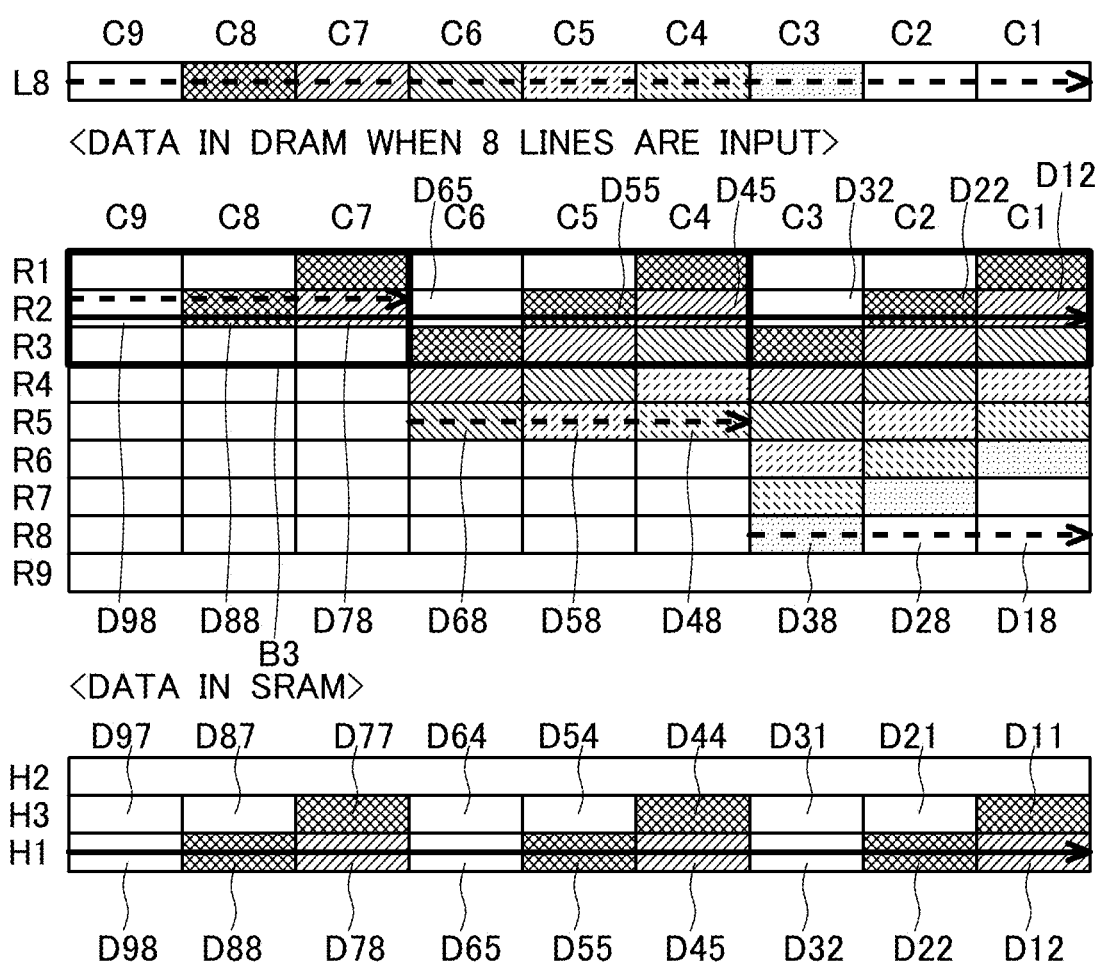
FIG. 57 illustrates processing performed on each line pixel row.

Next, for the eighth line pixel row L8 received from the image capturing unit 215, the sectional ranges C3 to C1 (partial pixel rows D38, D28, and D18) that correspond to the block image B1 (for the oblique line E6) are written to corresponding areas (sectional ranges C3 to C1 of the eighth line R8) in the DRAM 52 as illustrated in FIG. 57 (see the arrow indicated by the broken line). For the eighth line pixel row L8 received from the image capturing unit 215, the sectional ranges C6 to C4 (partial pixel rows D68, D58, and D48) that correspond to the block image B2 (for the oblique line E3) are also written to corresponding areas (sectional ranges C6 to C4 of the fifth line R5) in the DRAM 52 (see the arrow indicated by the broken line). Moreover, for the eighth line pixel row L8 received from the image capturing unit 215, the sectional ranges C9 to C7 (partial pixel rows D98, D88, and D78) that correspond to the block image B3 (for the oblique line E1) are also written to corresponding areas (sectional ranges C9 to C7 of the second line R2) in the DRAM 52 (see the arrow indicated by the broken lines). In this way, the portion corresponding to the sectional ranges C1 to C9 (portion corresponding to the block images B1, B2, and B3) in the eighth line pixel row L8 is stored in the DRAM 52.

As a result, the block images (block images for the oblique line E1) B1, B2, and B3 that are present at different Y-direction positions in the input image are rearranged so as to be arranged at the same Y-direction position. Specifically, these block images B1, B2, and B3 are arranged at the Y-direction position that correspond to the lines R1 to R3 in the DRAM 52 by the rearrangement.

In this way, the "inter-block rearrangement processing" using the DRAM 52 is performed.

Thereafter, processing of reading-out from the DRAM 52 is performed. Specifically, the pixel rows in the second line R2 are read out from the DRAM 52 (see the arrow indicated by the thick solid line in FIG. 57). More specifically, a plurality of intra-block serial pixel rows (D98, D88, D78), (D65, D55, D45), and (D32, D22, D12) written at different times to the DRAM 52 for the block images B1, B2, and B3 (for the oblique line E1) and continuously arranged in the DRAM 52 are continuously read out. As a result, the intra-block serial pixel rows (D98, D88, D78), (D65, D55, D45), and (D32, D22, D12) are read out from the DRAM 52 (from the same line R2) so as to be continuous among the block images.

The read intra-block serial pixel rows are continuously written in the as-is order to the SRAM 51 (the same line; e.g., line H1). Before the writing, each line Hi in the SRAM 51 is shifted to the line immediately above. Specifically, the lowermost line H3 is shifted to the middle position, the middle line H2 is shifted to the uppermost position, and the uppermost line H1 is returned to the lowermost position. In this way, the SRAM 51 is used in cycles.

Ninth Line

Figure 58:
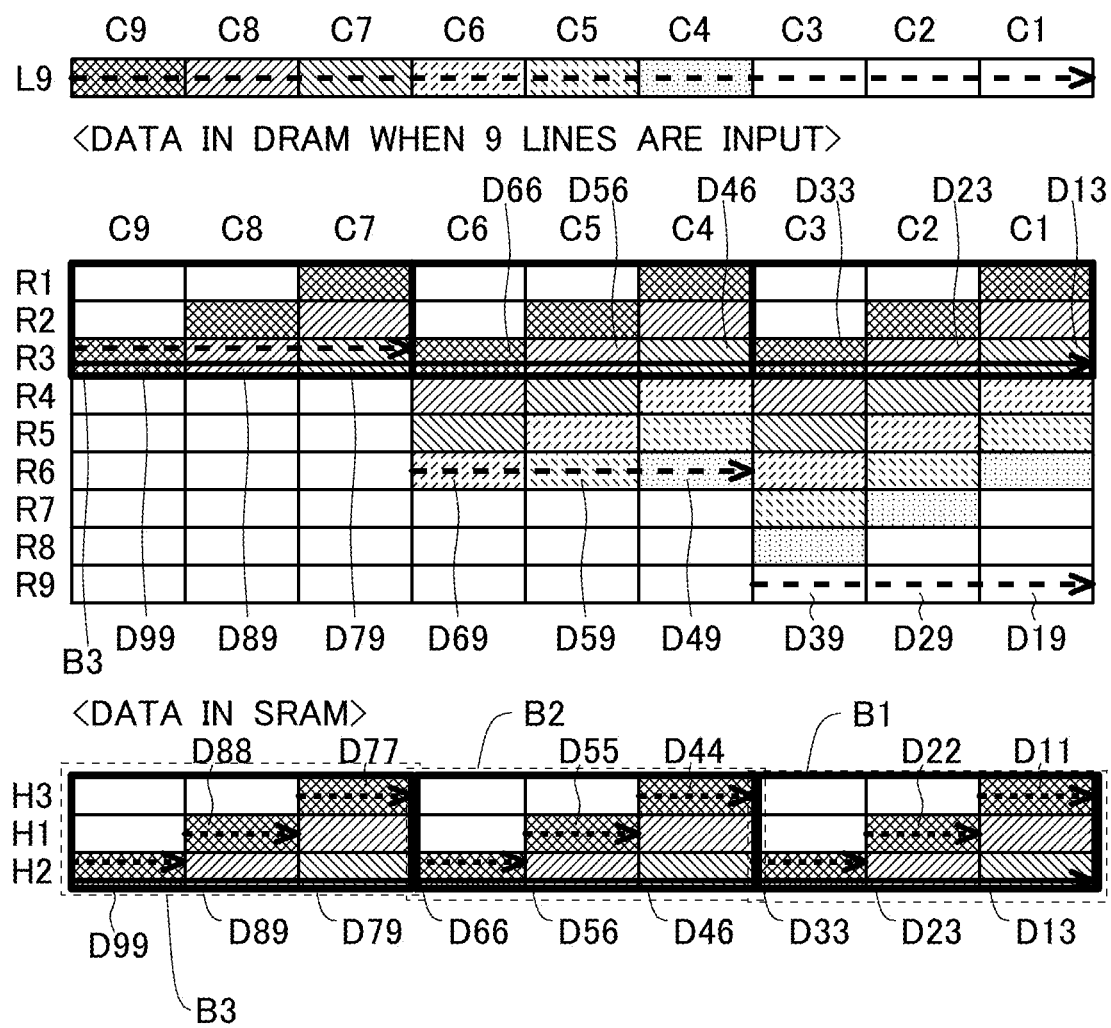
FIG. 58 illustrates processing performed on each line pixel row.

Next, for the ninth line pixel row L9 received from the image capturing unit 215, the sectional ranges C3 to C1 (partial pixel rows D39, D29, and D19) that correspond to the block image B1 (for the oblique line E7) are written to corresponding areas (sectional ranges C3 to C1 of the ninth line R9) in the DRAM 52 as illustrated in FIG. 58 (see the arrow indicated by the broken line). For the ninth line pixel row L9 received from the image capturing unit 215, the sectional ranges C6 to C4 (partial pixel rows D69, D59, and D49) that correspond to the block image B2 (for the oblique line E4) are also written to corresponding areas (sectional ranges C6 to C4 of the sixth line R6) in the DRAM 52 (see the arrow indicated by the broken line). Moreover, for the ninth line pixel row L9 received from the image capturing unit 215, the sectional ranges C9 to C7 (partial pixel rows D99, D89, and D79) that correspond to the block image B3 (for the oblique line E1) are written to corresponding areas (sectional ranges C9 to C7 of the third line R3) in the DRAM 52 (see the arrow indicated by the broken line). In this way, the portion corresponding to the sectional ranges C1 to C9 (portion corresponding to the block images B1, B2, and B3) in the ninth line pixel row L9 is stored in the DRAM 52.

As a result, the block images (block images for the oblique line E1) B1, B2, and B3 that are present at different Y-direction positions in the input image are rearranged so as to be arranged at the same Y-direction position. Specifically, these block images B1, B2, and B3 are arranged at the Y-direction position that correspond to the lines R1 to R3 in the DRAM 52 by the rearrangement. In other words, a plurality of intra-block serial pixel rows that belong to different lines in the input image are written to corresponding addresses at their target positions after the rearrangement of the intra-block serial pixel rows (positions at which the intra-block serial pixel rows are linearly aligned).

In this way, the "inter-block rearrangement processing" using the DRAM 52 is performed.

Thereafter, processing of reading-out from the DRAM 52 is performed. Specifically, the pixel rows in the third line R3 are continuously read out from the DRAM 52 (see the arrow indicated by the thick solid line in FIG. 58). More specifically, a plurality of intra-block serial pixel rows (D99, D89, D79), (D66, D56, D46), and (D33, D23, D13) written at different times to the DRAM 52 for the block images B1, B2, and B3 (for the oblique line E1) and continuously arranged in the same line in the DRAM 52 are continuously read out. As a result, the intra-block serial pixel rows (D99, D89, D79), (D66, D56, D46), and (D33, D23, D13) are rearranged and read out so as to be linearly aligned among the block images.

The read intra-block serial pixel rows are continuously written in the as-is order to the SRAM 51 (the same line; e.g., line H2). Note that the line to be written is changed anytime as described above, and the SRAM 51 is used in cycles.

Thereafter, "intra-block rearrangement processing" is performed substantially at the time of reading-out from the SRAM 51.

Specifically, for each of the intra-block serial pixel rows rearranged by the "inter-block rearrangement processing" using the DRAM 52, processing for rearranging partial pixel rows D in the intra-block serial pixel row is performed by using random access to the SRAM 51. To be more specific, a plurality of partial pixel rows arranged in stepwise form in each block image (partial pixel rows arranged at discontinuous addresses (in different lines) in the SRAM 51) are continuously read out. As a result, a serialized pixel row is generated in which the partial pixel rows in each block image are rearranged so as to be linearly aligned (continuously arranged).

For example, the partial pixel rows D99, D88, and D77 arranged in stepwise form in the block image B3 (for the oblique line E1) are continuously read out. As a result, a serialized pixel row is generated in which the partial pixel rows D99, D88, and D77 in the block image B3 are rearranged so as to be linearly aligned.

Similarly, the partial pixel rows D66, D55, and D44 arranged in stepwise form in the block image B2 (for the oblique line E1) are continuously read out. As a result, a serialized pixel row is generated in which the partial pixel rows in the block image B2 are rearranged so as to be linearly aligned.

Moreover, the partial pixel rows D33, D22, and D11 arranged in stepwise form in the block image B1 (for the oblique line E1) are continuously read out. As a result, a serialized pixel row is generated in which the partial pixel rows D33, D22, and D11 in the block image B1 are rearranged so as to be linearly aligned.

Then, the serialized pixel rows (D99, D88, D77), (D66, D55, D44), and (D33, D22, D11) generated for all of the block image B3, B2, and B1 (for the oblique line E1) are continuously read out. As a result, a single line image F1 extracted from a plurality of blocks is generated and output. At this time, since the "inter-block rearrangement processing" for the block images B3, B2, B1 (for the oblique line E1) has already been completed in advance, the completion of the "intra-block rearrangement processing" completes the rearrangement processing of a single line, and the line image F1 obtained by correcting the oblique line E1 is output (in a linearly aligned state).

7. Seventh Embodiment

A seventh embodiment is a variation of the fifth and other embodiments. The following description focuses on differences from the fifth and other embodiments.

Figure 59:
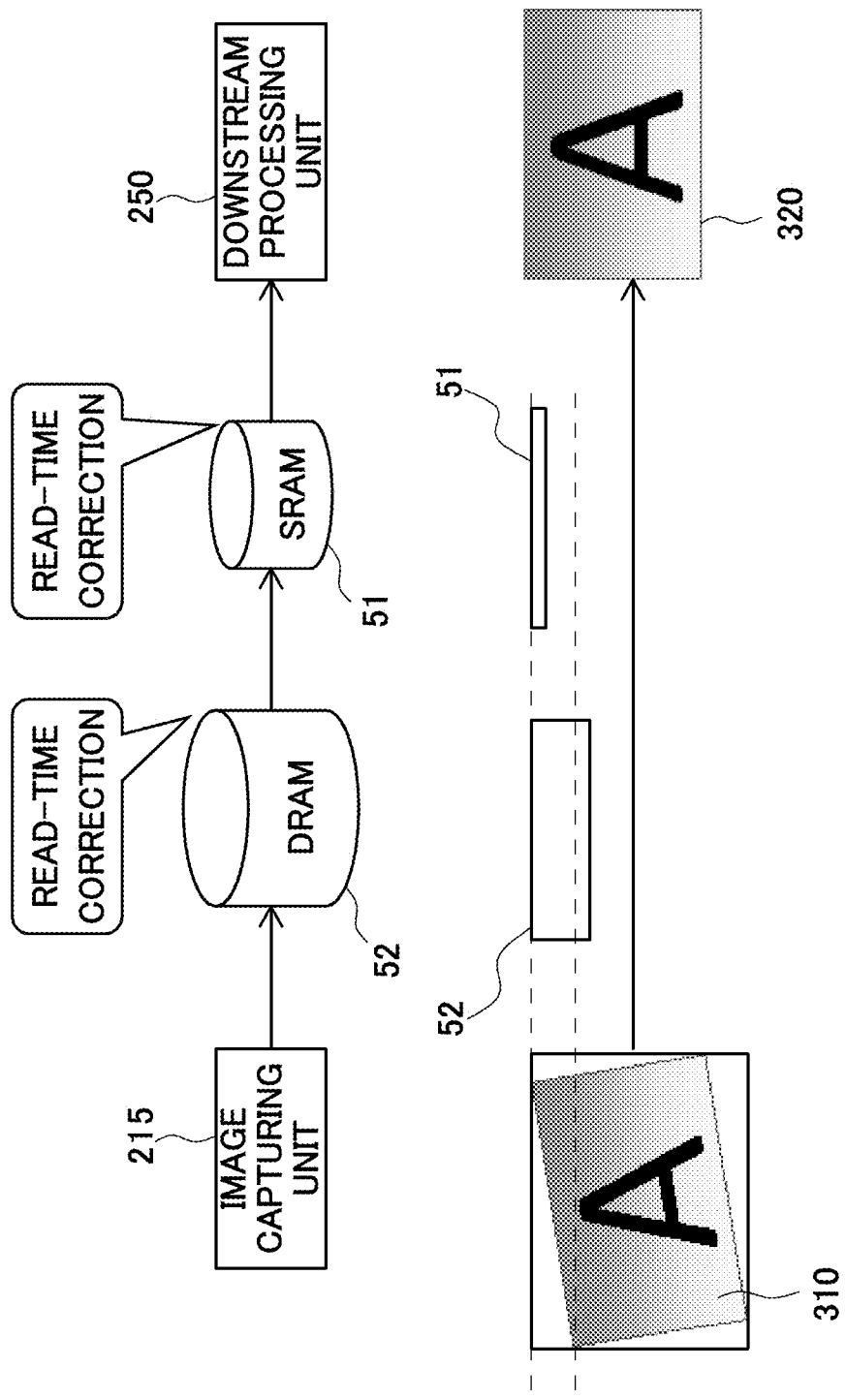
FIG. 59 illustrates an overview of a seventh embodiment.

According to the seventh embodiment, the first rearrangement processing P1 (and the "inter-block rearrangement processing") is performed substantially at the time of reading-out from the DRAM 52 (at the read time) as illustrated in FIG. 59. The second rearrangement processing P2 (and the "intra-block rearrangement processing") is performed substantially at the time of reading-out from the SRAM 51 (at the read time). In short, DRAM read-time correction and SRAM read-time correction are performed (in this order) according to the seventh embodiment.

Figure 60:
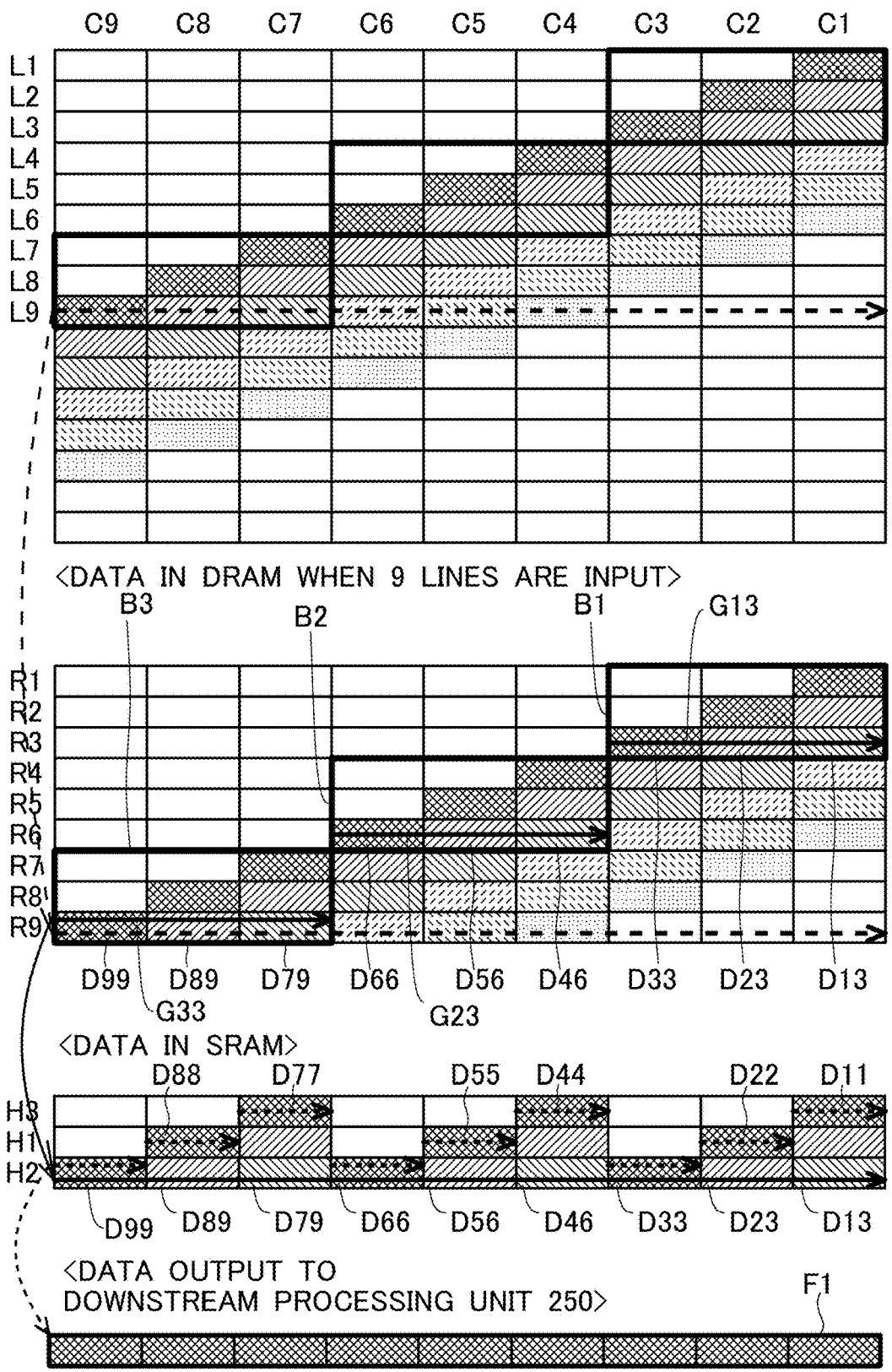
FIG. 60 is a descriptive diagram illustrating a rearrangement operation according to the seventh embodiment

FIG. 60 conceptually illustrates operations according to the seventh embodiment. An operation of writing to the DRAM 52 at the time of reading out the line pixel row L9 from the image capturing unit 215 (see the arrow indicated by the broken line in the middle section in FIG. 60) and an operation of reading-out from the DRAM 52 (involving random access) (see the arrows indicated by thick solid lines in FIG. 60) are conceptually illustrated in FIG. 60. An operation of writing to the SRAM 51 (see the arrow indicated by the thick solid line in FIG. 60) and an operation of reading-out from the SRAM 51 (involving random access) (see the arrows indicated by dotted lines in FIG. 60) are also conceptually illustrated.

The "inter-block rearrangement processing" using the DRAM 52 may be performed in the same manner as in the fifth embodiment. Specifically, the operation of writing to the DRAM 52 (at the write time) may be performed in the same manner as the operation of writing to the DRAM 52 according to the fifth embodiment. The operation of reading-out from the DRAM 52 (at the read time) (including a rearrangement operation) may also be performed in the same manner as the operation of reading-out from the DRAM 52 according to the fifth embodiment.

The "intra-block rearrangement processing" using the SRAM 51 may be performed in the same manner as in the sixth embodiment. Specifically, the operation of writing to the SRAM 51 (at the write time) may be performed in the same manner as the operation of writing to the SRAM 51 according to the sixth embodiment. The operation of reading-out from the SRAM 51 (at the read time) (including a rearrangement operation) may be performed in the same manner as the operation of reading-out from the SRAM 51 according to the sixth embodiment.

8. Eighth Embodiment

An eighth embodiment is a variation of the fifth and other embodiments. The following description focuses on differences from the fifth and other embodiments.

Figure 61:
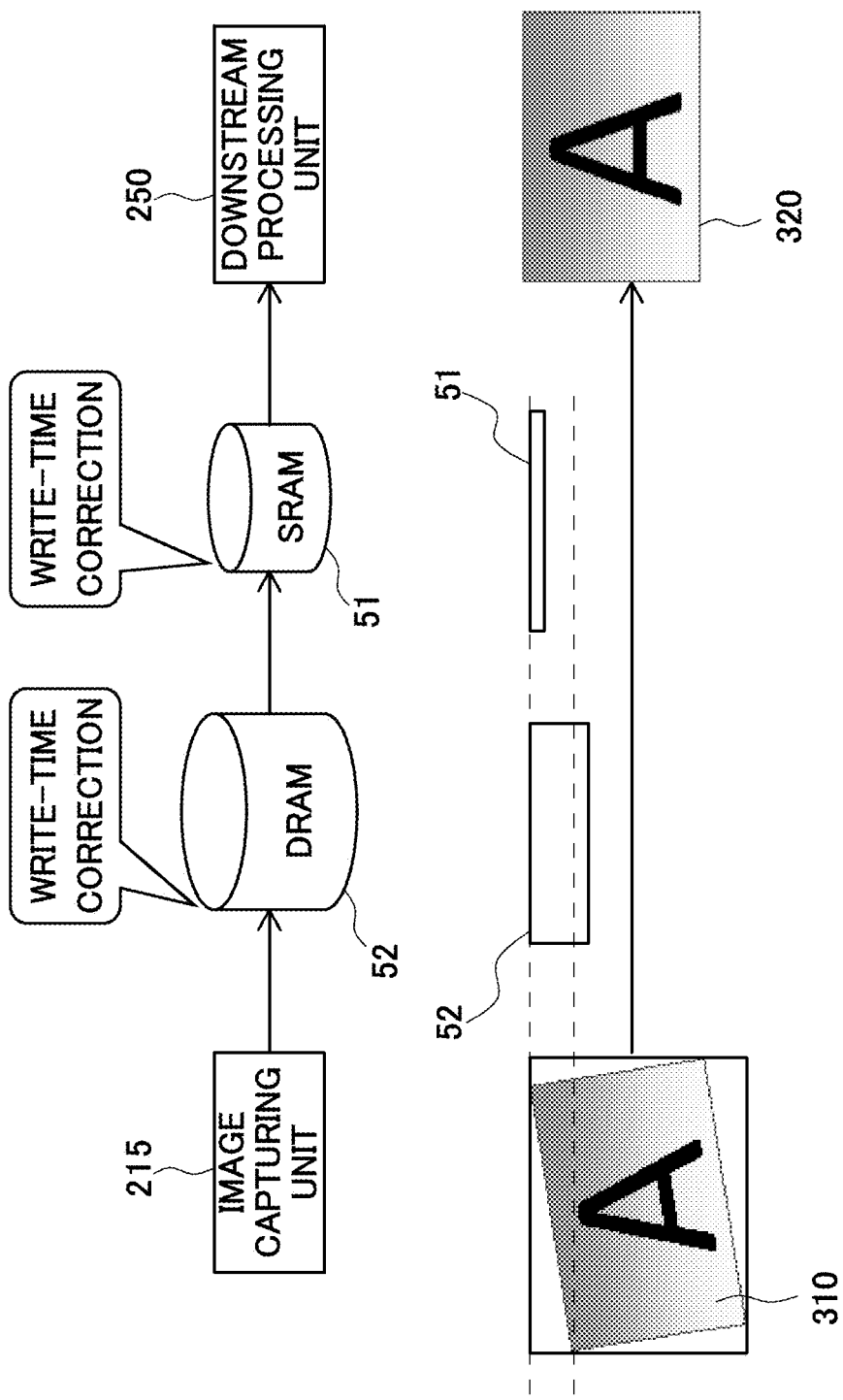
FIG. 61 illustrates an overview of an eighth embodiment.

According to the eighth embodiment, the first rearrangement processing P1 (and the "inter-block rearrangement processing") is performed substantially at the time of writing to the DRAM 52 (at the write time) as illustrated in FIG. 61. The second rearrangement processing P2 (and the "intra-block rearrangement processing") is performed substantially at the time of writing to the SRAM 51 (at the write time). In short, DRAM write-time correction and SRAM write-time correction are performed (in this order) according to the eighth embodiment.

Figure 62:
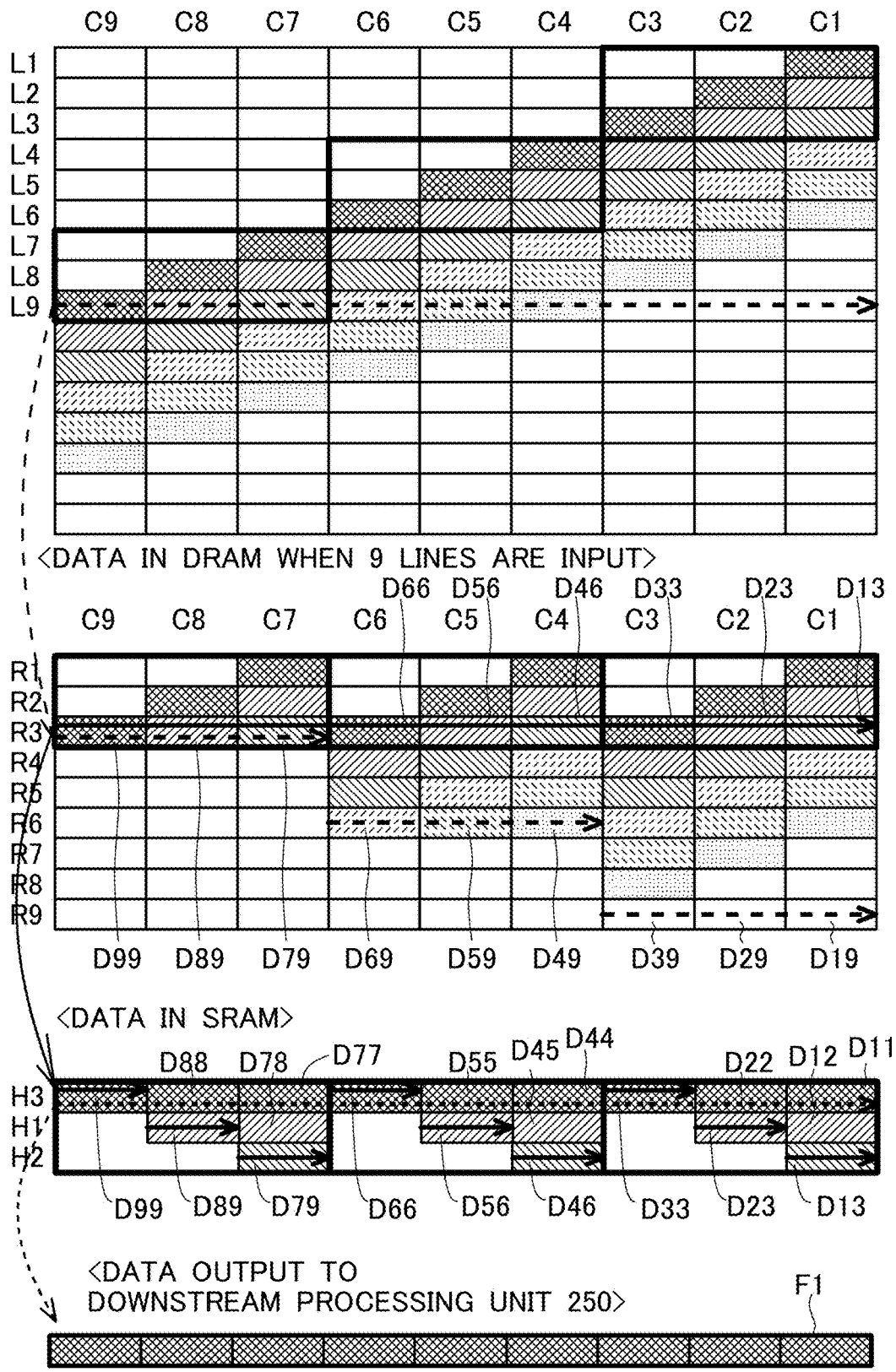
FIG. 62 is a descriptive diagram illustrating a rearrangement operation according to the eighth embodiment.

FIG. 62 conceptually illustrates operations according to the eighth embodiment. An operation of writing to the DRAM 52 (involving random access) at the time of reading out the line pixel row L9 from the image capturing unit 215 (see the arrows indicated by broken lines in FIG. 62) and an operation of reading-out from the DRAM 52 (see the arrow indicated by the thick solid line in FIG. 62) are conceptually illustrated in FIG. 62. An operation of writing to the SRAM 51 (involving random access) (see the arrows indicated by thick solid lines in FIG. 62) and an operation of reading-out from the SRAM 51 (see the arrow indicated by the dotted line in FIG. 62) are also conceptually illustrated.

The "inter-block rearrangement processing" using the DRAM 52 may be performed in the same manner as in the sixth embodiment. Specifically, the operation of writing to the DRAM 52 (at the write time) (including a rearrangement operation) may be performed in the same manner as the operation of writing to the DRAM 52 according to the sixth embodiment. The operation of reading-out from the DRAM 52 (at the read time) may also be performed in the same manner as the operation of reading-out from the DRAM 52 according to the sixth embodiment.

The "intra-block rearrangement processing" using the SRAM 51 may be performed in the same manner as in the fifth embodiment. Specifically, the operation of writing to the SRAM 51 (at the write time) (including a rearrangement operation) may be performed in the same manner as the operation of writing to the SRAM 51 according to the fifth embodiment. The operation of reading-out from the SRAM 51 (at the read time) may also be performed in the same manner as the operation of reading-out from the SRAM 51 according to the fifth embodiment.

9. Ninth Embodiment

A ninth embodiment is a variation of the first and other embodiments. The following description focuses on differences from the first embodiment.

While each embodiment described above illustrate a mode in which the present invention is applied to obliqueness correction, the application of the present invention is not limited to such a mode. For example, the present invention may be applied to image distortion correction.

Figure 63:
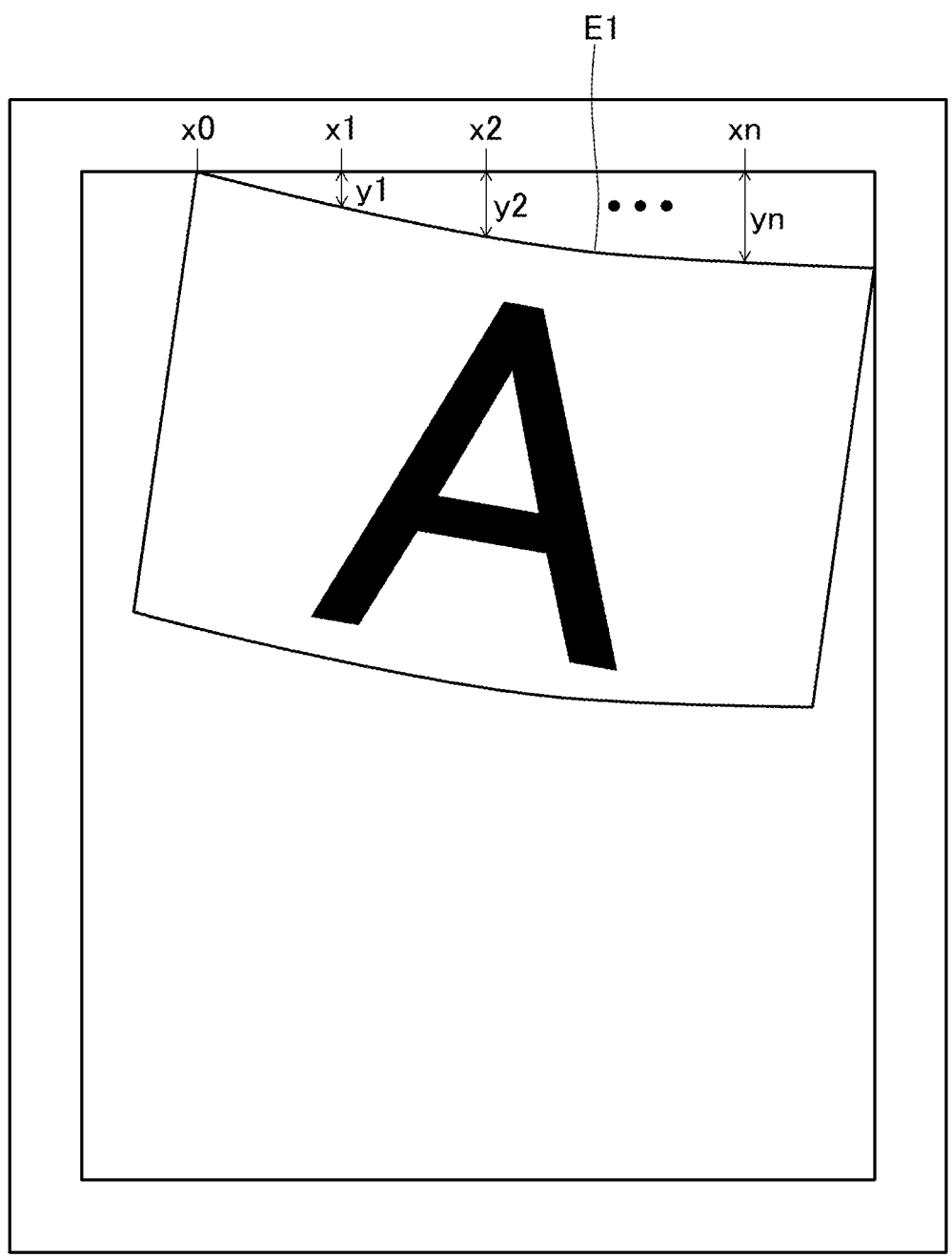
FIG. 63 illustrates a state in which an original document that slackens is placed on a document platen.
Figure 64:
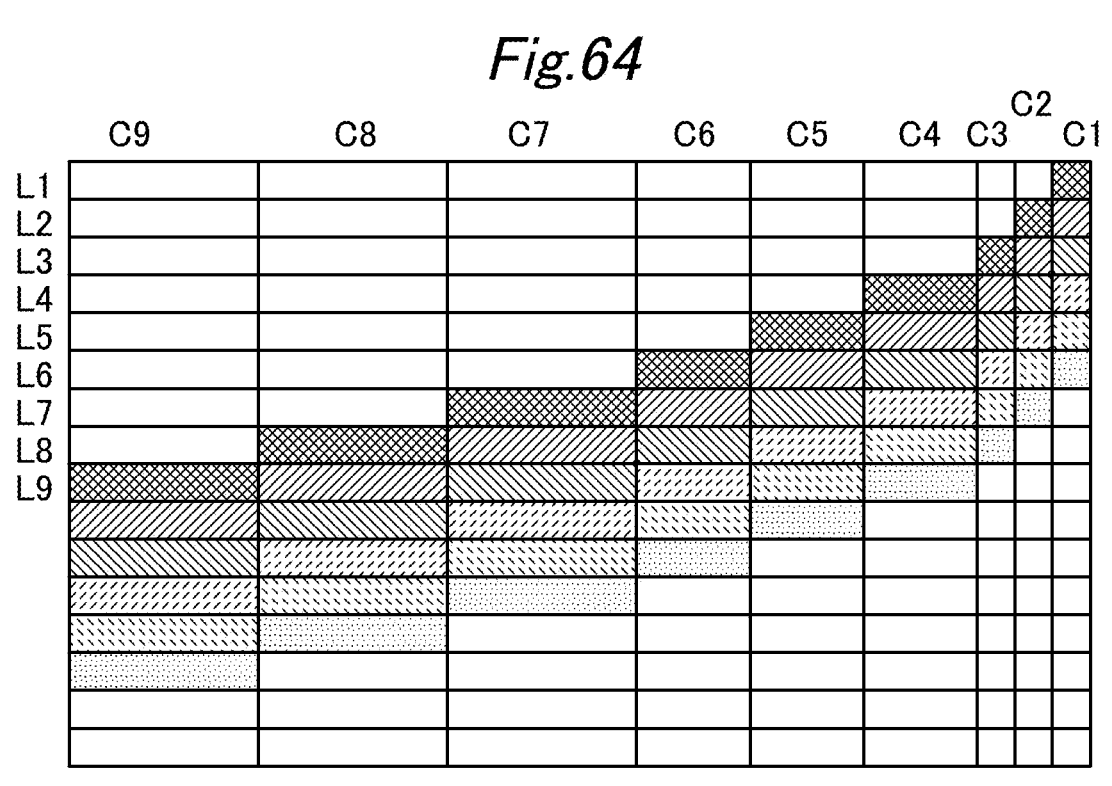

FIG. 63 illustrates a situation where image distortion occurs, and FIG. 64 is a conceptual diagram illustrating a scanned image with an image distortion. The image distortion may occur due to, for example, slack (warp) in an original document. To simplify the description, a mode is primarily described in which the deformed line E1 in a distorted image is present, spanning the nine lines L1 to L9 as in FIG. 6.

In the present embodiment, an operation of detecting an image distortion is performed, instead of the aforementioned operation of detecting the oblique angle. The operation of detecting an image distortion is performed by the detection unit 15 and other units.

Specifically, the deformation of an original document (i.e., scanned image) is detected by detecting an edge portion of the original document. In FIG. 5 described above, the edge portion of the scanned image is deformed at a constant rate (i.e., "linearly" deformed) (in accordance with a constant oblique angle). In FIG. 63, on the other hand, an edge portion of the scanned image is deformed nonuniformly (i.e., "nonlinearly"). When such deformation has been detected, the MFP 10 stores the shape of an edge image. Specifically, the MFP 10 stores X and Y coordinates of a plurality of representative points in a deformed line E1 that corresponds to the edge portion of the original document. To be more specific, among a plurality of continuous points constituting the deformed line E1, points whose Y coordinates are changed (whose X-direction lines are changed) are determined as the boundaries of sectional ranges C, and X and Y coordinates at the boundaries are recorded. Specifically, an X coordinate X1 of a point (point in the deformed line E1) whose Y-direction position is shifted by one dot with respect to a reference point (X0, Y0) is acquired, and the coordinates (X1, Y1) of this point are stored (Y1=Y0+1). Similarly, new coordinates (Xi, Yi) including an X-direction position Xi are stored (Yi=Y(i−1)+1) every time the Y-direction position is shifted by one dot. In other words, the coordinates of points at the boundaries of adjacent sectional ranges C and the coordinates of the reference position are stored. In the example in FIG. 64, for example, the coordinates of 10 (=9+1) points are stored.

The deformed line Ei can also be expressed as a deformed line that includes an image distortion in the input image (to be more specific, a deformed line constituted by partial pixel rows arranged in stepwise form, spanning a plurality of lines in the input image).

Figure 65:
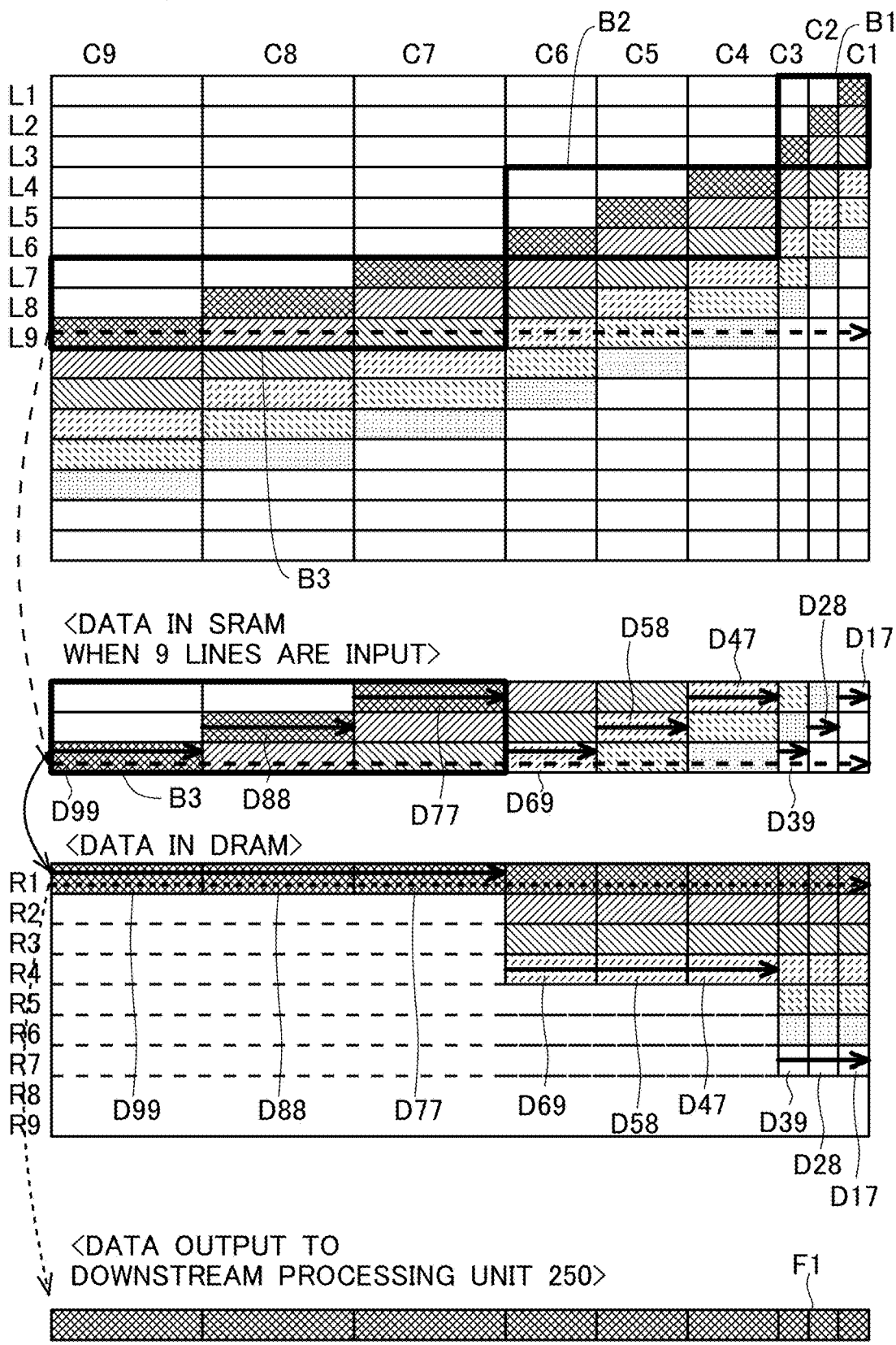
FIG. 65 is a descriptive diagram illustrating a rearrangement operation according to a ninth embodiment.

Then, the same processing as in the first embodiment is performed on this image (see FIG. 65). While the number of pixels included in each of the sectional ranges C1 to C9 is the same in the first embodiment, the ninth embodiment differs from the first embodiment in that the number of pixels included in each of the sectional ranges C1 to C9 is not always the same. For example, the number of pixels that belong to each sectional range Ci (partial pixel rows in the same line) may gradually increase as the numerical subscript i increases from "1" to "9". The remaining processing is performs in almost the same manner, As a result of this operation, the pixel rows corresponding to the deformed line E1 are serialized and output as a new line image F1.

While the above-described embodiment primarily illustrates a mode in which the idea of the first embodiment is applied to image distortion correction processing, the present invention is not limited to this mode. For example, the ideas of the other embodiments such as the second to eighth embodiments may be applied to image distortion correction processing.

10. Tenth Embodiment

10-1. Overview

A tenth embodiment is a variation of the ninth and other embodiments. The following description focuses on differences from the ninth embodiment.

In the above-described ninth embodiment, the deformed line E1 always increments (or always decrements) in the Y direction (as extending in the X direction). However, the present invention is not limited to this example, and the deformed line E1 may include a portion that decrements in the Y direction and a portion that increments in the Y direction.

Figure 66:
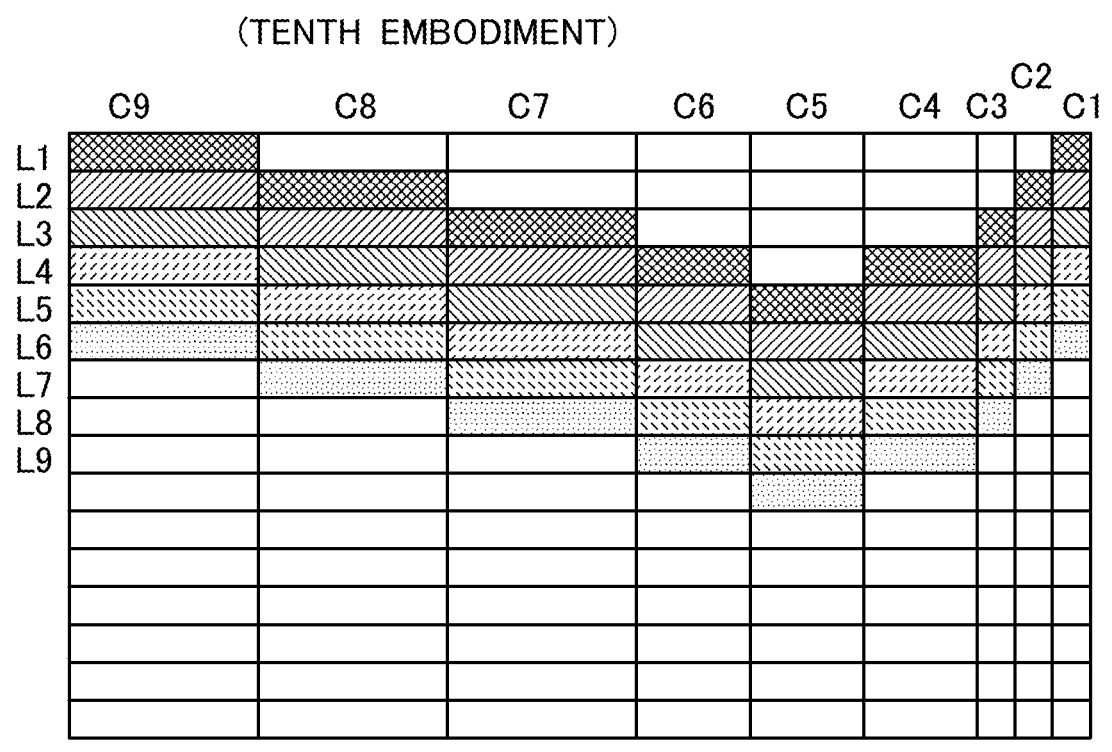

FIG. 66 illustrates such an image distortion. Referring to the image distortion in FIG. 66, the Y-direction position of the deformed line E1 (partial pixel rows D in each sectional range C) in the sectional ranges C1 to C5 gradually shifts downward toward the left in FIG. 66. However, thereafter, the Y-direction position of the deformed line E1 (partial pixel rows D of each sectional range C) in the sectional ranges C5 to C9 gradually shifts upward toward the left in FIG. 66.

Even in this case, it is possible to apply similar ideas to those in the above-described embodiments. The tenth embodiment describes a mode in which the idea of the first embodiment is applied to the image distortion as illustrated in FIG. 66. The present invention is, however, not limited to this mode, and for example, the ideas of the other embodiments such as the second to eighth embodiments may be applied to, for example, the image distortion as illustrated in FIG. 66.

Figure 67:
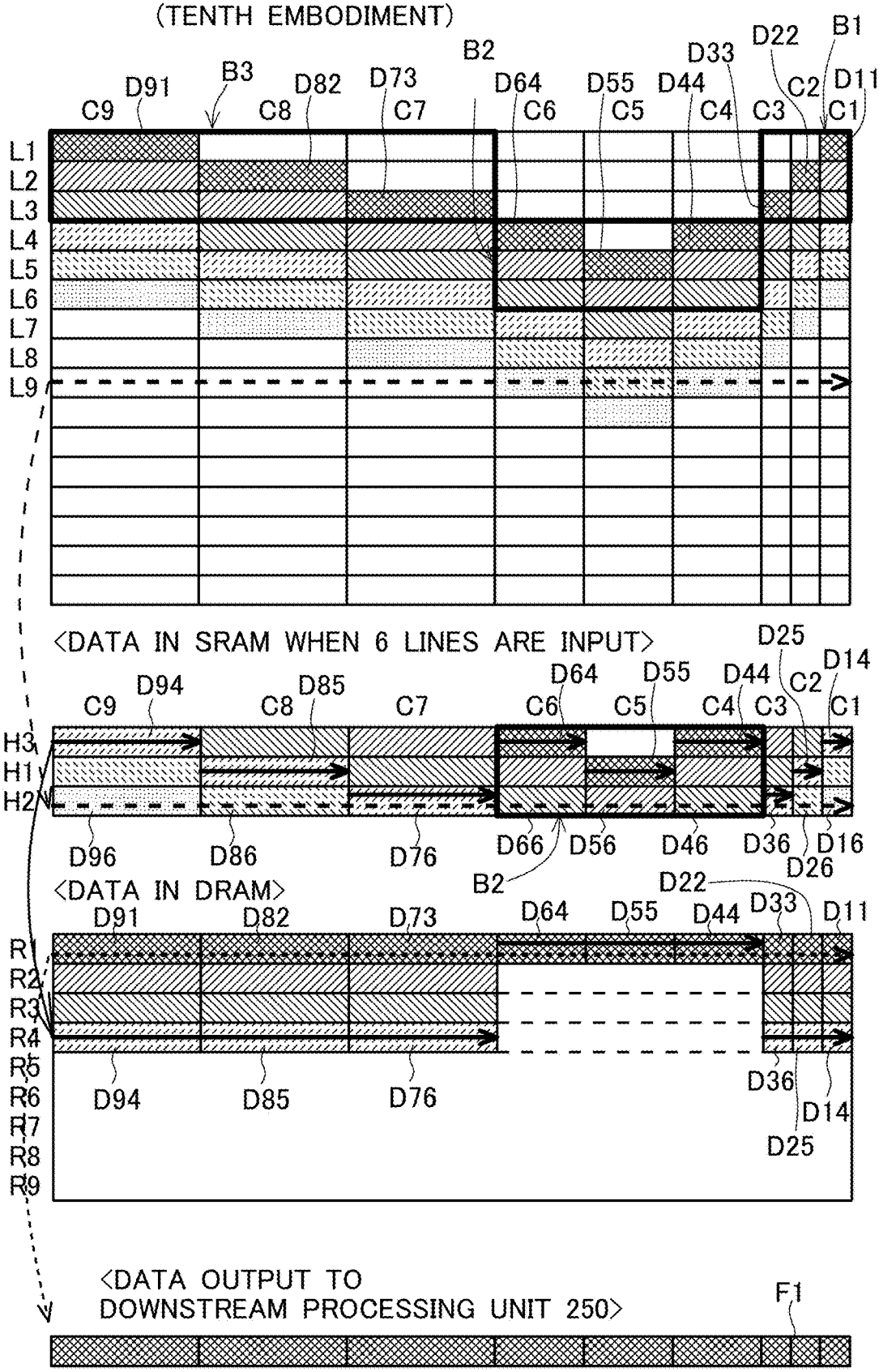
FIG. 67 is a descriptive diagram illustrating a rearrangement operation according to a tenth embodiment.

According to the tenth embodiment, a plurality of block images B1 to B3 (for the oblique line E1) are generated to include, for example, a plurality of partial pixel rows D91, D82, D73, D64, D55, D44, D33, D22, and D11 that constitute a deformed line in the input image (a plurality of partial pixel rows arranged in stepwise form over a plurality of X-direction lines (lines extending in the X direction) L1 to L9 in the input image) as illustrated in FIG. 67. The block images B1 and B3 have the same Y-direction position, but the Y-direction position of the block images B1 and B3 differs from the Y-direction position of the block image B2. Thus, the three block images B1, B2, and B3 are arranged nonlinearly.

In the tenth embodiment, the SRAM 51 is used to perform intra-block rearrangement processing, and the DRAM 52 is used to perform inter-block rearrangement processing as in the ninth embodiment.

10-2. Detailed Operations

First to Third Lines

Figure 68:
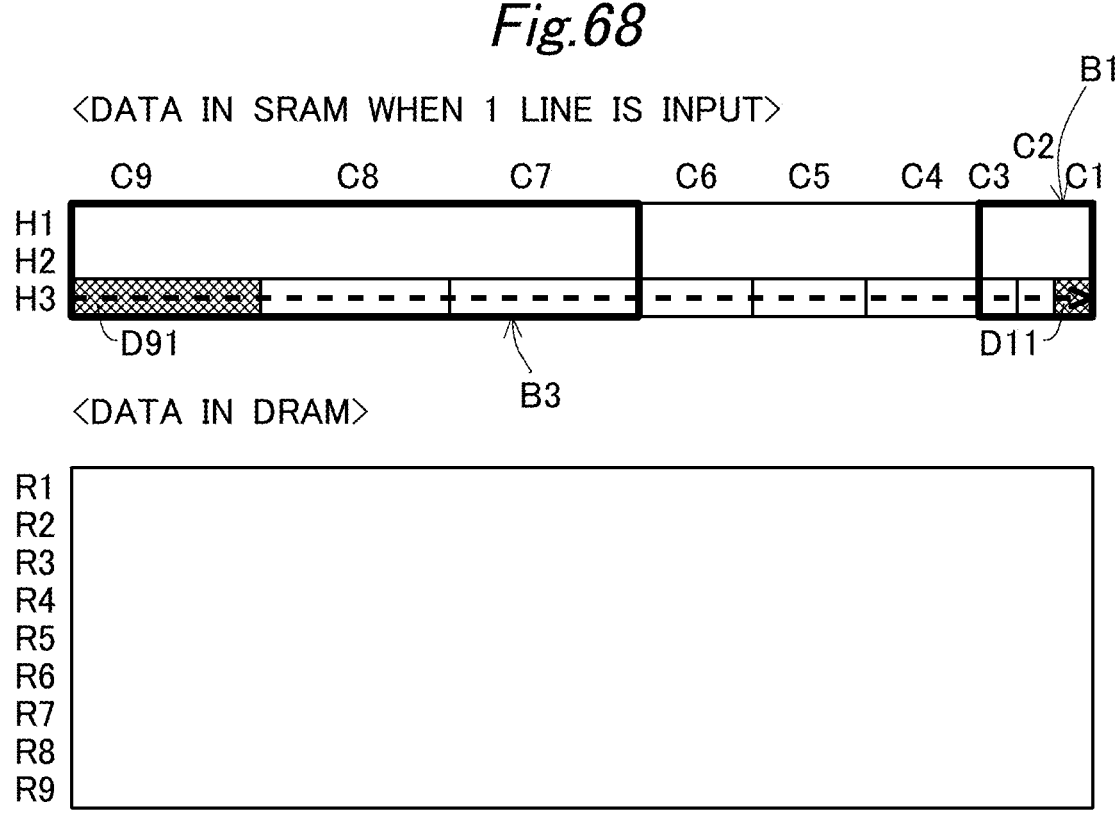
FIG. 68 illustrates processing performed on each line pixel row.
Figure 69:
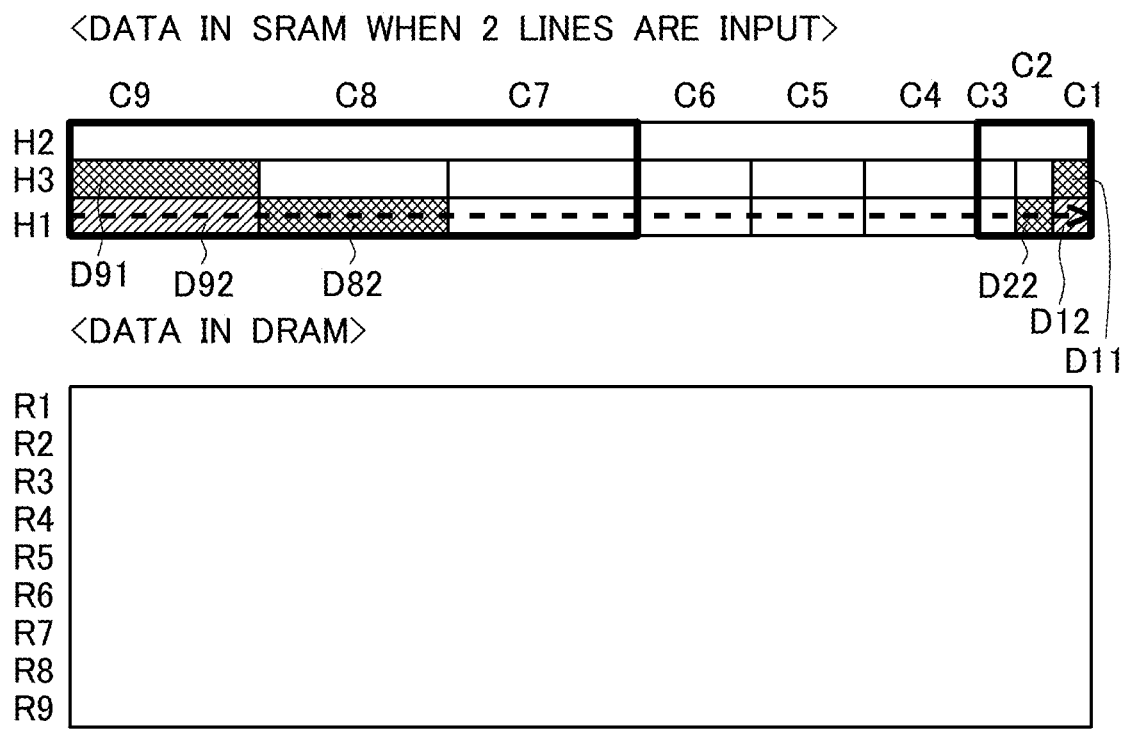
FIG. 69 illustrates processing performed on each line pixel row.

First, processing for the first line pixel row L1 (FIG. 68), processing for the second line pixel row L2 (FIG. 69), and processing for the third line pixel row L3 (FIG. 70) are performed in the same manner as in the ninth embodiment (and the first embodiment). Specifically, the line pixel rows L1, L2, and L3 are written as-is to the lines H3, H2, and H1 in the SRAM 51. The sectional ranges C3 to C1 of the line pixel rows L1, L2, and L3 include partial pixel rows D33, D22, and D11 of the deformed line E1 in the original image, and the sectional ranges C9 to C7 of the line pixel rows L1, L2, and L3 include partial pixel rows D99, D88, and D77 of the deformed line E1 in the original image.

In a band-like image constituted by the line pixel rows L1 to L3 of the input image, a portion from the sectional ranges C3 to C1 is a block image for use in correction of the deformed line E1, and is also expressed as the block image B1 for the deformed line E1. Similarly, in the band-like image constituted by the line pixel rows L1 to L3 of the input image, a portion from the sectional ranges C9 to C7 is also a block image for use in correction of the deformed line E1, and is also expressed as the block image B3 for the deformed line E1.

Figure 70:
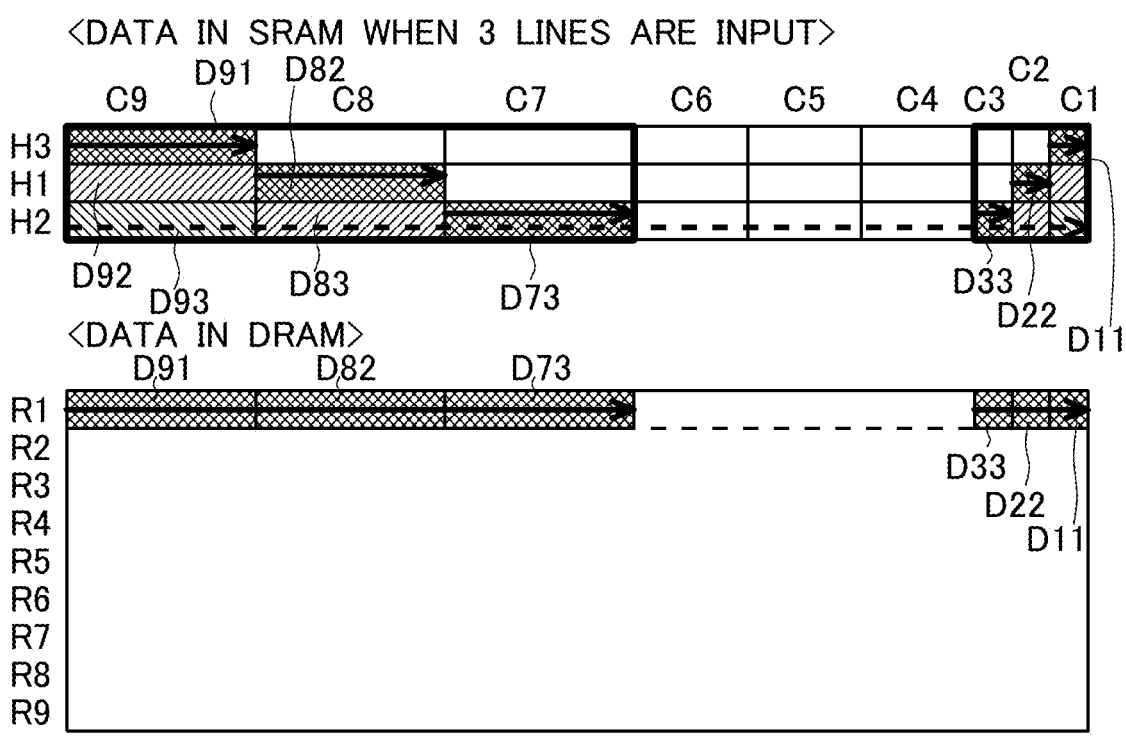
FIG. 70 illustrates processing performed on each line pixel row.

Immediately after the third line pixel row L3 has been written to the SRAM 51, the SRAM 51 is in such a state as illustrated in the upper section in FIG. 70.

Thereafter, intra-block rearrangement processing is performed substantially at the time of reading-out from the SRAM 51. Specifically, for the block image B1 (in other words, sectional ranges C3 to C1) (for the deformed line E1), the partial pixel rows D33, D22, and D11 in the deformed line E1 are continuously read out as in the ninth embodiment (and the first embodiment). Moreover, for the block image B3 (in other words, sectional ranges C9 to C7) (for the deformed line E1), the partial pixel rows D91, D82, and D73 in the deformed line E1 are continuously read out according to the tenth embodiment.

The partial pixel rows D33, D22, and D11 read out for the block image B1 (sectional ranges C3 to C1) (for the deformed line E1) are continuously arranged as-is in the sectional ranges C3, C2, and C1 of the line R1 in the DRAM 52. The partial pixel rows D91, D82, and D73 read out for the block image B3 (sectional ranges C9 to C7) (for the deformed line E1) are continuously arranged as-is in the sectional ranges C9, C8, and C7 of the line R1 in the DRAM 52.

Fourth and Fifth Lines

Figure 71:
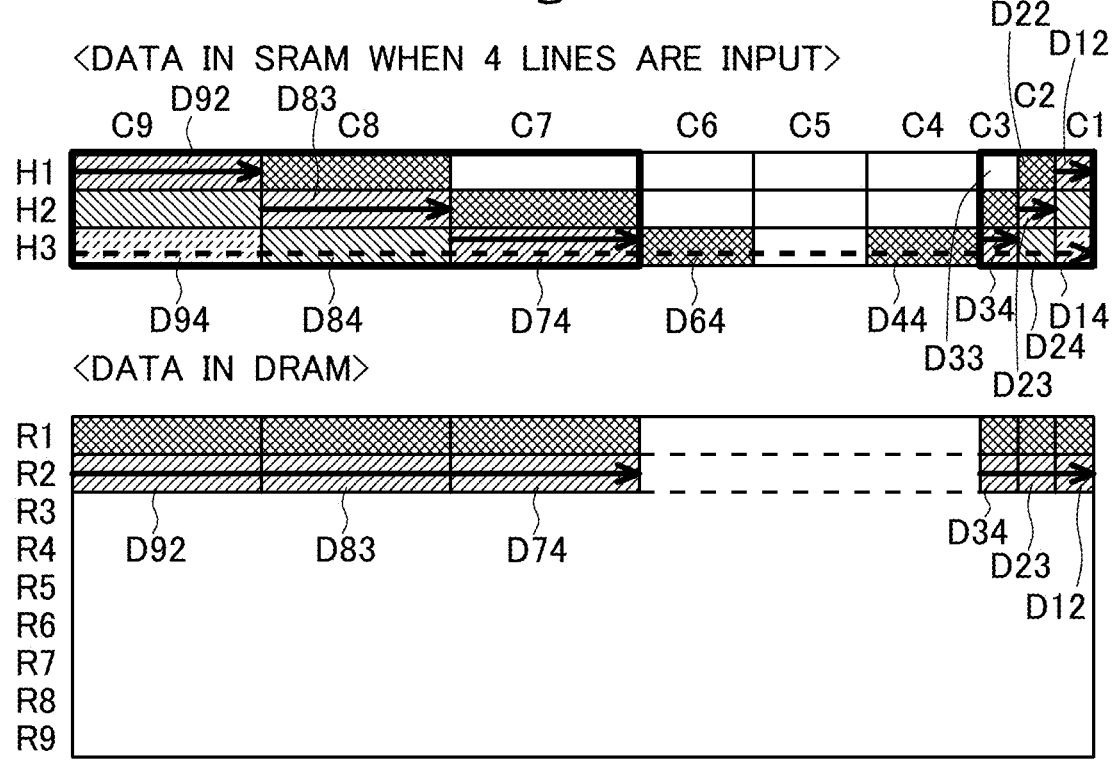
FIG. 71 illustrates processing performed on each line pixel row.

Next, processing for the fourth line pixel row L4 (FIG. 71) is performed.

Specifically, the line pixel row L4 is written as-is to the line H3 in the SRAM 51. Immediately after the fourth line pixel row L4 has been written to the SRAM 51, the SRAM 51 is in such a state as illustrated in the upper section in FIG. 71. To be more specific, the partial pixel rows D94, D84, D74, and D64 are respectively written to the sectional ranges C9, C8, C7, and C6 of the line H3 in the SRAM 51, and the partial pixel rows D44, D34, D24, and D14 are respectively written to the sectional ranges C4, C3, C2, and C1 of the line H3 in the SRAM 51.

Thereafter, intra-block rearrangement processing is performed substantially at the time of reading-out from the SRAM 51. Specifically, for the block image B1 (sectional ranges C3 to C1) (for the deformed line E2), the partial pixel rows D34, D23, and D12 in the deformed line E2 are continuously read out. Moreover, for the block image B3 (sectional ranges C9 to C7) (for the deformed line E2), the partial pixel rows D92, D83, and D74 in the deformed line E2 are continuously read out.

The partial pixel rows D34, D23, and D12 read out for the block image B1 (sectional ranges C3 to C1) (for the deformed line E2) are continuously arranged as-is in the sectional ranges C3, C2, and C1 of the line R2 in the DRAM 52. The partial pixel rows D92, D83, and D74 read out for the block image B3 (sectional ranges C9 to C7) (for the deformed line E2) are continuously arranged as-is in the sectional ranges C9, C8, and C7 of the line R2 in the DRAM 52.

Figure 72:
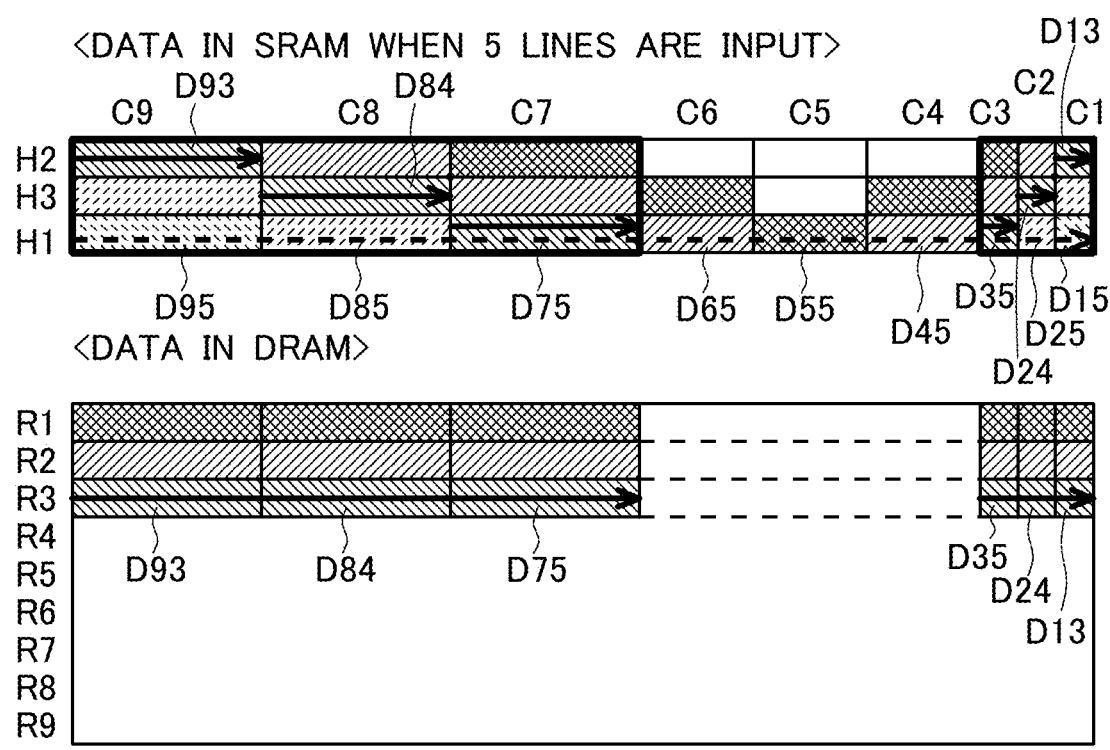
FIG. 72 illustrates processing performed on each line pixel row.

Next, processing for the fifth line pixel row L4 (FIG. 72) is performed in a similar manner.

As a result, the partial pixel rows D35, D24, and D13 read out for the block image B1 (sectional ranges C3 to C1) (for the deformed line E3) are continuously arranged as-is in the sectional ranges C3, C2, and C1 of the line R3 in the DRAM 52. The partial pixel rows D93, D84, D75 read out for the block image B3 (sectional ranges C9 to C7) (for the deformed line E3) are continuously arranged as-is in the sectional ranges C9, C8, and C7 of the line R3 in the DRAM 52.

Sixth Line

Figure 73:
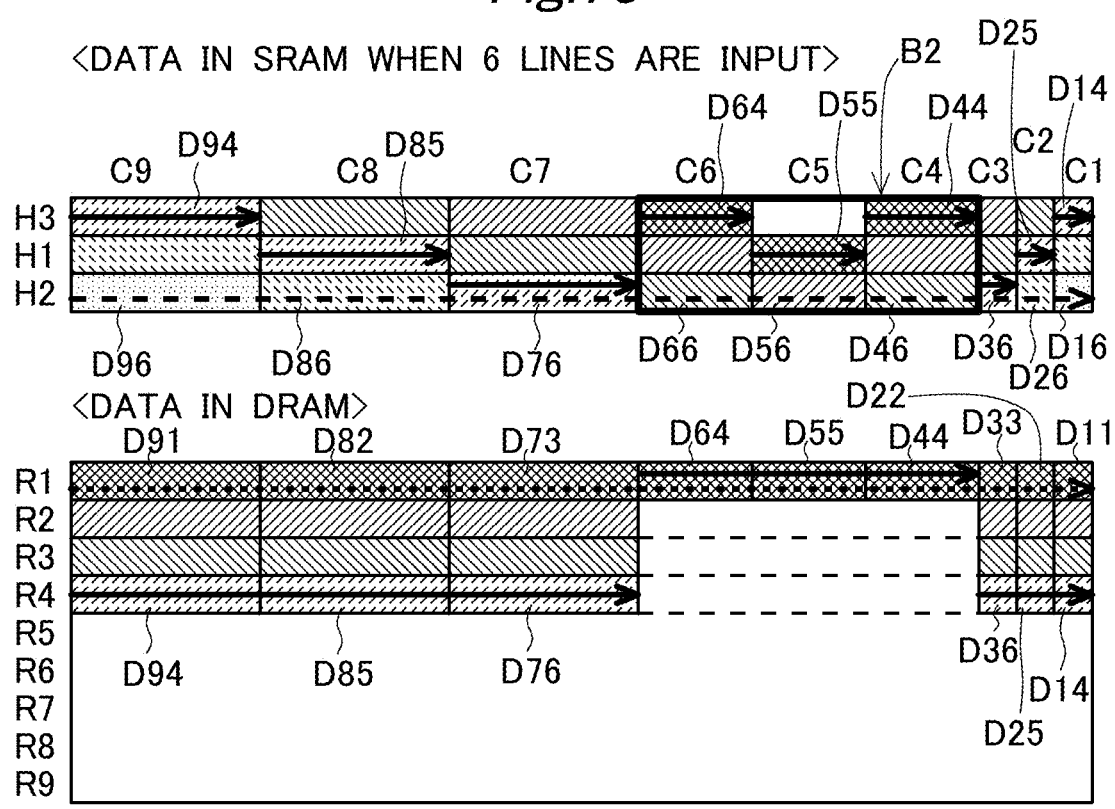
FIG. 73 illustrates processing performed on each line pixel row.

Next, processing for the sixth line pixel row L6 (FIG. 73) is performed.

Specifically, the line pixel row L6 is written as-is to the line H2 in the SRAM 51. Immediately after the sixth line pixel row L6 has been written to the SRAM 51, the SRAM 51 is in such a state as illustrated in the upper section in FIG. 73. To be more specific, partial pixel rows D96, D86, D76, D66, D56, D46, D36, D26, and D16 are respectively written to the sectional ranges C9 to C1 of the line H2 in the SRAM 51. The sectional ranges C6 to C4 of the SRAM 51 include the partial pixel rows D64, D55, and D44 of the deformed line E1 in the original image (particle pixel rows relating to the block image B2 for the deformed line E1).

Thereafter, intra-block rearrangement processing is performed substantially at the time of reading-out from the SRAM 51. Specifically, for the block image B1 (sectional ranges C3 to C1) for the deformed line E4, the partial pixel rows D36, D25, and D14 in the deformed line E4 are continuously read out. Moreover, for the block image B3 (sectional ranges C9 to C7) for the deformed line E4, the partial pixel rows D94, D85, and D76 in the deformed line E4 are continuously read out. Furthermore, for the block image B2 (sectional ranges C6 to C4) for the deformed line E1, the partial pixel rows D64, D55, and D44 are continuously read out.

The partial pixel rows D36, D25, and D14 (serialized pixel row) read out for the block image B4 (sectional ranges C3 to C1) for the deformed line E4 are continuously written as-is to the sectional ranges C3, C2, and C1 of the line R4 in the DRAM 52. The partial pixel rows D94, D85, and D76 (serialized pixel row) read out for the block image B3 (sectional ranges C9 to C7) for the deformed line E4 are continuously written as-is to the sectional ranges C9, C8, and C7 of the line R4 in the DRAM 52. The partial pixel rows D64, D55, D44 (serialized pixel row) read out for the block image B2 (sectional ranges C6 to C4) for the deformed line E1 are continuously written as-is to the sectional ranges C6, C5, and C4 of the line R1 in the DRAM 52.

In this way, the rearrangement processing in units of blocks is performed at the time of writing to the DRAM 52. Specifically, each serialized pixel row generated by the intra-block rearrangement processing using the SRAM 51 is written to a corresponding address at its target position after the rearrangement processing of the serialized pixel row by using random access to the DRAM 52.

As illustrated in FIG. 70, the serialized pixel rows (D91, D82, D73) and (D33, D22, D11) read out for the block images B3 and B1 for the deformed line E1 have already been written to the line R1 (sectional ranges C3 and C1) in the DRAM 52. Since the partial pixel rows D64, D55, and D44 (serialized pixel row) read out for the block image B2 for the deformed line E1 have this time been written to the line R1 in the DRAM 52, all of the partial pixel rows D91, D82, D73, D64, D55, D44, D33, D22, and D11 of the deformed line E1 are arranged in the same line R1.

Thereafter, the partial pixel rows D91, D82, D73, D64, D55, D44, D33, D22, and D11 continuously arranged in the single line R1 in the DRAM 52 are continuously read out. In other words, the serialized pixel row (partial pixel rows D91, D82, and D73), the serialized pixel row (partial pixel rows D64, D55, and D44), and the serialized pixel row (partial pixel rows D33, D22, and D11) are read out in this order. As a result, a new line image F1 (corrected line image) corresponding to the deformed line E1 is output to the downstream processing unit 250.

Here, the serialized pixel row (partial pixel rows D91, D82, and D73) is a serialized pixel row generated along with the processing for reading out the line pixel row L3 (see FIG. 70) and written to the sectional ranges C9, C8, and C7 of the line R1 in the DRAM 52. The serialized pixel row (partial pixel rows D33, D22, and D11) is a serialized pixel row generated along with the processing for reading out the line pixel row L3 (see FIG. 70) and written to the sectional ranges C3, C2, and C1 of the line R1 in the DRAM 52. On the other hand, the serialized pixel row (partial pixel rows D64, D55, and D44) is a serialized pixel row generated along with the processing for reading out the line pixel row L6 (FIG. 73) and written to the sectional ranges C6, C5, and C4 of the line R1 in the DRAM 52.

Seventh Line

Figure 74:
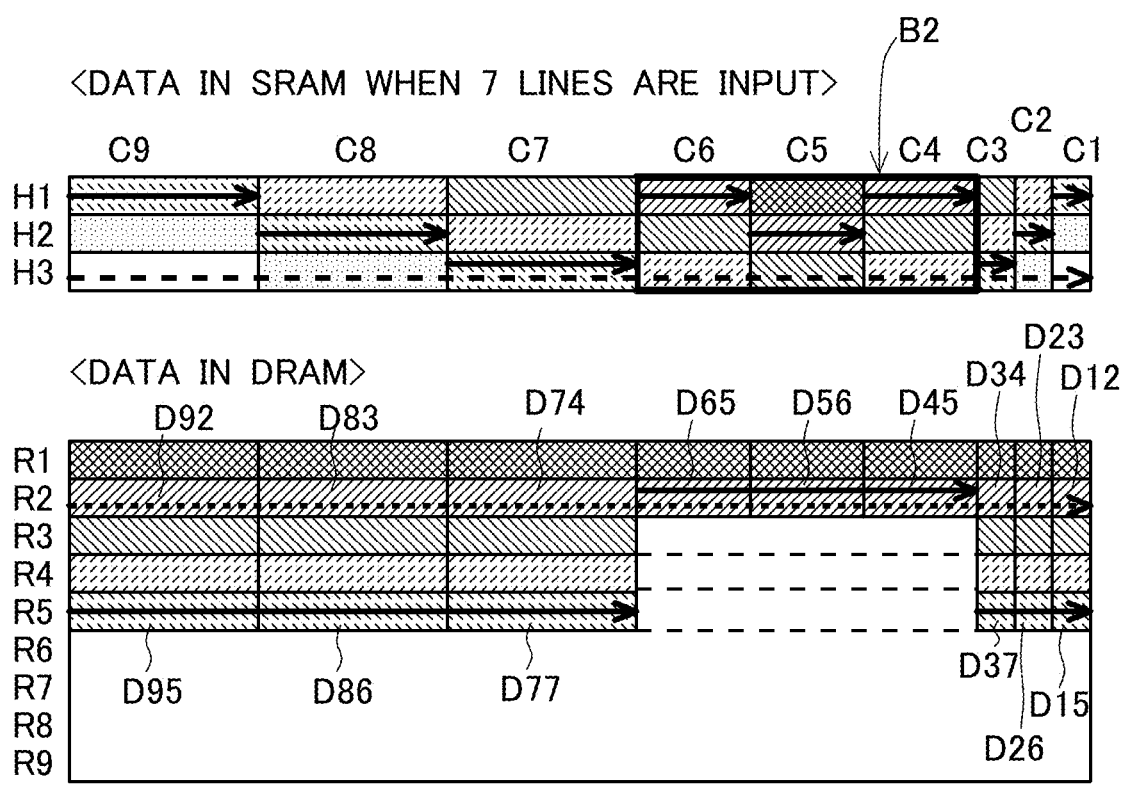
FIG. 74 illustrates processing performed on each line pixel row.

Processing similar to that described above is performed along with the processing for reading out the seventh line pixel row L7 (FIG. 74).

As a result, a new line image F2 (corrected line image) corresponding to the deformed line E2 is output to the downstream processing unit 250. Specifically, ultimately, the serialized pixel row (partial pixel rows D92, D83, and D74) in the sectional ranges C9, C8, and C7 of the line R2, the serialized pixel row (partial pixel rows D65, D56, and D45) in the sectional ranges C6, C5, and C4 of the line R2, and the serialized pixel row (partial pixel rows D34, D23, and D12) in the sectional ranges C3, C2, and C1 of the line R2 are read out in this order. As a result, the new line image F2 (corrected line image) corresponding to the deformed line E2 is output to the downstream processing unit 250. The partial pixel rows D92, D83, and D74 correspond to a serialized pixel row generated along with the processing for reading out the line pixel row L4 (see FIG. 71) and written to the DRAM 52 (line R2), and the partial pixel rows D34, D23, and D12 correspond to a serialized pixel row generated along with the processing for reading out the line pixel row L4 (see FIG. 71) and written to the DRAM 52 (line R2). The partial pixel rows D65, D56, and D45 correspond to a serialized pixel row generated along with the processing for reading out the line pixel row L7 (see FIG. 74) and written to the DRAM 52 (line R2).

Thereafter, similar processing is also performed for the eighth line pixel row L8 and subsequent line pixel rows.

With the operations described above, similar effects to that in the ninth and other embodiments (and the first embodiment) can be achieved.

While the above-described embodiment primarily illustrates a mode in which the idea of the first embodiment is applied to the correction processing for correcting an image distortion as in FIG. 66, the present invention is not limited to this mode. For example, the idea of the other embodiments such as the second to eighth embodiments may be applied to the above correction processing.

11. Other Embodiments

While the above has been a description of embodiments of the present invention, the present invention is not intended to be limited to the content described above.

For example, while the above-described embodiments illustrate modes in which each block image Bi is constituted by (3×3) partial pixel rows D, the present invention is not limited to this example. In other words, each block image Bi is not limited to the one constituted by (N×N) partial pixel rows D. Each block image B may be constituted by a plurality of partial pixel rows D that relate to a deformed line E, correspond to N lines' worth of line image at a predetermined Y-direction position, and relate to a plurality of continuous sectional ranges C.

Specifically, as illustrated in FIG. 75, the block image B2 may be constituted by (7×3) partial pixel rows D that include a plurality of partial pixel rows D(10, 4), D95, D84, D75, D66, D55, and D44 in the sectional ranges C10 to C4 of the deformed line E1. In this way, the block image B2 may include a plurality of partial pixel rows D that correspond to N (three) lines' worth of line image at a predetermined Y-direction position (Y-direction position corresponding to the line pixel rows L4 to L6) and that relate to a plurality of continuous sectional ranges C10 to C4. The partial pixel rows D(10, 4), D95, D84, D75, D66, D55, D44 can also be expressed as pixel row that are arranged nonlinearly. In this way, the deformed line E1 may include a repetition of decrements in the Y direction and increments in the Y direction within each block image B.

In this case, the "intra-block rearrangement processing" using the SRAM 51 may be performed such that a plurality of partial pixel rows arranged nonlinearly are rearranged so as to be arranged linearly (in the same line). In other words, a plurality of partial pixel rows that include two or more partial pixel rows D arranged in different lines may be rearranged so as to be arranged linearly.

While the above-described embodiments illustrate modes in which the present invention is applied to a scan operation, the present invention is not limited to these modes. For example, the present invention may be applied to a print operation.

To be more specific, a deviation of the angle (deviation angle) of conveyance of an original document may be detected during a period when paper to be printed is conveyed on a conveyance path in an MFP 10, and an image that is intentionally skewed in accordance with the deviation angle may be formed on an image drum and transferred to the paper to be printed. In this case, contrary to the above-described embodiments, the input image is a normal image (image that is not skewed), and the image (skewed image) intentionally deformed by the aforementioned correction processing is output to a downstream processing unit.

More specifically, an image that is not skewed is intentionally skewed by a predetermined angle θ and formed on the image drum, and thereafter, the paper to be printed that is skewed by the predetermined angle θ reaches the image drum. Then, the image on the image drum is transferred to the paper to be printed, so that the image is formed at a normal angle on the paper to be printed. In other words, the image is formed in parallel with the edge of the paper to be printed. Such correction processing may be performed.

In this case, each oblique line Ei that is skewed in the reverse direction by the angle θ with respect to the X direction in the pre-correction image is converted into a line that is parallel to the X direction in the corrected image, whereas a line parallel to the X direction in the pre-correction image is converted into a line that is skewed by the angle θ with respect to the X direction in the corrected image.

Alternatively, possible occurrence of an image distortion due to, for example, slack (warp) in an original document during printing may be suppressed. Specifically, deformation of the edge portion of an original document due to, for example, slack (warp) in the original document may be detected during a period when paper to be printed is conveyed on the conveyance path in an MFP 10, and an image that is intentionally deformed in accordance with the detected deformation may be formed on an image drum and transferred to the paper to be printed. In this case, contrary to the above-described embodiments, the input image is a normal image (image that is not deformed), and an image (deformed image) that is intentionally defamed by the aforementioned correction processing is output to a downstream processing unit. By transferring the "deformed image" on the deformed printing paper, it is possible to generate a normal image (image with no distortion) on the printing paper. Even if the printing paper is isolated from the image drum by a slight amount due to, for example, slack in the printing paper, charged toner on the image drum can be transferred to the printing paper because of its static electricity.

The print operation may be implemented by an electrophotographic print output unit using, for example, an image drum, the present invention is not limited to this example, and the print operation may be implemented by a print output unit using other methods such as inkjet printing. When the print output unit uses inkjet printing, ink (which represents a deformed image) ejected from inkjet nozzles may be blown to printing paper (to be more specific, warped (or skewed) printing paper) on the basis of image data about an image (deformed image) obtained by deforming a normal image.

While the correction processing is implemented by the controller 9 executing software according to the above-described embodiments, the present invention is not limited to this example. For example, the correction processing as described above may be implemented by a hardware logic circuit.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
a first memory that is used for first rearrangement processing on a group of pixels in an input image;
a second memory that is used for second rearrangement processing on a group of pixels in an image obtained by the first rearrangement processing and outputs the image that has undergone the second rearrangement processing; and
a hardware processor that uses the first memory and the second memory to perform correcting processing on the input image, the correcting processing including the first rearrangement processing and the second rearrangement processing,
wherein the first rearrangement processing is processing for rearranging a group of pixels in the input image by using random access at the time of writing to the first memory or random access at the time of reading-out from the first memory,
the second rearrangement processing is processing for rearranging a group of pixels in an image obtained by the first rearrangement processing by using random access at the time of writing to the second memory or random access at the time of reading-out from the second memory,
the first memory and the second memory are different types of memories,
one memory out of the first memory and the second memory is a memory capable of higher-speed random access than the other memory,
the one memory has a smaller memory capacity than the other memory,
one rearrangement processing out of the first rearrangement processing and the second rearrangement processing is processing for rearranging a group of pixels in each of a plurality of block images that are generated on the basis of the input image,
the other rearrangement processing out of the first rearrangement processing and the second rearrangement processing is processing for rearranging pixel rows among the plurality of block images, and
the one rearrangement processing is rearrangement processing that involves random access to the one memory.

2. The image processing apparatus according to claim 1, wherein
the one rearrangement processing is rearrangement processing for linearly aligning a plurality of partial pixel rows arranged in stepwise form in each block image, and
the other rearrangement processing is rearrangement processing for linearly aligning a plurality of intra-block linear pixel rows among the plurality of block images, the plurality of intra-block linear pixel rows each being a pixel row linearly arranged in a block to which the intra-block linear pixel row belongs, and the plurality of intra-block linear pixel rows being nonlinearly arranged among the plurality of block images.

3. The image processing apparatus according to claim 1, wherein
the one memory includes N line memories, where N is a natural number of two or more, N being smaller than the number of lines included in the other memory.

4. The image processing apparatus according to claim 3, wherein
the input image includes a plurality of line pixel rows that are one-dimensional pixel rows extending in a first direction, and
each of the plurality of block images has a length shorter than a length of the input image in a second direction perpendicular to the first direction, the length of each of the plurality of block images corresponding to a length of the N lines.

5. The image processing apparatus according to claim 1, wherein
the first rearrangement processing is the one rearrangement processing,
the second rearrangement processing is the other rearrangement processing,
the first memory is the one memory, and
the second memory is the other memory.

6. The image processing apparatus according to claim 5, wherein
the one rearrangement processing involves:
at the time of writing to the one memory, writing each line pixel row in the input image to each corresponding line in the one memory without rearrangement; and
at the time of reading-out from the one memory, reading out a plurality of partial pixel rows in each block image by using random access to the one memory, to generate a serialized pixel row in which the plurality of partial pixel rows in the block image are rearranged to be linearly aligned, the plurality of partial pixel rows including two or more partial pixel rows arranged in different lines in the one memory, and
the other rearrangement processing involves:
at the time of writing to the other memory, writing each serialized pixel row generated by the one rearrangement processing to a corresponding address by using random access to the other memory, the corresponding address being at each target position after rearrangement processing of the serialized pixel row; and
at the time of reading-out from the other memory, reading out a plurality of serialized image rows written at different times for the plurality of block images to the other memory and arranged in the same line in the other memory, to generate a single line image in which the plurality of serialized pixel rows are rearranged to be linearly aligned.

7. The image processing apparatus according to claim 5, wherein
the one rearrangement processing involves:
at the time of writing to the one memory, writing each partial pixel row in each block image to a corresponding address by using random access to the one memory, the corresponding address being at each target position after rearrangement processing of the partial pixel row; and
at the time of reading-out from the one memory, reading out a plurality of partial pixel rows written at different times in the block image and arranged in the same line in the one memory, to generate a serialized pixel row in which the plurality of partial pixel rows in the block image are rearranged to be linearly aligned, and
the other rearrangement processing involves:
at the time of writing to the other memory, writing pixel rows that are linearly aligned in a provisional manner by the one rearrangement processing, to the other memory without rearrangement; and
at the time of reading-out from the other memory, reading out a plurality of serialized pixel rows relating to the plurality of block images by using random access to the other memory, to generate a single line image in which the plurality of serialized pixel rows are rearranged to be linearly aligned, the plurality of serialized pixel rows including two or more partial pixel rows arranged in different lines in the other memory.

8. The image processing apparatus according to claim 5, wherein
the one rearrangement processing involves:
at the time of writing to the one memory, writing each line pixel row in the input image to each corresponding line in the one memory without rearrangement; and
at the time of reading-out from the one memory, reading out a plurality of partial pixel rows in each block image by using random access to the one memory, to generate a serialized pixel row in which the plurality of partial pixel rows in the block image are rearranged to be linearly aligned, the plurality of partial pixel rows including two or more partial pixel rows arranged in different lines in the one memory, and
the other rearrangement processing involves:
at the time of writing to the other memory, writing pixel rows that are linearly aligned in a provisional manner by the one rearrangement processing, to the other memory without rearrangement; and
at the time of reading-out from the other memory, reading out a plurality of serialized pixel rows relating to the plurality of block images by using random access to the other memory, to generate a single line image in which the plurality of serialized pixel rows are rearranged to be linearly aligned, the plurality of serialized pixel rows being arranged in different lines in the other memory.

9. The image processing apparatus according to claim 5, wherein
the one rearrangement processing involves:
at the time of writing to the one memory, writing each partial pixel row in each block image to a corresponding address by using random access to the one memory, the corresponding address being at each target position after rearrangement processing of the partial pixel row; and
at the time of reading-out from the one memory, reading out a plurality of partial pixel rows written at different times in the block image and arranged in the same line in the one memory, to generate a serialized pixel row in which the plurality of partial pixel rows in the block image are rearranged to be linearly aligned, and
the other rearrangement processing involves:
at the time of writing to the other memory, writing each serialized pixel row generated by the one rearrangement processing to a corresponding address by using random access to the other memory, the corresponding address being at each target position after rearrangement processing of the serialized pixel row; and
at the time of reading-out from the other memory, reading out a plurality of serialized pixel rows written at different times for the plurality of block images to the other memory and arranged in the same line in the other memory, to generate a single line image in which the plurality of serialized pixel rows are rearranged to be linearly aligned.

10. The image processing apparatus according to claim 1, wherein
the first rearrangement processing is the other rearrangement processing,
the second rearrangement processing is the one rearrangement processing,
the first memory is the other memory, and
the second memory is the one memory.

11. The image processing apparatus according to claim 10, wherein
the other rearrangement processing involves:
at the time of writing to the other memory, writing each line pixel row in the input image to each corresponding line in the other memory without rearrangement; and
at the time of reading-out from the other memory, reading out a plurality of block images arranged nonlinearly in the other memory by using random access to the other memory, to rearrange the plurality of block images to be linearly aligned, and
the one rearrangement processing involves:
at the time of writing to the one memory, for each of the plurality of block images, writing each partial pixel row in the block image to a corresponding address by using random access to the one memory, the corresponding address being at each target position after rearrangement processing of the partial pixel row, to generate a serialized pixel row in which the plurality of partial pixel rows in the block image are rearranged and arranged in the same line; and
at the time of reading-out from the one memory, reading out the plurality of partial pixel rows arranged in the same line in the one memory, to generate a single line image extracted from the plurality of block images.

12. The image processing apparatus according to claim 10, wherein
the other rearrangement processing involves:
at the time of writing to the other memory, writing the plurality of block images to corresponding addresses by using random access to the other memory, each corresponding address being at a target position after rearrangement processing of the plurality of block images; and
at the time of reading-out from the other memory, reading out the plurality of block images arranged linearly in the other memory, to rearrange the plurality of block images to be linearly aligned, and
the one rearrangement processing involves:
at the time of writing to the one memory, writing each partial pixel row in the plurality of block images to the one memory without rearrangement; and
at the time of reading-out from the one memory, for each of the plurality of block images, reading out a plurality of partial pixel rows in the block image that include two or more partial pixel rows arranged in different lines in the one memory by using random access to the one memory, to generate a serialized pixel row in which the plurality of partial pixel rows relating to the plurality of block images are rearranged to be linearly aligned and to generate a single line image extracted from the plurality of block images.

13. The image processing apparatus according to claim 10, wherein
the other rearrangement processing involves:
at the time of writing to the other memory, writing each line pixel row in the input image to each corresponding line in the other memory without rearrangement; and
at the time of reading-out from the other memory, reading out a plurality of block images arranged nonlinearly in the other memory by using random access to the other memory, to rearrange the plurality of block images to be linearly aligned, and
the one rearrangement processing involves:
at the time of writing to the one memory, writing each partial pixel row in the plurality of block images to the one memory without rearrangement; and at the time of reading-out from the one memory, for each of the plurality of block images, reading out a plurality of partial pixel rows in the block image that include two or more partial pixel rows arranged in different lines in the one memory by using random access to the one memory, to generate a serialized pixel row in which the plurality of partial pixel rows relating to the plurality of block images are rearranged to be linearly aligned and to generate a single line image extracted from the plurality of block images.

14. The image processing apparatus according to claim 10, wherein
the other rearrangement processing involves:
at the time of writing to the other memory, writing the plurality of block images to corresponding addresses by using random access to the other memory, each corresponding address being at a target position after rearrangement processing of the plurality of block images; and
at the time of reading-out from the other memory, reading out the plurality of block images arranged linearly in the other memory, to rearrange the plurality of block images to be linearly aligned, and
the one rearrangement processing involves:
at the time of writing to the one memory, for each of the plurality of block images, writing each partial pixel row in the block image to a corresponding address by using random access to the one memory, the corresponding address being at each target position after rearrangement processing of the partial pixel row, to generate a serialized pixel row in which a plurality of partial pixel rows in the block image are rearranged and arranged in the same line; and
at the time of reading-out from the one memory, reading out the plurality of partial pixel rows arranged in the same line in the one memory, to generate a single line image extracted from the plurality of block images.

15. The image processing apparatus according to claim 1, wherein
the input image is a scanned image obtained by optically reading an original document, and
skew correction is performed on the scanned image by performing the first rearrangement processing and the second rearrangement processing.

16. The image processing apparatus according to claim 15, wherein
the skew correction is obliqueness correction.

17. The image processing apparatus according to claim 16, wherein
the hardware processor detects an oblique angle of an original document,
the plurality of block images are generated to include a plurality of partial pixel rows that include an oblique line in the input image and that are arranged in stepwise form over a plurality of lines extending in a predetermined direction in the input image, and
the correction processing includes processing in which the first rearrangement processing and the second rearrangement processing are used to serialize pixel rows that correspond to an oblique line in the input image, the oblique line being constituted by partial pixel rows arranged in stepwise form over a plurality of lines extending in a predetermined direction in the input image.

18. The image processing apparatus according to claim 15, wherein
the skew correction is image distortion correction.

19. The image processing apparatus according to claim 18, wherein
the hardware processor detects an image distortion in part of a scanned image of an original document,
the plurality of block images are generated to include a plurality of partial pixel rows that constitute a deformed line with an image distortion in the input image and that are arranged in stepwise form over a plurality of lines extending in a predetermined direction in the input image, and
the correction processing includes processing in which the first rearrangement processing and the second rearrangement processing are used to serialize pixel rows that correspond to a deformed line with an image distortion in the input image, the deformed line being constituted by partial pixel rows arranged in stepwise form over a predetermined lines extending in a predetermined direction in the input image.

20. The image processing apparatus according to claim 1, wherein
the input image is a printout image,
skew correction is performed on the printout image by performing the first rearrangement processing and the second rearrangement processing.

21. The image processing apparatus according to claim 20, wherein
the skew correction is obliqueness correction.

22. The image processing apparatus according to claim 21, wherein
the hardware processor detects an oblique angle of paper to be printed,
the plurality of block images are generated to include a plurality of partial pixel rows that constitute an oblique line in the input image and that are arranged in stepwise form over a plurality of lines extending in a predetermined direction in the input image, and
the correction processing includes processing in which the first rearrangement processing and the second rearrangement processing are used to serialize pixel rows that correspond to an oblique line in the input image, the oblique line being constituted by partial pixel rows arranged in stepwise form over a plurality of lines extending in a predetermined direction in the input image.

23. The image processing apparatus according to claim 1, wherein
the one memory is an SRAM, and
the other memory is a DRAM.

24. An image processing method comprising:
a) acquiring an input image; and
b) performing correction processing on an input image by using a first memory and a second memory, the correction processing including first rearrangement processing and second rearrangement processing, the first memory being a memory for performing the first rearrangement processing on a group of pixels in the input image, and the second memory being a memory for performing the second rearrangement processing on a group of pixels in an image obtained by the first rearrangement processing and outputting the image that has undergone the second rearrangement processing,
wherein the first rearrangement processing is processing for rearranging a group of pixels in the input image by using random access at the time of writing to the first memory or random access at the time of reading-out from the first memory, the second rearrangement processing is processing for rearranging a group of pixels in an image obtained by the first rearrangement processing by using random access at the time of writing to the second memory or random access at the time of reading-out from the second memory, the first memory and the second memory are different types of memories, one memory out of the first memory and the second memory is a memory capable of higher-speed random access than the other memory, the one memory has a smaller memory capacity than the other memory, one rearrangement processing out of the first rearrangement processing and the second rearrangement processing is processing for rearranging a group of pixels in each of a plurality of block images that are generated on the basis of the input image, the other rearrangement processing out of the first rearrangement processing and the second rearrangement processing is processing for rearranging pixel rows among the plurality of block images, and the one rearrangement processing involves random access to the one memory.

25. A non-transitory computer-readable recording medium storing a program for causing a computer to execute:

a) acquiring an input image; and b) performing correction processing on an input image by using a first memory and a second memory, the correction processing including first rearrangement processing and second rearrangement processing, the first memory being a memory for performing the first rearrangement processing on a group of pixels in the input image, and the second memory being a memory for performing the second rearrangement processing on a group of pixels in an image obtained by the first rearrangement processing and outputting the image that has undergone the second rearrangement processing, wherein the first rearrangement processing is processing for rearranging a group of pixels in the input image by using random access at the time of writing to the first memory or random access at the time of reading-out from the first memory, the second rearrangement processing is processing for rearranging a group of pixels in an image obtained by the first rearrangement processing by using random access at the time of writing to the second memory or random access at the time of reading-out from the second memory, the first memory and the second memory are different types of memories, one memory out of the first memory and the second memory is a memory capable of higher-speed random access than the other memory, the one memory has a smaller memory capacity than the other memory, one rearrangement processing out of the first rearrangement processing and the second rearrangement processing is processing for rearranging a group of pixels in each of a plurality of block images that are generated on the basis of the input image, the other rearrangement processing out of the first rearrangement processing and the second rearrangement processing is processing for rearranging pixel rows among the plurality of block images, and the one rearrangement processing involves random access to the one memory.

* * * * *